United States Patent
Kim et al.

(10) Patent No.: US 10,140,018 B2
(45) Date of Patent: Nov. 27, 2018

(54) FLEXIBLE DEVICE

(71) Applicant: Samsung Electronics Co., Ltd., Suwon-si, Gyeonggi-do (KR)

(72) Inventors: Iksang Kim, Seoul (KR); Bumsoo Park, Gwangmyeong-si (KR); Dong Hun Kim, Seoul (KR); Seonkeun Park, Seoul (KR); Jooho Seo, Seoul (KR); Jinie Ryu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 15/144,093

(22) Filed: May 2, 2016

(65) Prior Publication Data

US 2016/0324023 A1    Nov. 3, 2016

(30) Foreign Application Priority Data

Apr. 30, 2015  (KR) ........................ 10-2015-0062065
Apr. 20, 2016  (KR) ........................ 10-2016-0047958

(51) Int. Cl.
*G06F 1/16*     (2006.01)
*H04M 1/02*     (2006.01)
*G06F 3/0488*   (2013.01)

(52) U.S. Cl.
CPC ........ *G06F 3/04886* (2013.01); *G06F 1/1624* (2013.01); *G06F 1/1641* (2013.01);
(Continued)

(58) Field of Classification Search
CPC .... G06F 1/1624; G06F 1/1641; G06F 1/1647; G06F 1/1652; G06F 1/1677;
(Continued)

(56) References Cited

U.S. PATENT DOCUMENTS 6,223,393 B1    5/2001   Knopf
8,787,016 B2 *  7/2014   Rothkopf ............ H04M 1/0216
                                                  361/679.02

(Continued)

FOREIGN PATENT DOCUMENTS

EP       2 192 750 A2      6/2010
WO       2012/167204 A2    12/2012
WO       WO 2013080191  †  6/2013

OTHER PUBLICATIONS

European Search Report dated Jul. 18, 2018, issued in European Application No. 16786821.5.

*Primary Examiner* — Lewis West
(74) *Attorney, Agent, or Firm* — Jefferson IP Law, LLP

(57) ABSTRACT

A flexible device is provided. The flexible device includes a main body, a flexible display fixed to a first face of the main body, an auxiliary display disposed on a first region of a second face of the main body that is opposite to the first face, and a cover coupled to the second face to be movable while facing the second face of the main body. The cover is configured to have an area to cover the whole of the second face of the main body, and to be moved when the main body is curved, bent, or folded. The auxiliary display is closed by the cover in a state where the flexible device is unfolded, and the auxiliary display is opened in a state where the flexible device is folded.

20 Claims, 66 Drawing Sheets

(52) U.S. Cl.
CPC .......... *G06F 1/1647* (2013.01); *G06F 1/1652* (2013.01); *G06F 1/1677* (2013.01); *G06F 1/1681* (2013.01); *H04M 1/0268* (2013.01); *G06F 2203/04102* (2013.01); *H04M 1/0216* (2013.01)

(58) Field of Classification Search
CPC ......... G06F 1/1681; G06F 2203/04102; G06F 3/04886; H04M 1/0216; H04M 1/0268
See application file for complete search history.

(56) References Cited

U.S. PATENT DOCUMENTS

| | | | |
|---|---|---|---|
| 8,842,425 B2* | 9/2014 | Ryu | G06F 1/1601 361/679.21 |
| 8,958,201 B2* | 2/2015 | Leung | G06F 1/1626 361/679.27 |
| 8,971,031 B2* | 3/2015 | Mok | G06F 1/1652 349/58 |
| 2007/0054710 A1* | 3/2007 | Pan | H04M 1/022 455/575.3 |
| 2007/0117600 A1 | 5/2007 | Robertson, Jr. et al. | |
| 2008/0146295 A1* | 6/2008 | Jorgensen | H01F 7/0263 455/575.3 |
| 2009/0298429 A1* | 12/2009 | Nakagawa | H04M 1/7253 455/41.2 |
| 2012/0307472 A1 | 12/2012 | Bohn et al. | |
| 2013/0070431 A1 | 3/2013 | Fukuma et al. | |
| 2013/0120912 A1 | 5/2013 | Ladouceur et al. | |
| 2013/0216740 A1 | 8/2013 | Russell-Clarke et al. | |
| 2013/0342090 A1 | 12/2013 | Ahn et al. | |
| 2014/0123436 A1 | 5/2014 | Griffin et al. | |
| 2014/0226275 A1* | 8/2014 | Ko | G06F 1/1626 361/679.27 |
| 2014/0362513 A1* | 12/2014 | Nurmi | G06F 1/1652 361/679.27 |

\* cited by examiner
† cited by third party

FLEXIBLE DEVICE

CROSS-REFERENCE TO RELATED APPLICATION(S)

This application claims the benefit under 35 U.S.C. § 119(a) of a Korean patent application filed on Apr. 30, 2015 in the Korean Intellectual Property Office and assigned Serial number 10-2015-0062065, and a Korean patent application filed on Apr. 20, 2016 in the Korean Intellectual Property Office and assigned Serial number 10-2016-0047958, the entire disclosure of each of which is hereby incorporated by reference.

TECHNICAL FIELD

The present disclosure relates to a flexible device that is capable of being curved, bent, or folded. More particularly, the present disclosure relates to a flexible device in which a user interface (UI) function is expanded by utilizing the rear face of the main body of the flexible device.

BACKGROUND

An ordinary portable device may refer to a communication device that allows a user to store various pieces of information and to enjoy multimedia services (e.g., a game or a video image), as well as to use a communication function (e.g., a voice call or a message transmission) while the user carries the electronic device. The portable device may include, for example, a smart phone, a tablet personal computer (PC), a palm PC, a portable game device, a video image/music file reproducer, a cellular phone, a notebook PC, and the like.

Nowadays, it becomes possible to execute various contents of a banking business (e.g., small amount payment), a game or multimedia service, as well as a communication function (e.g., a voice call) using only one portable device. In the beginning, a portable device merely provided a voice call or a message transmission service. With the advancement of electronic communication techniques, the size, thickness, and weight of the portable device have been gradually reduced, and the portable device has been equipped with, for example, a security function that enables a banking business, a multimedia function that allows a user to enjoy a game or a video image, and a simple business processing function that includes internet or mail transmission/reception, in addition to a communication function.

Accordingly, a display mounted on such a portable device has also been advanced together with the portable device, and various display devices have been developed. Display devices (e.g., a liquid crystal display (LCD) device, a plasma display panel (PDP) device, a field emission display (FED) device, an electro luminescence display (ELD) device, and an organic light emission display (OLED) device) have been developed, and are being developed in the direction of seeking the reduction of thickness, weight, and power consumption thereof.

In addition, the display devices have been developed to be curved, bent, or folded, and a curved display device has also been adopted to a television (TV), a monitor, a wearable device, and the like.

FIG. 2 illustrates a flexible device according to the related art. FIG. 3 illustrates a side view of a flexible device according to the related art.

Referring to FIGS. 2 and 3, a flexible device 20 according to the related art may include a main body 21, a cover 23, and a folding unit 24. On a first face of the main body 21, a flexible display 22 may be disposed, and on a second face of the main body 21, the cover 23 may be disposed.

According to various embodiments of the present disclosure, the folding unit 24 is a connection device mounted in the main body 21, and may include a plurality of folding members 240 and a flexible material portion (not illustrated) to which the plurality of folding members 240 are fixed. The greater portion of each folding member 240 is disposed and concealed within the main body 21, and only a portion of the folding member 240, which is positioned at each end thereof, is visible to the outside.

However, in the case where the flexible device 20 according to the related art is in a flat state (an unfolded state) (see FIGS. 2 and 3), a gap may occur between upper ends of respective folding members 240 so that an issue may occur in that foreign matter infiltrates into the gap. In addition, there is a concern that a user's finger skin may be inserted into the gap existing between the upper ends of the folding members 240, thereby being wounded.

Further, since the flexible device 20 according to the related art has a structure in which the rear face is closed by the cover 23, it is required to expand a user interface (UI) function by utilizing the rear face.

Therefore, a need exists for a flexible device in which a UI function is expanded by utilizing the rear face of the main body of the flexible device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a flexible device in which a user interface (UI) function is expanded by utilizing the rear face of the main body of the flexible device.

Another aspect of the present disclosure is to provide a flexible device in which UI usability may be expanded by disposing an auxiliary device (e.g., an auxiliary display or a camera) on the rear face of the main body.

Another aspect of the present disclosure is to provide a flexible device in which an exterior gap, which occurs between folding members when the flexible device is folded/unfolded to be exposed to the outside, is removed.

In accordance with an aspect of the present disclosure, a flexible device is provided. The flexible device includes a main body, a flexible display fixed to a first face of the main body, an auxiliary device disposed on a first region of a second face of the main body that is opposite to the first face, and a cover coupled to the second face to be movable while facing the second face of the main body, the cover being configured to have an area to cover the whole of the second face of the main body, and to be moved when the main body is curved, bent, or folded. In a state where the flexible device is unfolded, the auxiliary device may be closed by the cover, and in a state where the flexible device is folded, the auxiliary device may be opened.

In accordance with another aspect of the present disclosure, a flexible device is provided. The flexible device includes a main body, a flexible display fixed to a first face of the main body, an auxiliary device disposed on a first region of a second face of the main body that is opposite to the first face, and a cover coupled to be movable while facing the second face of the main body, the cover being configured to have an area that covers a region remaining on the second face of the main body excluding the first region and to be moved when the main body is curved, bent, or folded. The auxiliary device may always be opened to be exposed.

In accordance with another aspect of the present disclosure, a flexible device is provided. The flexible device includes a main body having a first face on which a flexible display is disposed, and a folding unit mounted in the main body and configured to cause the main body to be folded. The folding unit may include a first folding member, at least one second folding member and at least one third folding member that are disposed at opposite sides of the first folding member, respectively, and each of the folding members includes opposite end portions, each of which includes an outer peripheral surface such that the outer peripheral surfaces of the folding members are interlocked with each other. When the main body is folded/unfolded, an external gap between the opposite end portions of the folding members may be removed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
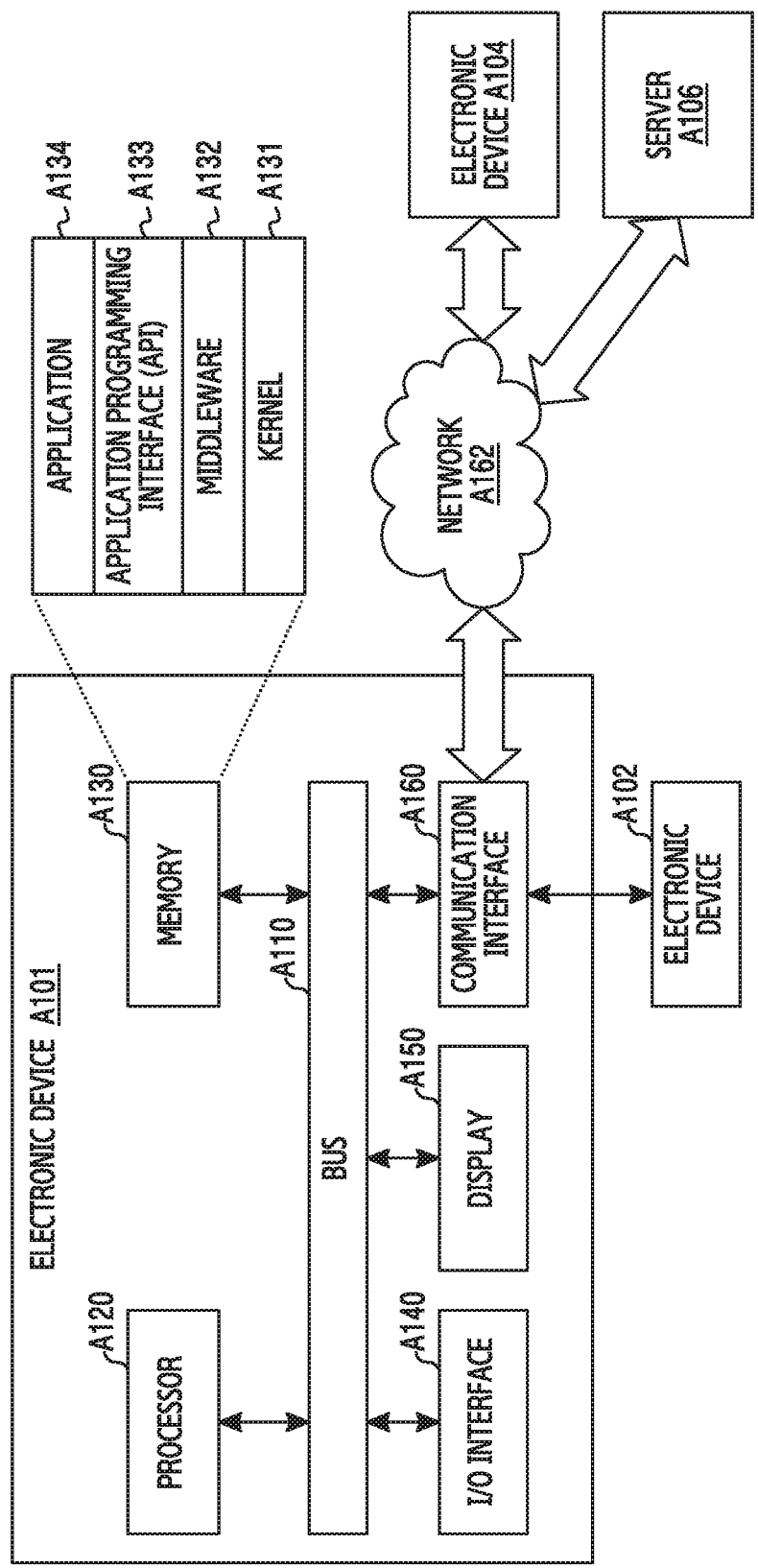
FIG. 1 illustrates a network environment including an electronic device according to various embodiments of the present disclosure.
Figure 2:
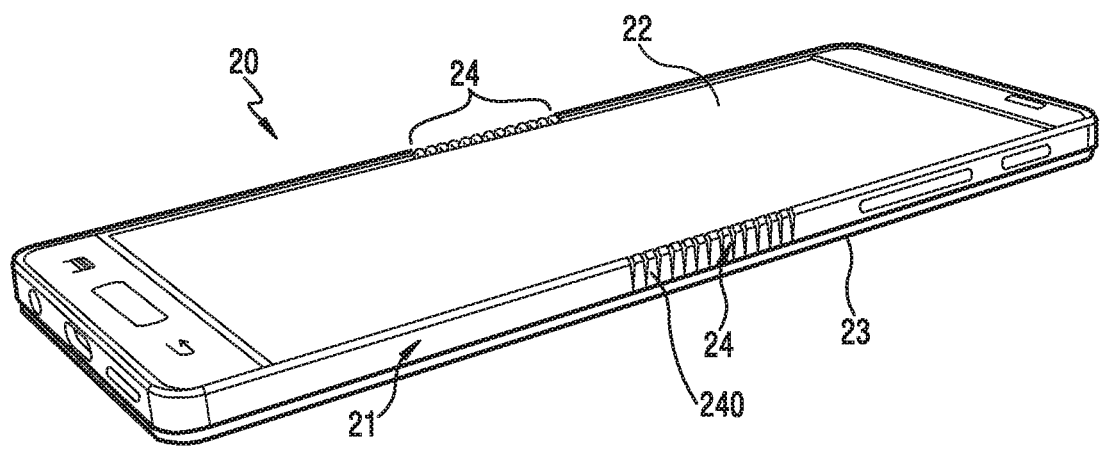
FIG. 2 illustrates a flexible device according to the related art.
Figure 3:
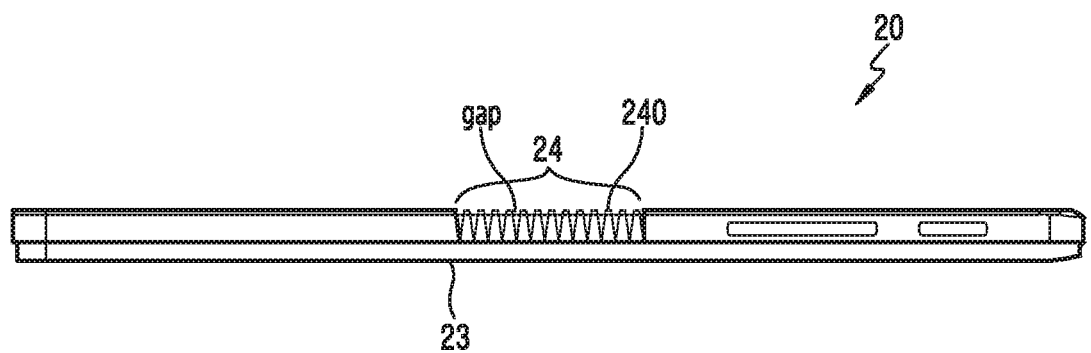
FIG. 3 illustrates a side view of a flexible device according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Expressions, such as "include" or "may include", and the like, that may be used in the disclosure indicate existence of a disclosed relevant function, operation, or element, and the like, and do not limit additional one or more functions, operations, or elements, and the like. In addition, it should be understood that terminologies, such as "include" or "have", and the like, in the disclosure are intended for designating existence of a characteristic, a number, an operation, an element, a part, or a combination of these described on the specification and do not exclude in advance existence or addition possibility of one or more other characteristics, numbers, operations, elements, parts, or a combination of these.

Expression, such as "or", and the like, in embodiments of the present disclosure includes a certain and all combinations of words listed together. For example, "A or B" may include A and may include B, or include both A and B.

In embodiments of the present disclosure, expressions, such as "1st", "2nd", "first" or "second", and the like, may modify various elements of the disclosure but do not limit relevant elements. For example, the expressions do not limit sequence and/or importance, and the like, of relevant elements. The expressions may be used for discriminating one element from another element. For example, both a first user apparatus and a second user apparatus are all user apparatuses, and represent different user apparatuses. For example, a first element may be named as a second element without departing from the scope of the disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

Unless defined differently, all terminologies used herein including technological or scientific terminologies have the same meaning as that generally understood by a person of ordinary skill in the art to which the disclosure belongs. It should be understood that generally used terminologies defined by a dictionary have meaning coinciding with meaning on context of a related technology, and unless clearly defined in the disclosure, they are not understood as an ideal or excessively formal meaning.

An electronic device of disclosure may be a device including a communication function. For example, an electronic device may include at least one of a smartphone, a tablet personal computer (PC), a mobile phone, a video phone, an e-book reader, a desktop PC, a laptop PC, a netbook computer, a personal digital assistant (PDA), a portable multimedia player (PMP), a moving picture experts group phase 1 or phase 2 (MPEG-1 or MPEG-2) audio layer 3 (MP3) player, a mobile medical device, a camera, or a wearable device (e.g., a head-mounted-device (HMD), such as electronic glasses, an electronic clothing, an electronic bracelet, an electronic necklace, an electronic appcessory, an electronic tattoo, a smartwatch, and the like).

According to various embodiments of the present disclosure, an electronic device may be a smart home appliance having a communication function. A smart home appliance may include, for example, at least one of a television (TV), a digital versatile disc (DVD) player, an audio, a refrigerator, an air conditioner, a cleaner, an oven, an electronic range, a washing machine, an air purifier, a set-top box, a TV box (e.g., Samsung HomeSync™, Apple TV™, or Google TV™), game consoles, an electronic dictionary, an electronic key, a camcorder, an electronic frame, and the like.

According to various embodiments of the present disclosure, an electronic device may include at least one of various medical devices (e.g., magnetic resonance angiography (MRA), magnetic resonance imaging (MRI), computed tomography (CT), a shooting device, an ultrasonic device, and the like), a navigation device, a global positioning system (GPS) receiver, an event data recorder (EDR), a flight data recorder (FDR), an automobile infotainment device, electronic equipment for a ship (e.g., a navigation device for a ship, a gyro compass, and the like), an avionics, a security device, or a robot for an industrial use or a home use.

According to various embodiments of the present disclosure, an electronic device may include at least one of a furniture or a portion of a building/structure including a communication function, an electronic board, an electronic signature receiving device, a projector, or various measurement devices (e.g., waterworks, electricity, gas, a radio wave measuring device, and the like). An electronic device according to an embodiment of the present disclosure may be a combination of one or more of the above-described devices. In addition, it will be apparent to one skilled in the art that the electronic device examples of the present disclosure are not limited to the above-described devices.

An electronic device according to various embodiments of the present disclosure is described with reference to the accompanying drawings. A terminology of a user used in various examples may indicate a person who uses an electronic device or a device (e.g., an artificial intelligence electronic device) that uses the electronic device.

FIG. 1 illustrates a network environment including an electronic device according to various embodiments of the present disclosure.

Referring to FIG. 1, an electronic device A101 may include a bus A110, a processor A120, a memory A130, an input/output (I/O) interface A140, a display A150, and a communication interface A160.

The bus A110 may, for example, be a circuit for connecting the above-described elements with each other, and transferring communication (e.g., a control message) between the above-described elements.

The processor A120 may include a central processing unit (CPU), a communications processor (CP), a graphics processing unit (GPU), and the like.

The processor A120 may receive, for example, an instruction from the above-described other elements (e.g., the memory A130, the I/O interface A140, the display A150, or the communication interface A160, and the like) via the bus A110, decipher the received instruction, and execute an operation or a data process corresponding to the deciphered instruction.

The memory A130 may store an instruction or data received from the processor A120 or other elements (e.g., the I/O interface A140, the display A150, or the communication interface A160, and the like), or generated by the processor A120A or other elements. The memory A130 may include, for example, programming modules, such as a kernel A133, a middleware A132, an application programming interface (API) A133, an application A134, and the like. The each of the programming modules may be configured using a software, a firmware, a hardware, e.g., electronic circuitry, or a combination of two or more of these.

The kernel A133 may control or manage system resources (e.g., the bus A110A, the processor A120, or the memory A130, and the like) used for executing an operation or a function implemented in the rest of the programming modules, for example, the middleware A132, the API A133, or the application A134. In addition, the kernel A133 may, for example, provide an interface for allowing the middleware A132, the API A133, or the application A134 to access an individual element of the electronic device A101 and control or manage the same.

The middleware A132 may, for example, perform a mediation role so that the API A133 or the application A134 may communicate with the kernel A133 to give and take data. In addition, in connection with task requests received from the applications A134, the middleware A132 may perform a control function (e.g., scheduling or load balancing) for a task request using, for example, a method of assigning priority that may use a system resource (e.g., the bus A110, the processor A120, or the memory A130, and the like) of the electronic device A101 to at least one application A134.

The API A133 is an interface for allowing the application A134 to control a function provided by the kernel A133 or the middleware A132, and may include at least one interface or function (e.g., an instruction) for file control, window control, image processing, or character control, and the like.

According to various embodiments of the present disclosure, the application A134 may include a short message service (SMS)/multimedia messaging service (MMS) application, an e-mail application, a calendar application, alarm application, a health care application (e.g., an application for measuring quantity of motion or blood sugar, and the like), or an environment information application (e.g., an application providing atmospheric pressure, humidity or temperature information, and the like). Additionally or alternatively, the application A134 may be an application related to information exchange between the electronic device A101 and an external electronic device (e.g., the electronic device A102 or A104). The application related to the information exchange may include, for example, a notification relay application for transferring specific information to the external electronic device or a device management application for managing the external electronic device.

For example, the notification relay application may include a function for transferring notification information generated from a different application (e.g., an SMS/MMS application, an e-mail application, a health care application, or an environment information application) of the electronic device A101 to an external electronic device (e.g., the electronic device A102 or A104). Additionally or alternatively, the notification relay application may, for example, receive notification information from an external electronic device (e.g., the electronic device A102 or A104) and provide the same to a user. The device management application may manage (e.g., install, delete, or update) a function (e.g., turn-on/turn-off of an external electronic device itself (or some constituent part) or luminance (or resolution) control of a display) of an external electronic device (e.g., the electronic device A102 or A104) communicating with the electronic device A101 and an application operating in the external electronic device or a service (e.g., a communication service or a message service) provided by the external electronic device.

According to various embodiments of the present disclosure, the application A134 may include a designated application depending on an attribute (e.g., a type of an electronic device) of the external electronic device (e.g., the electronic device A104). For example, in the case where the external electronic device is an MP3 player, the application A134 may include an application related to music reproduction. Similarly, in the case where the external electronic device is a mobile medical health care device, the application A134 may include an application related to health care.

According to an embodiment of the present disclosure, the application A134 may include at least one of an application designated in the electronic device A101 and an application received from the external electronic device (e.g., the server A106, the electronic device A102 or A104).

The I/O interface A140 may, for example, transfer an instruction or data input from a user via an I/O unit (e.g., a sensor, a keyboard, or a touchscreen) to the processor A120, the memory A130, or the communication interface A160 via the bus A110A, for example. For example, the I/O interface A140 may provide data regarding a user's touch input via the touchscreen to the processor A120. In addition, the I/O interface A140 may, for example, output an instruction or data received via the bus A110 from the processor A120, the memory A130, or the communication interface A160 via the I/O unit (e.g., a speaker or a display). For example, the I/O interface A140 may output voice data processed by the processor A120 to a user via a speaker.

The display A150 may include, for example, a liquid crystal display (LCD), a light emitting diode (LED) display, an organic LED (OLED) display, a micro electro mechanical system (MEMS) display, an electronic paper display, and the like. The display A150 may display various types of contents (for example, text, images, videos, icons, or symbols) for users. The display A150 may include a touch screen, and may receive, for example, a touch, gesture, proximity, or hovering input by using an electronic pen or a part of the user's body.

According to an embodiment of the present disclosure, the display A150 may display a contact list based on a priority of each of the contacts included in the contact list. For example, the priority of the contacts may be determined based on at least one of a transmission history, a transmission frequency, a transmission speed, a charging policy, intimacy, a counterpart's location, a schedule, or application preference.

According to an embodiment of the present disclosure, the display A150 may display a service list based on a priority of each of the applications or services included in the service list. For example, the priority of the applications or services may be determined based on configuration information of a service provider, configuration information of a manufacturer, contact information, application preference, user preference, a use time point, a distance from a target to share contents, a transmission history, and a charging policy.

The communication interface A160 may provide communication between the electronic device A101 and an external device (for example, the electronic device A104 or the server A106). For example, the communication interface A160 may be connected to a network A162 through wireless communication or wired communication, and may communicate with an external device.

The wireless communication may use at least one of, for example, long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM) as a cellular communication protocol.

The wireless communication may include at least one of, for example, Wi-Fi, Bluetooth, Bluetooth low energy (BLE), ZigBee, infrared (IR) communication, and ultrasonic communication as a short-range communication protocol A164.

The wired communication may include, for example, at least one of a universal serial bus (USB), a high definition multimedia interface (HDMI), a recommended standard 232 (RS-232), and a plain old telephone service (POTS).

The network A162 may include at least one of communication networks, such as a computer network (for example, a local area network (LAN) or a wireless area network (WAN)), the Internet, and a telephone network.

The electronic devices A102 and A104 may, for example, be devices of the same type as that the electronic device A101 or devices of different types from that of the electronic device A101.

According to an embodiment of the present disclosure, the server A106 may include a group of one or more servers. According to various embodiments of the present disclosure, all or some of the operations executed in the electronic device A101 may be carried out in another electronic device or a plurality of electronic devices (for example, the electronic device A102 or A104 and the server A106).

According to an embodiment of the present disclosure, when the electronic device 101 should perform some functions or services automatically or by a request, the electronic device 101 may make a request for performing at least some functions related to the functions or services to another device (for example, the electronic device A102 or A104, or the server A106) instead of performing the functions or services by itself or in addition to itself. The electronic device (for example, the electronic device A102 or A104, or the server A106) may carry out the functions requested by the electronic device A101 or additional functions and provide results thereof to the electronic device A101. The electronic device A101A may provide the requested functions or services to another electronic device based on the received results or after additionally processing the received results. To this end, for example, cloud computing, distributed computing, or client-server computing technology may be used.

Hereinafter, descriptions will be made on a flexible device according to various embodiments of the present disclosure and a folding unit thereof with reference to the accompanying drawings.

Hereinafter, descriptions will be made on a configuration of a flexible device according to a first embodiment of the present disclosure with reference to FIGS. 4 to 7.

Figure 4:
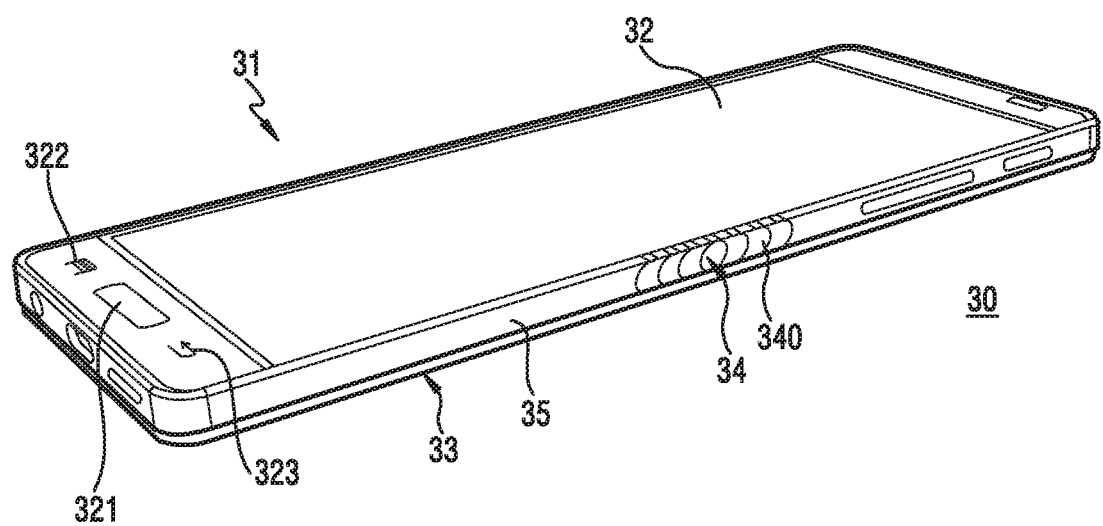
FIG. 4 illustrates a front face of a flexible device according to various embodiments of the present disclosure.

FIG. 4 illustrates a front face of a flexible device according to various embodiments of the present disclosure.

Figure 5:
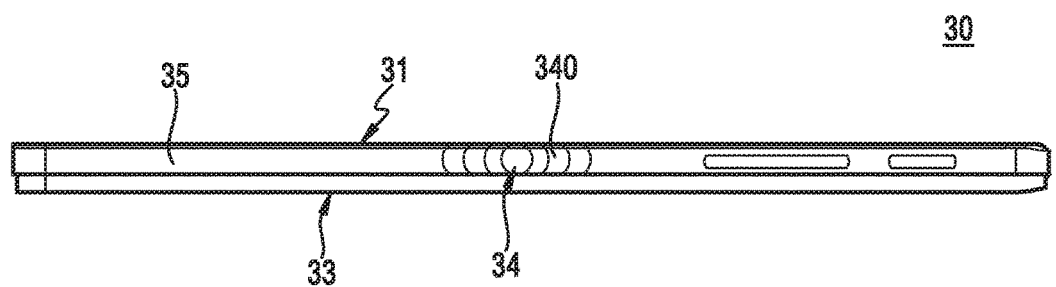
FIG. 5 illustrates a side view of a flexible device according to various embodiments of the present disclosure.

FIG. 5 illustrates a flexible device according to various embodiments of the present disclosure.

Figure 6:
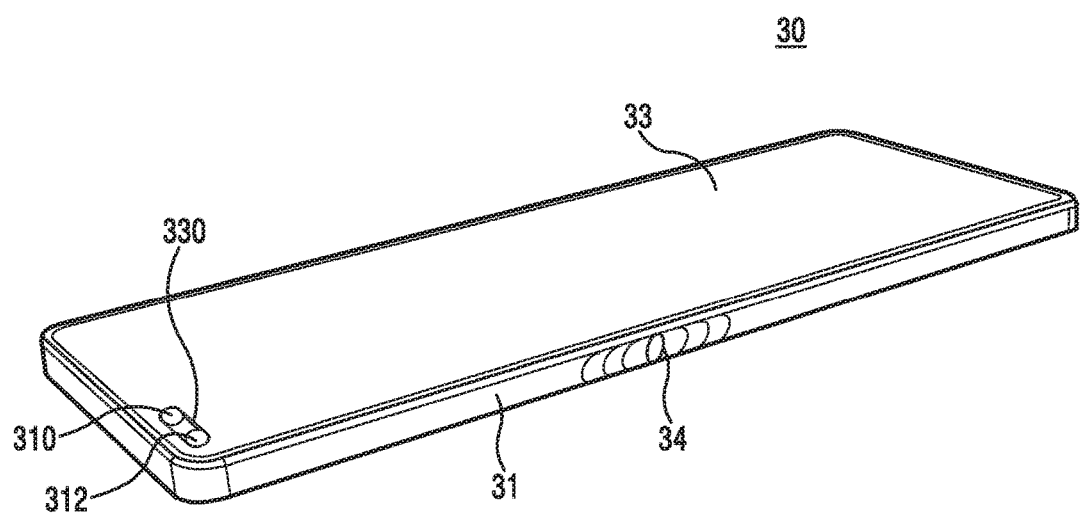
FIG. 6 illustrates a rear face of a flexible device according to various embodiments of the present disclosure.

FIG. 6 illustrates a rear face of a flexible device according to various embodiments of the present disclosure.

Figure 7:
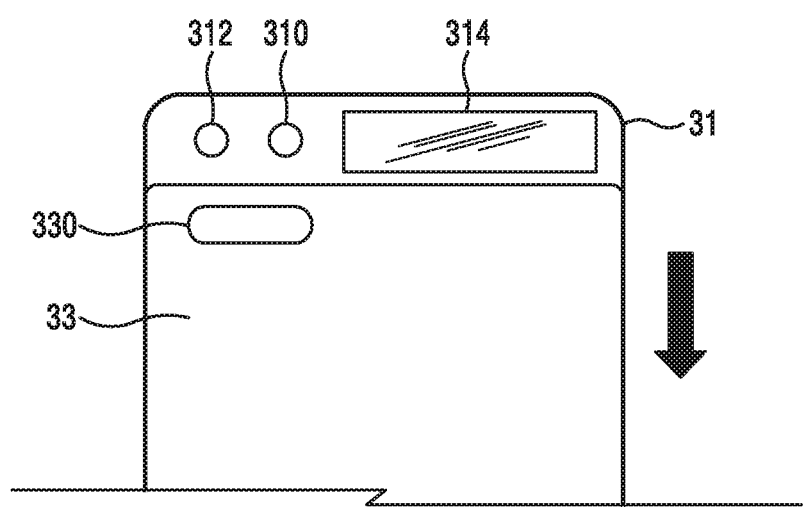
FIG. 7 illustrates auxiliary devices disposed on a portion of a rear face of a folded flexible device according to various embodiments of the present disclosure.

FIG. 7 illustrates a rear view of auxiliary devices disposed on a portion of a rear face of a folded flexible device according to various embodiments of the present disclosure Referring to FIGS. 4 to 7, a flexible device 30 according to various embodiments of the present disclosure may refer to a portable device that includes a main body 31 configured to be curved, bent, or folded. Accordingly, the flexible device 30 may have a folding unit and a folding axis center. In addition, a display 32 provided on the main body 31 is a flexible display, and the flexible display 32 may be curved, bent, or flexed together with the main body 31.

According to various embodiments of the present disclosure, the flexible device 30 may include the main body 31, the flexible display 32, an auxiliary device, and a cover 33. In the flexible device 30, the flexible display 32 may be disposed on a first face of the main body 31, and the auxiliary device may be disposed on a second face of the main body 31. The first face may refer to the bottom face of the main body, and the second face may refer to the rear face of the main body. The flexible display may be fixed to the first face of the main body. The auxiliary device may be disposed on a first region of the second face that is opposite to the first face of the main body.

The auxiliary device may include, for example, an auxiliary display 314, a rear camera 310, or a flash 312.

The first region where the auxiliary device is disposed may be the upper end region of the second face of the main body 31. The first region may be opposite to a receiver (including a front camera, a proximity sensor, or an illuminance sensor (not illustrated)) that is disposed on the upper end of the first face of the main body 31.

According to various embodiments of the present disclosure, the flexible display 32 is disposed on the first face of the main body 31, as described above. The flexible display 32 may include a touch screen. The touch screen may be configured as a large screen so as to occupy the greater portion of the front face of the flexible device 30. A main home screen may be displayed on the flexible display 32. The main home screen may refer to the first screen that is displayed on the touch screen when the power of the flexible device 30 is turned on. In addition, when the flexible device 30 has several pages of different home screens, the main home screen may be the first home screen among the several pages of home screens. The home screen may display shortcut icons so as to execute frequently used applications, a main menu switching key, time, weather, and the like. The main menu switching key causes the main screen to be displayed on the touch screen. In addition, in the upper end of the touch screen, status bars may be formed to indicate the statuses of the flexible device 30, such as a battery charge status, a received signal strength, and the current time. Below the flexible display 32, a home button 321, a menu button 322, and a back button 323 may be formed.

The home button (home key) 321 may cause the main home screen to be displayed on the touch screen. For example, when the home key 321 is touched in the state where a home screen, which is different from the main home screen, or the menu screen is displayed on the touch screen, the main home screen may be displayed on the touch screen. In addition, when the home button 321 is touched while applications are executed on the touch screen, the main home screen may be displayed on the touch screen. In addition, the home button may be used in order to cause the touch screen to display the most recently used application or a task manager.

The menu button 322 provides a connection menu that may be used on the touch screen. The connection menu may include, for example, a widget addition menu, a background screen change menu, a retrieve menu, an edition menu, or an environment setting menu. The back button 323 may cause the screen, which was executed just prior to the currently executed screen, to be displayed, or may cause the most recently used application to be terminated. In the upper end region of the first face of the flexible device 30, for example, a receiver, a first camera, an illuminance sensor, and a proximity sensor may be arranged.

According to various embodiments of the present disclosure, for example, a power/reset button, a volume button, and one or more microphones may be arranged on a side rim portion of the flexible device 30.

In addition, according to various embodiments of the present disclosure, a connector is formed on the lower end side face of the flexible device 30. A plurality of electrodes may be formed in the connector, and the connector may be connected to an external device via a wire. An earphone connecting jack (not illustrated) may be arranged on the upper end side face of the flexible device 30. An earphone may be inserted into the earphone connecting jack. The earphone connecting jack may be arranged on the lower end side face of the flexible device 30.

According to various embodiments of the present disclosure, the main body 31 of the flexible device 30 may be configured as a foldable main body by a folding unit 34. In addition, the main body 31 may include a foldable portion made of a flexible material and a non-flexible portion made of a rigid material.

Further, according to various embodiments of the present disclosure, the flexible display 32 may be made of a flexible material such that the flexible display 32 may be disposed in a flat form or a rolled form, or may be disposed to be curved, bent, or folded. The flexible display 32 may be provided with a folding axis center by the folding unit 34, and the folding axis center may operate as a hinge axis.

The main body 31 may include a main board (not illustrated) and electronic components mounted on the main board. The main board (not illustrated) may be configured to have an articulated structure by a flexible printed circuit unit. The flexible printed circuit unit may be disposed to pass through the folding unit 34. The folding unit 34 may be formed in the foldable portion of the main body 31.

When the main body 31 is curved, bent, or folded, a difference in elongation may occur in the folded portion. In other words, in the folded portion of the main body 31, compressive stress is applied in the inner area of the folded portion while tensile stress is applied in the outer area of the folded portion. This may not cause an issue in the flexible display 32 that is provided to the main body 31 since the flexible display 32 is a thin flexible display. However, in the main body 31, a substantially large difference in elongation may occur compared with that in the flexible display 32. The issue in the main body 31 can be addressed by providing the folding unit 34, and the issue caused in the cover 33 due to the difference in elongation can be addressed by mounting the cover 33 to be slidable on the other face of the main body 31.

The cover 33 may be mounted to be slidable in the longitudinal direction of the main body 31 while maintaining the state of facing the other face of the main body 31. When the main body 31 is curved, bent, or folded, the cover 33 may be slid while maintaining the state of facing the main body 31. As will be described below, a sliding module may be mounted between the main body 31 and the cover 33.

As the main body 31 is more curved, bent, or folded, the sliding displacement of the cover 33 also increases. In the state where the flexible device is unfolded (e.g., in the horizontal state), the cover 33 may completely close the second face of the main body 31 without being moved. In addition, in the state where the flexible device is completely folded, the cover 33 is slid most greatly so that the widest portion can be opened on the second face of the main body 31. The cover 33 may also be provided with a foldable portion in an area where the cover 33 faces the folding unit 34. For this purpose, the cover 33 may be made of a flexible material that may provide a feeling of quality (e.g., a leather material). In addition, the cover 33 may be configured to have an exterior cover function to protect the main body 31 or to be exchangeable from the main body 31 while pursuing the user's personality by using various flexible materials or various colors.

Referring to FIGS. 6 and 7, according to various embodiments of the present disclosure, the flexible device 30 may be used in a state where the user interface (UI) environment is expanded by disposing an auxiliary device on the second face of the main body 31. The second face of the main body 31 may be divided into a first region where the auxiliary device is mounted, and a second region where the auxiliary device is not mounted.

According to various embodiments of the present disclosure, the flexible device 30 may include a cover 33 that is coupled to face the second face of the main body 31. One side portion of the cover 33 may be fixed to the second face of the main body 31, and the other side portion may be coupled to the sliding module to be movable. When the flexible device 30 is curved, bent, or folded, the cover 33 may be moved. In addition, the cover 33 is configured to have an area to cover the whole of the second face of the main body 31 such that, when the flexible device 30 is in the unfolded state (e.g., in the horizontal state), the cover 33 may close the second face of the main body 31.

According to various embodiments of the present disclosure, the auxiliary device may be closed by the cover 33 in the state where the flexible device 30 is unfolded, and may be opened in the state where the flexible device 30 is folded. The opening of the auxiliary device may be performed by the movement of the other side portion of the cover 33.

According to various embodiments of the present disclosure, the auxiliary device may include, for example, an auxiliary display 314, a rear camera 310, or a flash 312. The auxiliary display 314, the rear camera 310, and the flash 312 may be arranged side by side.

According to various embodiments of the present disclosure, the cover 33 may be an exterior cover that is mounted on the second face of the main body 31 so as to protect the second face. An opening 330 may be formed in order to use the rear camera 310 and the flash 312 in the state where the flexible device 30 is unfolded (e.g., when the flexible device 30 is in the horizontal state). In the state where the flexible device 30 is unfolded, the rear camera 310 and the flash 312 may be opened to be used by the opening 330.

Hereinafter, descriptions will be made on a configuration of a flexible device according to a second embodiment of the present disclosure with reference to FIGS. 8 to 11.

Figure 8:
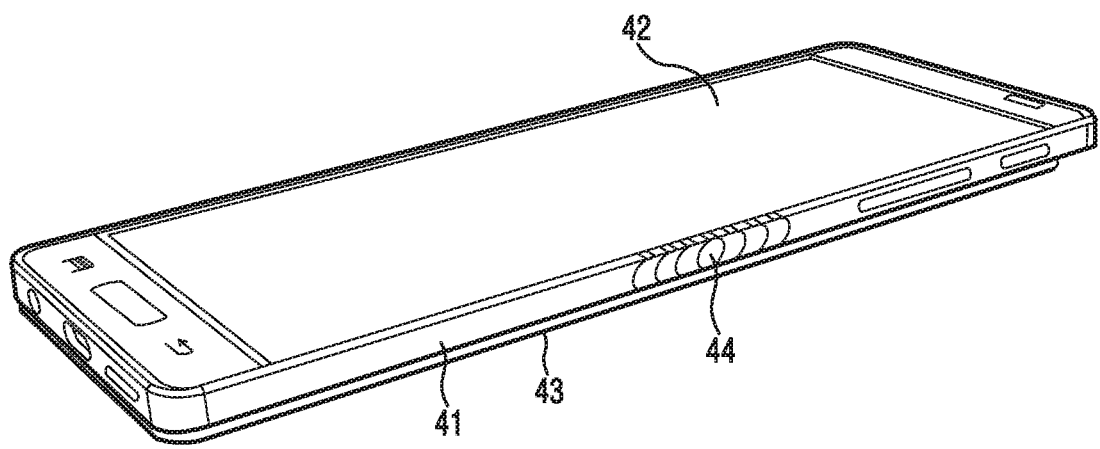
FIG. 8 illustrates a front face of a flexible device according to various embodiments of the present disclosure.

FIG. 8 illustrates a front face of a flexible device according to various embodiments of the present disclosure.

Figure 9:
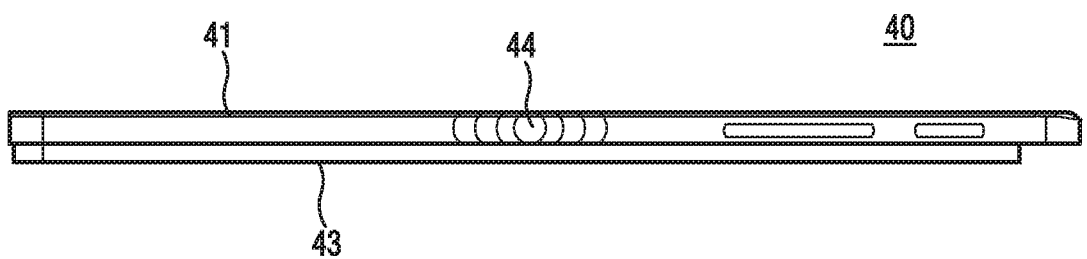
FIG. 9 illustrates a side view of a flexible device according to various embodiments of the present disclosure.

FIG. 9 illustrates a side view of a flexible device according to various embodiments of the present disclosure.

Figure 10:
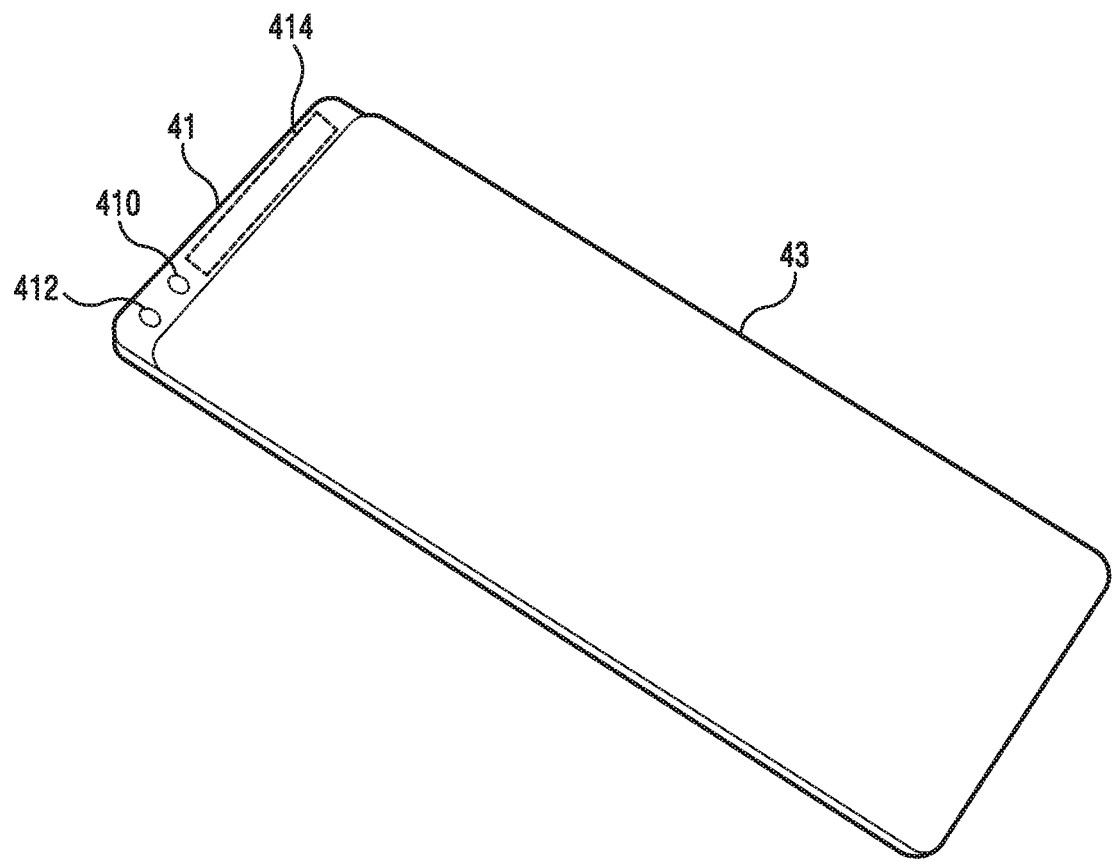
FIG. 10 illustrates a rear face of a flexible device according to various embodiments of the present disclosure.

FIG. 10 illustrates a rear face of a flexible device according to various embodiments of the present disclosure.

Figure 11:
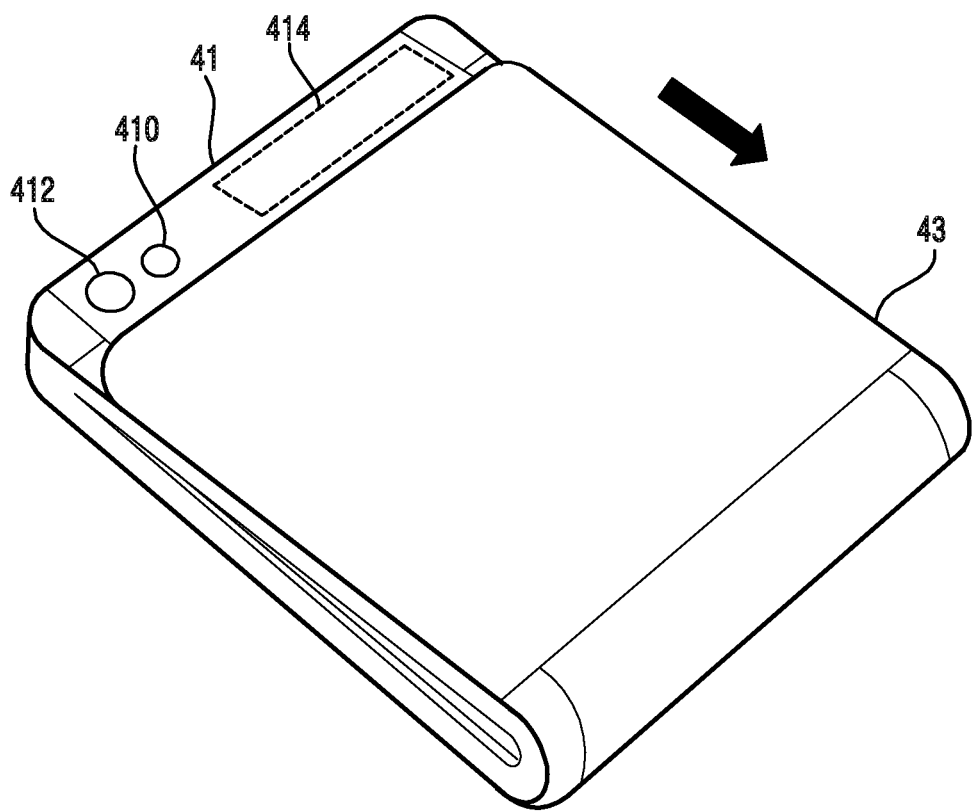
FIG. 11 illustrates auxiliary devices disposed on a portion of a rear face of a folded flexible device according to various embodiments of the present disclosure.

FIG. 11 illustrates a front view of auxiliary devices disposed on a portion of a rear face of a folded flexible device according to various embodiments of the present disclosure.

Referring to FIGS. 8 to 11, since the components of the flexible device according to various embodiments are similar to those of the flexible device illustrated in FIGS. 4 to 7 except for the configuration of a cover 43, descriptions for the similar components will be omitted.

According to various embodiments of the present disclosure, the cover 43 may be configured to have an area to cover a region remaining in the second face of a main body 41 excluding the region where the auxiliary device is disposed, rather than to have an area to cover the second face including the auxiliary devices. In the state where the flexible device 40 is unfolded (e.g., when the flexible device 40 is in the horizontal state), the auxiliary devices, including the flexible display 42, disposed in the upper end region of the second face of the main body 41 may be in the opened state. In other words, the auxiliary devices may always be opened to be exposed. The auxiliary devices may include, for example, an auxiliary display 414, a rear camera 410, and a flash 412.

Referring to FIGS. 10 and 11, when the flexible device 40 is in the folded state, the opened region of the second face of the main body 41 may be expanded due to the movement of the cover 43. For example, as the region of the second face, in which the auxiliary devices are disposed, is expanded, the opened area of the auxiliary display 414 disposed in the region may also be expanded to be used. The opened area of the exposed auxiliary display 414 may also increase in proportion to the folded degree of the flexible device 40.

Hereinafter, descriptions will be made on the configuration of the flexible device 30 according to various embodiments of the present disclosure with reference to FIGS. 4 to 5.

According to various embodiments of the present disclosure, the flexible device 30 may include the main body 31, the flexible device 32, an outer metal frame 35, and the folding unit 34. Since the main body 31 and the flexible display 32 have been described above with reference to FIGS. 4 to 7, detailed descriptions thereof will be omitted.

According to various embodiments of the present disclosure, the main body 31 may include the outer metal frame 35 configured to enclose the side rim of the main body 31. The outer metal frame 35 may be configured to enclose all the side faces of the main body 31 so as to partially contribute to the design of the exterior appearance of the flexible device 30 and to provide a function of protecting the main body 31. As described above, the main body 31 may include the folding unit 34 such that the main body 31 can be curved, bent, or folded. However, a portion of the folding unit 34 may be disposed as a portion of the outer metal frame 35. The folding unit 34 is mounted in the main body 31 so as to allow the main body 31 to be folded/unfolded.

According to various embodiments of the present disclosure, the folding unit 34 may be made of a metallic material, and may include a plurality of folding members 340 that are rotatably connected to each other and are arranged side by side.

According to various embodiments of the present disclosure, the plurality of folding members 340 may be mounted in the main body 31 and may be disposed such that the opposite end portions thereof are exposed and the remaining portions excluding the opposite end portions are concealed within the main body 31. In addition, the opposite end portions may be arranged as a portion of the outer metal frame 35 in the foldable portion of the main body 31. For example, the opposite end portions may serve as a portion of the outer metal frame 35.

As will be described below, no gap may exist between the opposite end portions of respective folding members 340. In addition, no gap may exist between the opposite ends of the folding members 340 and the outer metal frame 35 that is in contact with the folding members 340.

Figure 12:
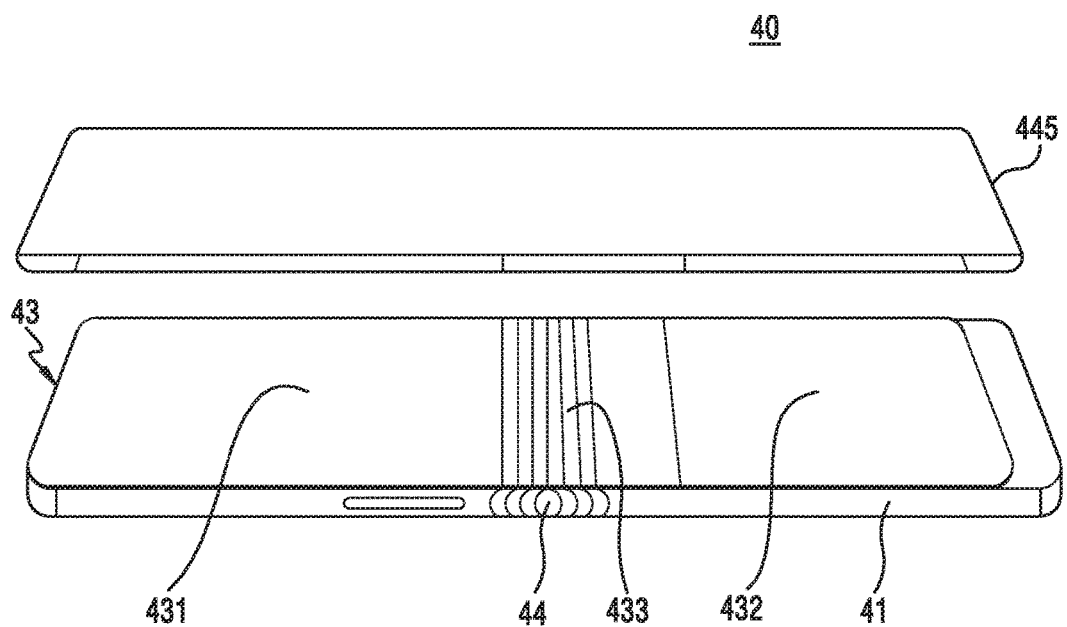
FIG. 12 illustrates a configuration of a cover that is provided to a flexible device according to various embodiments of the present disclosure.

FIG. 12 illustrates a configuration of a cover that is provided in a flexible device according to various embodiments of the present disclosure.

Descriptions will be made on the internal structure of a cover 43 mounted on a flexible device 40 according to various embodiments with reference to FIG. 12.

Referring to FIG. 12, according to various embodiments of the present disclosure, the cover 43 may include one or more inner skins 431, 432, and 433, and an outer skin 445. The inner skins may include first to third inner skins 431 to 433, in which the first and second inner skins 431 and 432 may be made of a rigid material and the third inner skin 433 may be made of a flexible material. In addition, the outer skin 445, to which the first to third inner skins 431 to 433 are coupled, may be made of a flexible material. The third inner skin 433 may be arranged between the first and second inner skins 431 and 432 in parallel with the first and second inner skins 431 and 432 without overlapping with the first and second inner skins 431 and 432. The rigid material may include a hard plastic or metallic material, and the flexible material may include, for example, a flexible natural or artificial leather.

The first inner skin 431 may be fastened to one side portion of the second face of the main body 41, and the second inner skin 432 may be coupled to the sliding module disposed on the second face of the main body 41. The outer skin 445 may be configured to have an area that is sufficient to cover the first to third inner skins 431 to 433. In addition, the outer skin 445 may be provided with various colors or patterns.

Hereinafter, descriptions will be made on a mounting position of a folding unit that is adopted in a flexible device.

Figure 13:
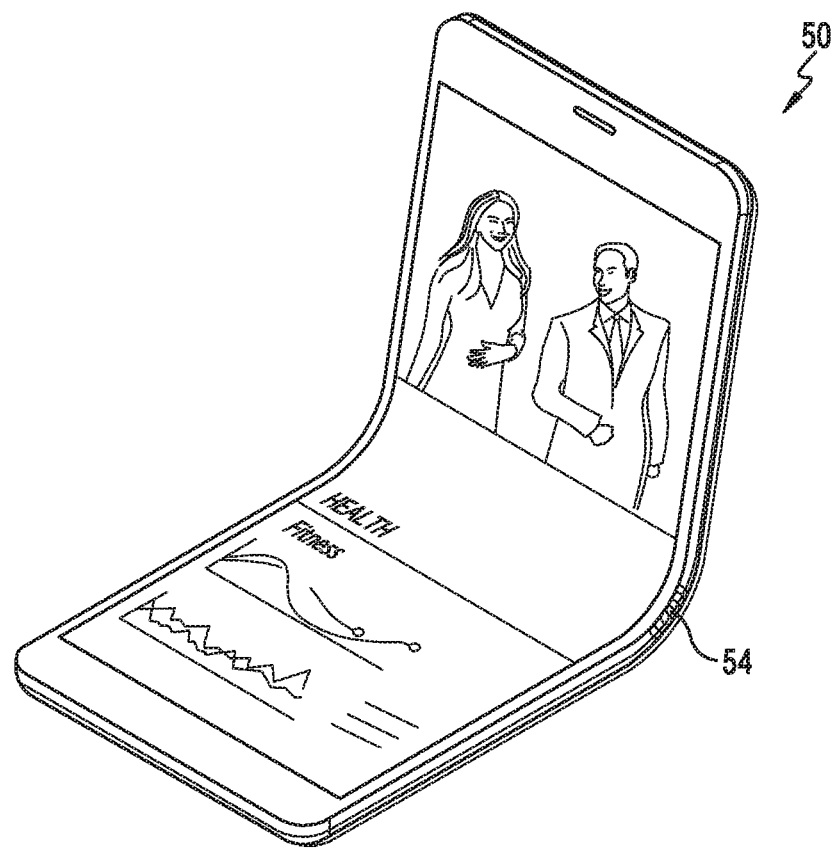
FIG. 13 illustrates a flexible device according to various embodiments of the present disclosure.

FIG. 13 illustrates a flexible device according to various embodiments of the present disclosure.

Figure 14:
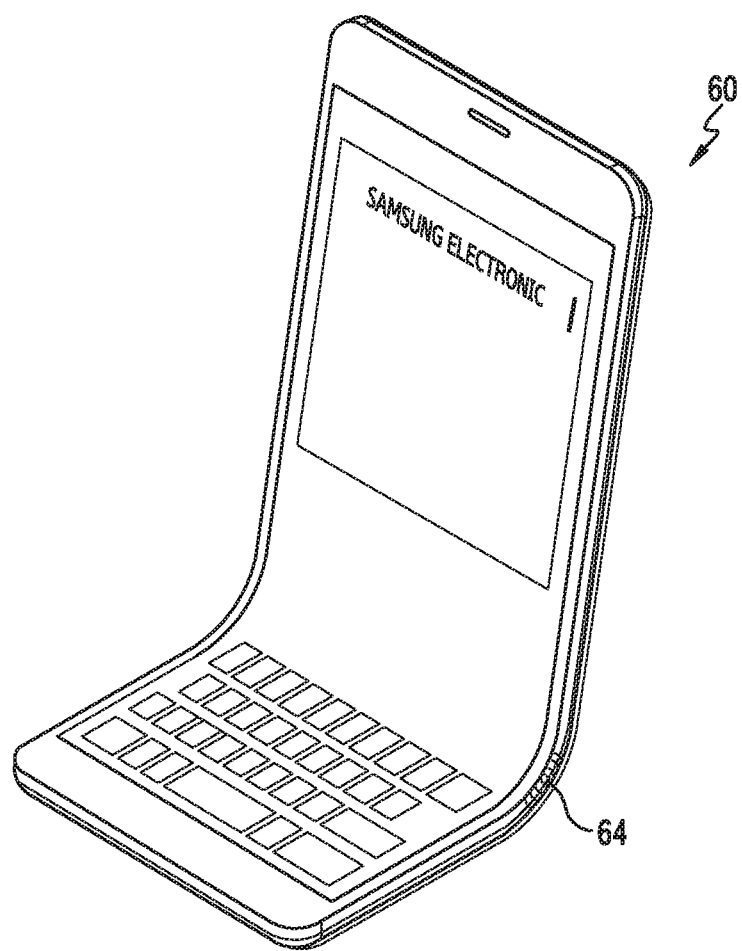
FIG. 14 illustrates a flexible device according to various embodiments of the present disclosure.

FIG. 14 illustrates a flexible device according to various embodiments of the present disclosure.

Referring to FIG. 13, according to various embodiments of the present disclosure, the folding unit may be disposed at a location of about 5:5 of a flexible device 50. For example, the flexible device 50 may be folded in half by a folding unit 54.

Referring to FIG. 14, according to various embodiments of the present disclosure, the folding unit may be disposed at a location of about 3:7 of a flexible device 60. For example, about one third of the flexible device 60 may be folded by a folding unit 64.

Figure 15:
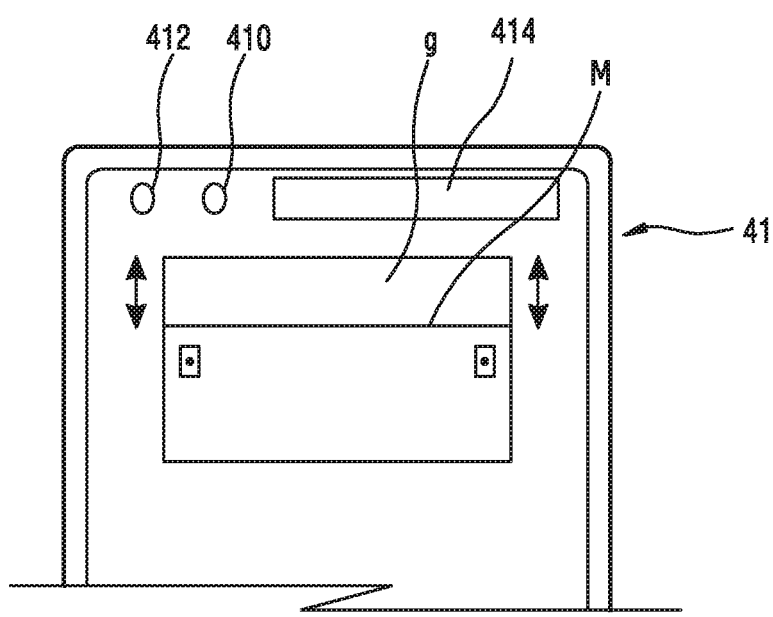
FIG. 15 illustrates a rear view of a sliding module that is mounted on a flexible device according to various embodiments of the present disclosure.

FIG. 15 illustrates a rear view of a sliding module that is mounted on a flexible device according to various embodiments of the present disclosure.

Referring to FIG. 15, according to various embodiments of the present disclosure, the cover 43 may move by a sliding module M that is disposed on the second face of the main body 41. At least a portion of the cover 43 is fixed to the sliding module M, and the sliding module M is slid within a sliding recess g on the second face of the main body 41 such that one side of the cover 43 may be moved while maintaining the state where the cover 43 faces the second face of the main body.

Hereinafter, descriptions will be made on the configuration of a folding unit 44 that is adopted in the flexible device 40. The flexible device 40 may be curved, bent, or folded by the folding unit 44. Accordingly, the flexible display, the main body 41, and the cover 43, which constitute the flexible device, may be curved, bent, or folded together.

Figure 16:
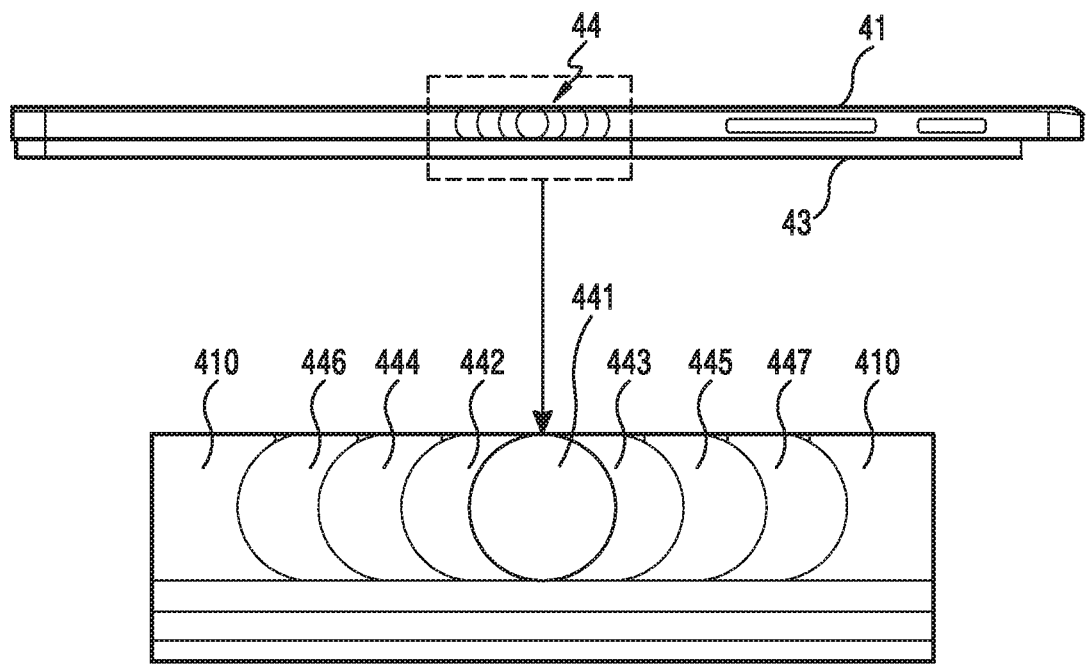
FIG. 16 illustrates a side view of a folding unit of a flexible device according to various embodiments of the present disclosure.

FIG. 16 illustrates a side view of a folding unit of a flexible device according to various embodiments of the present disclosure.

Figure 17:
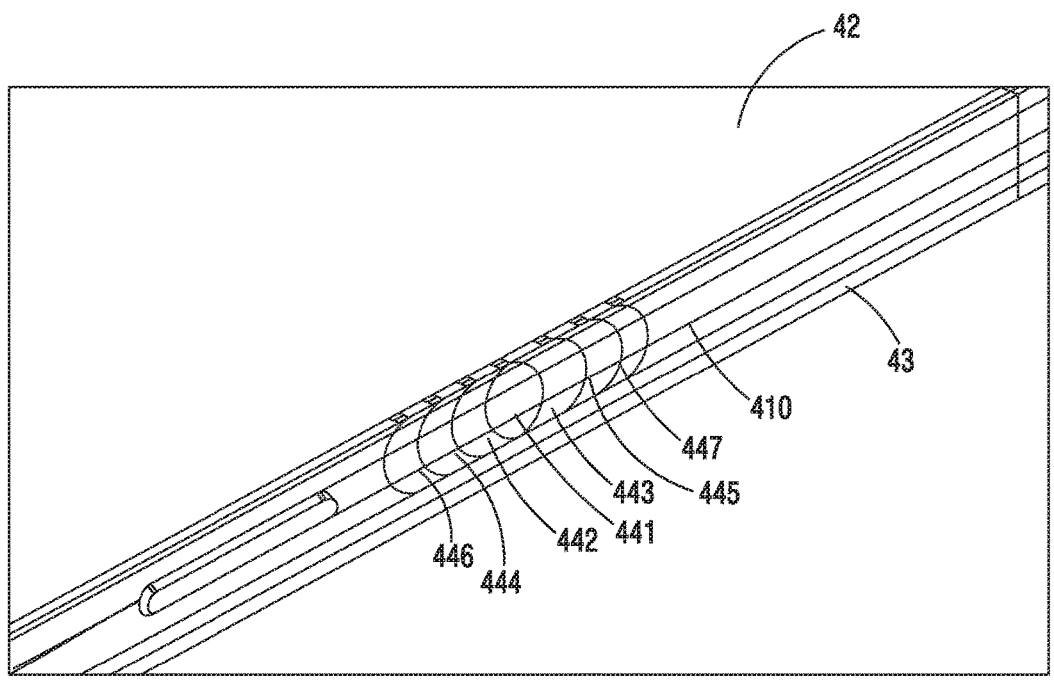
FIG. 17 illustrates a portion of a folding unit of a flexible device according to various embodiments of the present disclosure.

FIG. 17 illustrates a portion of a folding unit of a flexible device according to various embodiments of the present disclosure.

Figure 18:
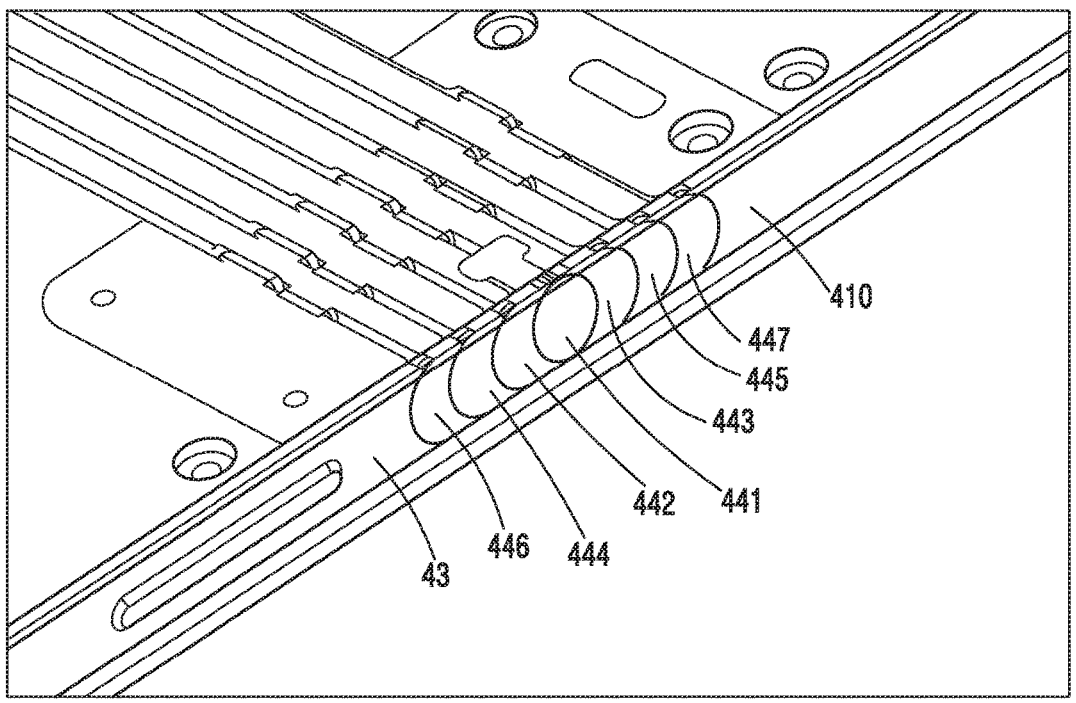
FIG. 18 illustrates a portion of a folding unit of a flexible device in a state where a flexible display is removed according to various embodiments of the present disclosure.

FIG. 18 illustrates a portion of a folding unit of a flexible device in a state where a flexible display is removed according to various embodiments of the present disclosure.

Referring to FIGS. 16 to 18, descriptions will be made on a structure in which the folding unit 44 is disposed at the 5:5 location (middle point) of the main body 41 such that the main body 41 can be folded in half by the folding unit 44.

According to various embodiments of the present disclosure, the folding unit 44 is mounted in the main body 41 so as to allow the main body 41 to be curved, bent, or folded. For this purpose, the folding unit 44 may include a plurality of folding members 441 to 447. The folding function can be performed by the interconnection between the respective folding members 441 to 447.

As described above, according to various embodiments of the present disclosure, the folding unit 44 may be disposed such that only the opposite end portions thereof are exposed to the outside from the main body 41 to be arranged as a portion of the outer metal frame 410, and the remaining portion is concealed within the main body 41 (see FIG. 17). Now, descriptions will be made on a folding unit 44 that includes, for example, seven folding members 441 to 447 based on the thickness of the flexible display and the thickness of the main body 41.

According to various embodiments of the present disclosure, the folding unit 44 may include first to seventh folding members 441 to 447. Here, it is not necessary to limit the number of folding members forming the folding unit to seven. The optimum number of the folding members may be determined based on the thickness of the flexible display and the thickness of the main body. Among the first to seventh folding members 441 to 447, the second and third folding members 442 and 443 may be arranged to be symmetric to each other with reference to the first folding member 441, the fourth and fifth folding members 444 and 445 may be arranged next to the second and third folding members 442 and 443, respectively, to be symmetric to each other, and the sixth and seventh folding members 446 and 447 may be arranged next to the fourth and fifth folding members 444 and 445, respectively, to be symmetric to each other. The second, fourth, and sixth folding members 442, 444, and 446 may be sequentially arranged at one side of the first folding member 441, the third, fifth, and seventh folding members 443, 445, and 447 may be sequentially arranged at the other side of the first folding member 441, and the second, fourth, and sixth folding members 442, 444, and 446 and the third, fifth, and seventh folding members 443, 445, and 447 may be arranged symmetric to each other with reference to the first folding member 441. The respective folding members 442 to 447 may be rotatably connected to each other by a hinge structure to be described later. In addition, each of the sixth and seventh folding members 446 and 447 may be connected to the outer metal frame 410.

Figure 19:
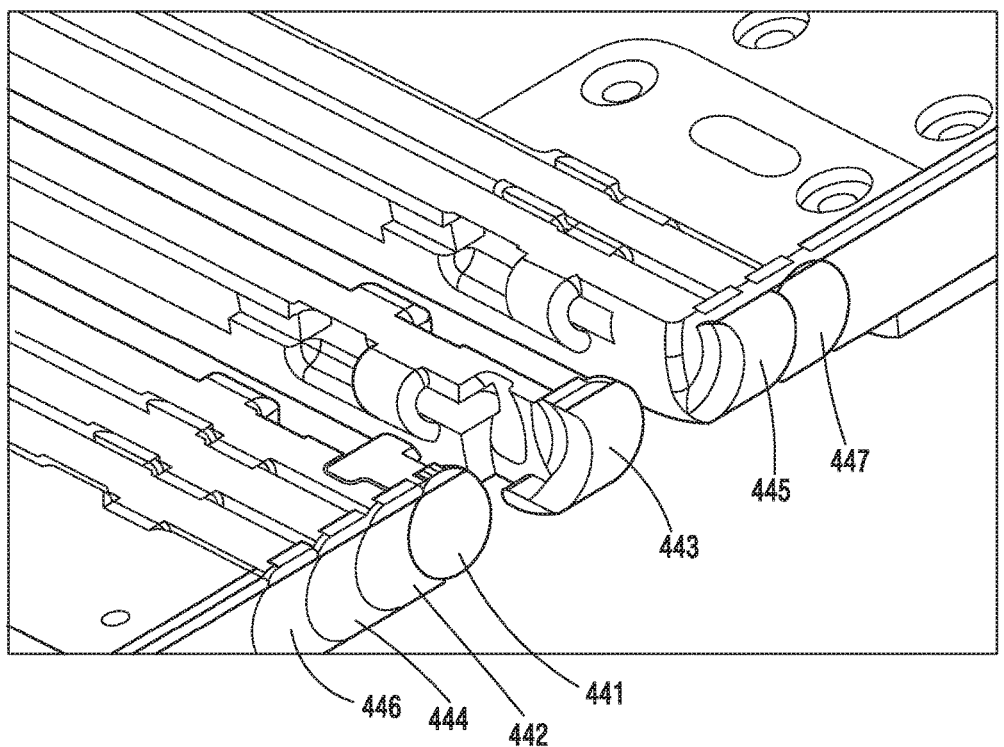
FIG. 19 illustrates a portion of a plurality of folding members of a flexible device according to various embodiments of the present disclosure.

FIG. 19 illustrates a portion of a plurality of folding members of a flexible device according to various embodiments of the present disclosure.

FIGS. 20A to 20D illustrates a first folding member of a folding unit according to various embodiments of the present disclosure.

Figure 20A:
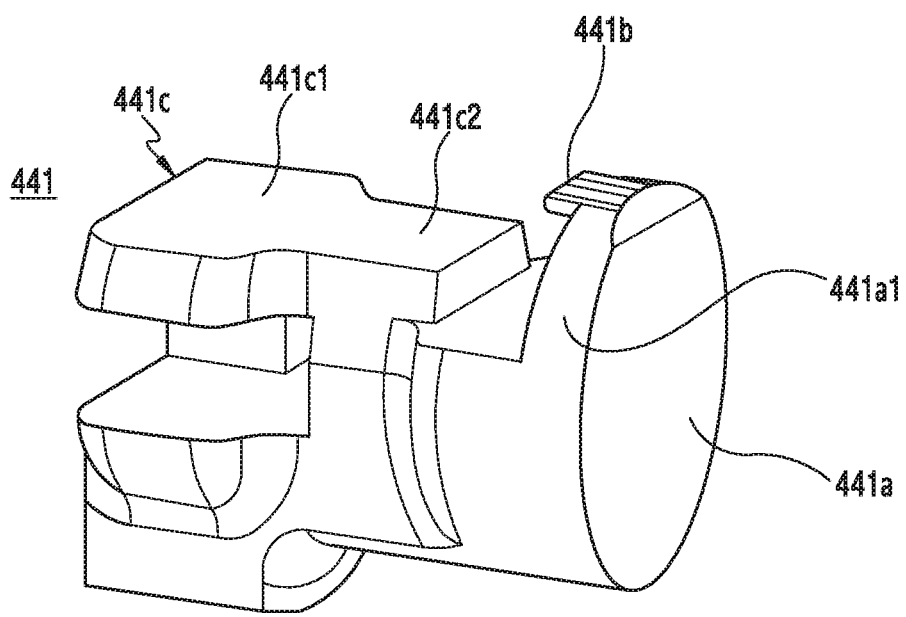
FIGS. 20A to 20D illustrate a first folding member of a folding unit according to various embodiments of the present disclosure.
Figure 20B:
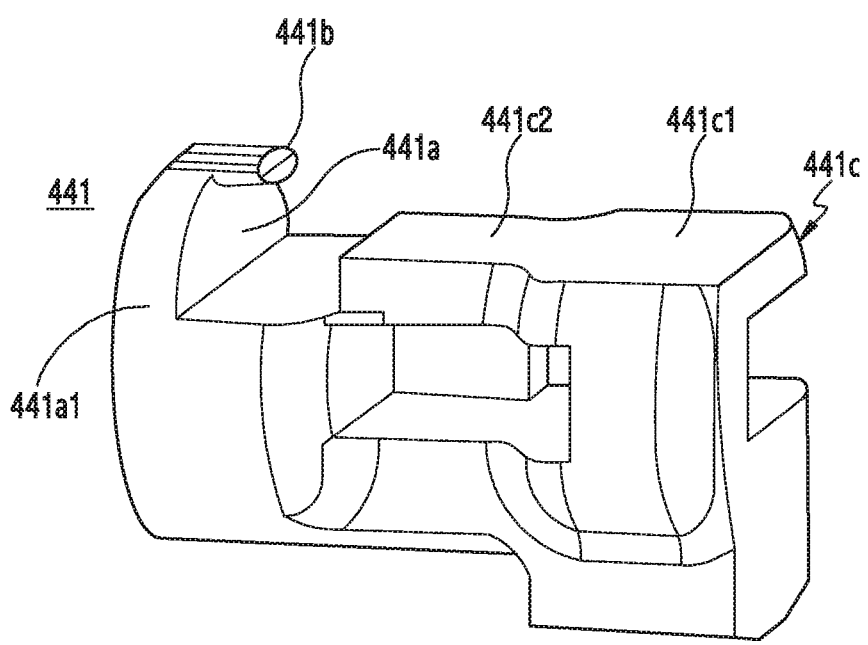
Figure 20C:
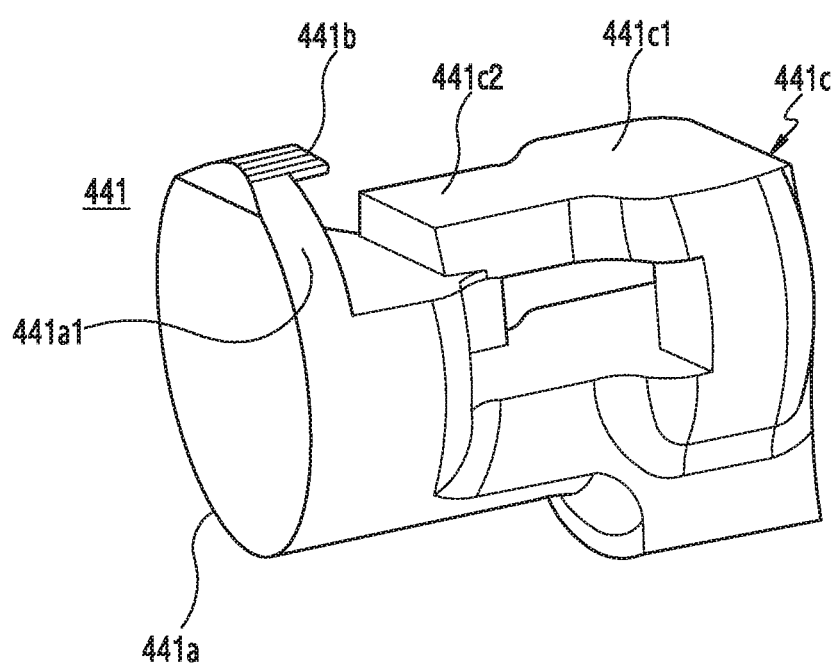
Figure 20D:
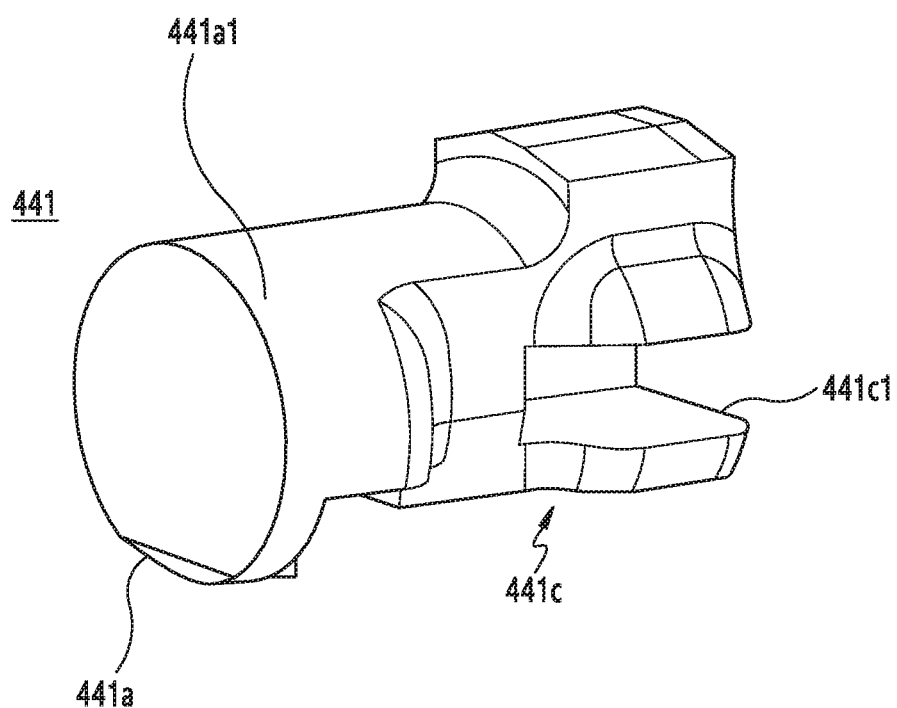

Referring to FIGS. 19 to 20D, according to various embodiments of the present disclosure, the first folding member 441 may serve as a central folding member, and may include an end portion 441a, a stopper 441b, and an outward separation prevention portion 441c. The end portion 441a and the stopper 441b may be exposed to the outside and may form a portion of the outer metal frame, and the outward separation prevention member 441c may be disposed to be concealed within the main body 41. The end portion 441a, the stopper 441b, and the outward separation prevention portion 441c may be integrally formed with each other using a metallic material.

The end portion 441a may be formed in a disc shape to have an outer peripheral surface 441a1. The stopper 441b may be formed in the top portion of the outer peripheral surface 441a1. The outer peripheral surface 441a1 is a portion to be slid in the state of being in surface contact with a folding member interlocked therewith during the folding/unfolding operation such that no gap may be generated between the interlocked folding members when they are interlocked with each other.

The stopper 441b may be formed to protrude inwardly from the outer peripheral surface 441a1. During the folding operation, the stopper 441b is interlocked with a folding member next to the stopper 441b so as to limit the sliding movement between the interlocked folding members.

The outward separation prevention portion 441c may be configured by two portions inwardly from the main body. More specifically, the outward separation prevention portion 441c may be configured by an inner wide portion 441c1 and an outer narrow portion 441c2 in order to prevent the folding member from being outwardly separated after it is assembled with another folding member. The narrow portion 441c2 and the stopper 441b may be opposite to each other. The outward separation prevention portion 441c may be prevented from being separated by being restrained by the assembled state with the interlocked folding member.

A pair of first folding members 441 may be provided on the opposite ends of each folding unit 44 to be symmetric to each other and to be opposite to each other.

Figure 21A:
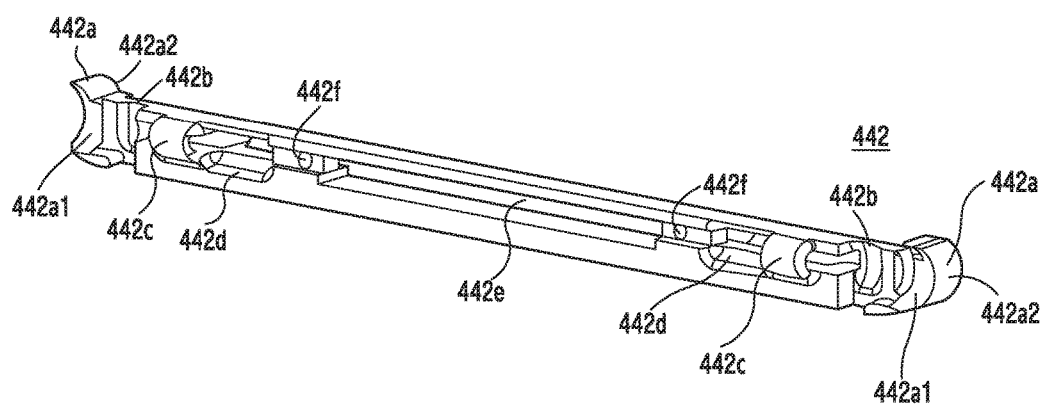
FIGS. 21A to 21C illustrate a second folding member of a folding unit according to various embodiments of the present disclosure.
Figure 21B:
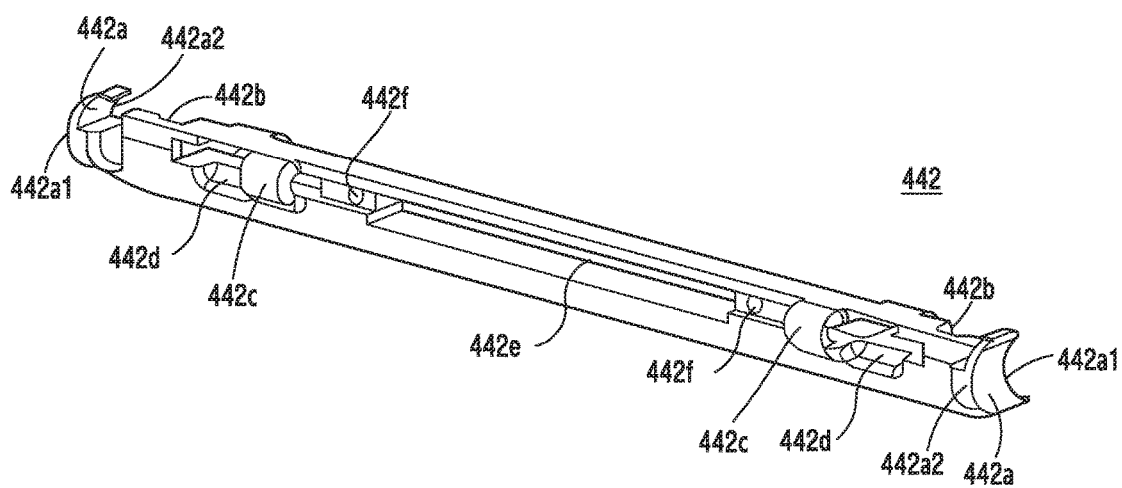
Figure 21C:
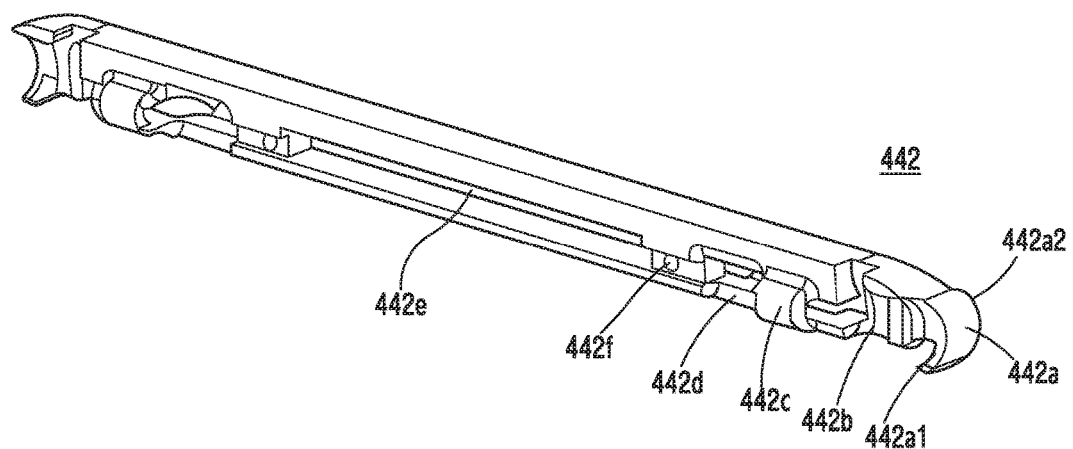

FIGS. 21A to 21C illustrate a second folding member of a folding unit according to various embodiments of the present disclosure.

Referring to FIGS. 21A to 21C, descriptions will be made on the configurations of the second to seventh folding members 442 to 447 that perform the folding/unfolding operation with the first folding member with reference to FIGS. 21A to 21C. Since each of the second to seventh folding members 442 to 447 has the same configuration, only the second folding member 442 will be described.

According to various embodiments of the present disclosure, the second folding member is a member assembled to one side of first folding members, which are positioned at the opposite ends of the folding unit, respectively, to be interlocked with the other folding members, and may be rotatably connected by a hinge unit. The hinge unit provides a rotating axis between folding members, and may include a hinge arm, a hinge arm recess, and a hinge pin (not illustrated).

According to various embodiments of the present disclosure, the second folding member 442 may include opposite end portions 442a, one or more separation prevention openings 442b, one or more hinge arms 442c, one or more hinge arm recesses 442d, a central opening 442e, and one or more assembly holes 442f. The second folding member 442 may have a configuration, in which the central opening 442e is formed at the center thereof, the hinge arms 442c/the hinge arm recesses 442d are arranged at the opposite sides with reference to the central opening 442e, and then the separation prevention openings 442b and the opposite end portions 442a are arranged next to the hinge arms 442c/the hinge arm recesses 442d, respectively.

The opening 442e extending in the longitudinal direction of the folding member in the central region of the second folding member 442 may be a passage through which a flexible printed circuit board (FPCB) passes. The flexible device may be divided into one side portion and the other side portion with reference to the folding unit, in which the one side portion and the other side portion may be electrically connected with each other by using the flexible printed circuit board through the opening 442e.

The opposite end portions 442a are exposed to the outside such that the opposite end portions 442a may serve as a portion of the outer metal frame or may come in contact with the first folding member 441 to be interlocked therewith, respectively.

Accordingly, the opposite end portions 442a may have outer peripheral surfaces that come in contact with the outer peripheral surfaces of the first folding members, respectively. The second folding member includes two outer peripheral surfaces on the second folding member, in which the first outer peripheral surface may come in contact with the outer peripheral surface of the first folding member to be slidably interlocked therewith, and the second outer peripheral surface may come in contact with an outer peripheral surface provided on the fourth folding member to be slidably interlocked therewith.

The separation prevention openings 442b are respectively engaged with the separation prevention portions provided on the first folding members, and may be formed in a shape that corresponds to the shape of the separation prevention portions.

Each hinge arm 442c may be a portion that is engaged with a hinge arm recess of a folding member, which faces the hinge arm 442c, and is rotatably joined to the hinge arm recess by a hinge pin (not illustrated). Each hinge arm recess 442d may be a portion that is engaged with a hinge arm of a folding member, which faces the hinge arm recess 442d, and is rotatably joined to the hinge arm by a hinge pin (not illustrated). For example, neighboring folding members may be rotatably connected to each other using hinge pins as a rotating axis.

The assembly holes may be formed in order to assemble the folding unit by aligning a plurality of folding members.

Figure 22:
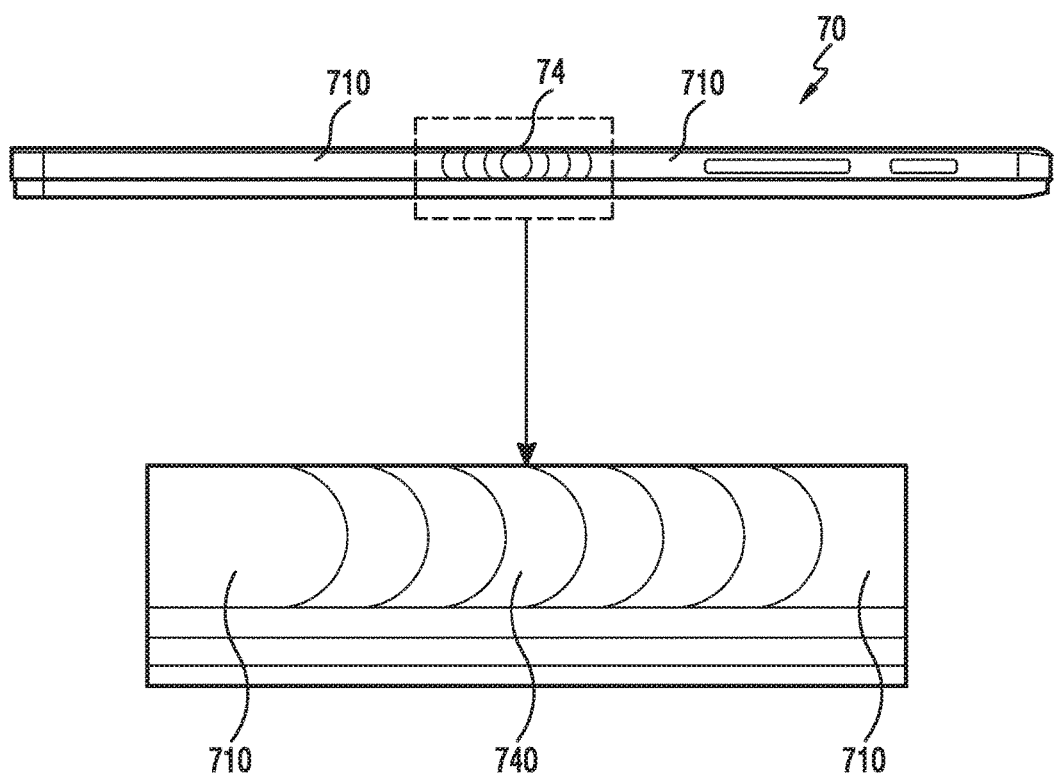
FIG. 22 illustrates a front view of a folding unit according to various embodiments of the present disclosure.

FIG. 22 illustrates a front view of a folding unit according to various embodiments of the present disclosure.

Referring to FIG. 22, a folding unit 74 according to various embodiments of the present disclosure is different from the folding unit illustrated in FIG. 16 in view of the following features. The folding unit illustrated in FIG. 16 may have a configuration in which, with reference to the first folding member, the second, fourth, and sixth folding members are disposed at one side to be interlocked with each other, and the third, fifth, and seventh folding members are disposed at the other side to be interlocked with each other. For example, the first folding member may have a configuration that is different from that of the second to seventh folding members. In addition, the second, fourth, and sixth folding members and the third, fifth, and seventh folding members may be arranged to be symmetric to each other with reference to the first folding member (such that end portions face opposite directions).

In the case of folding members 740 illustrated in FIG. 22, a folding unit 74 may be configured by first to sixth folding members 740 that have the same configuration. The respective folding members 740 are rotatably connected to each other by a hinge unit (not illustrated), and include end portions, each of which has first and second outer peripheral surfaces that are interlocked with each other. The respective folding members 740 are arranged such that the folding members are in slidable surface contact with each other during the folding/unfolding operation of a main body 70.

The end portion of each of the folding members 740 has a single directionality (the end portion has a shape having a directionality), and the end portions of the folding members 740 may be arranged to be in close contact with each other and to be slidably interlocked with each other. In addition, each of the outermost folding members 740 may be arranged to be interlocked with an outer metal frame 710 of the main body. As described above, the end portion of each of the folding members 740 may be arranged to face one direction.

An orthogonal coordinate system is used in each of the drawings in which the X-axis of the orthogonal coordinate system may be a transverse direction of a flexible device, the Y-axis may be a longitudinal direction of a flexible device, and the Z-axis may be a vertical direction of the flexible device. Accordingly, a flexible device extending in the X-axis direction may have a transversal length, a flexible device extending in the Y-axis direction may have a longitudinal length, and a flexible device extending in the Z-axis direction may have a thickness.

Figure 23A:
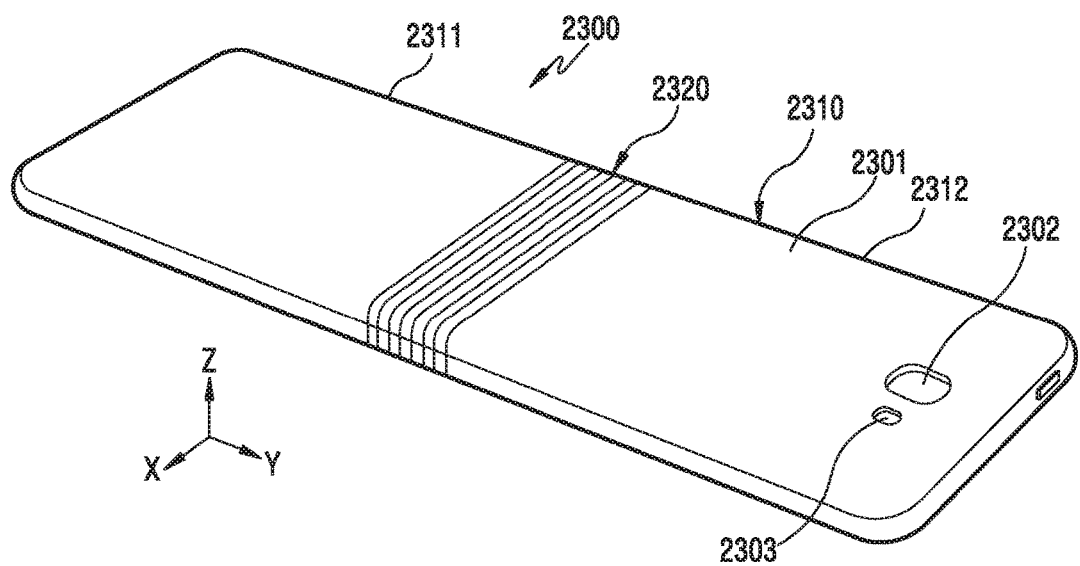
FIG. 23A illustrates a rear side view of a flexible electronic device in an unfolded state according to various embodiments of the present disclosure.
Figure 23B:
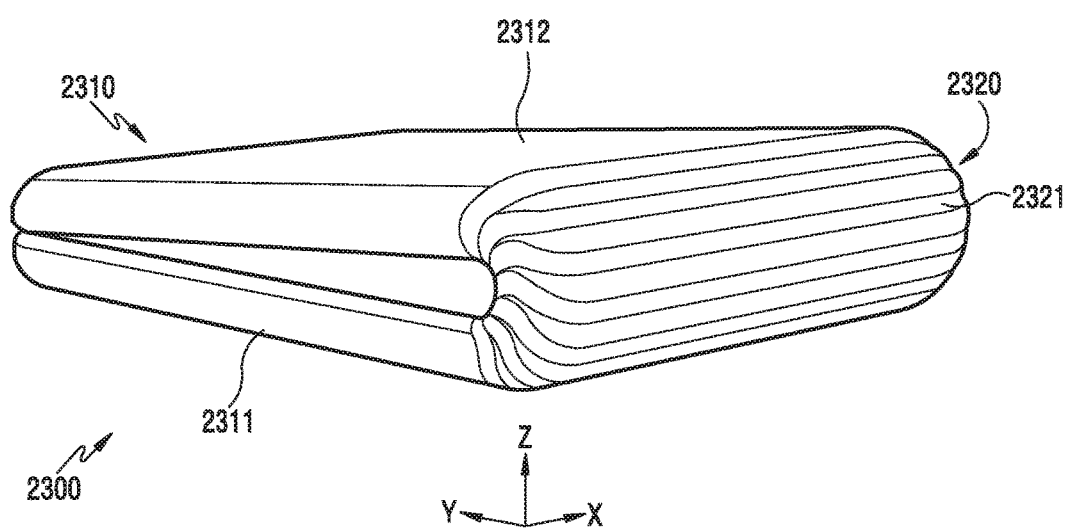
FIG. 23B illustrates a side view of a flexible electronic device in a folded state according to various embodiments of the present disclosure.

FIG. 23A illustrates a rear side view of a flexible electronic device in an unfolded state according to various embodiments of the present disclosure. FIG. 23B illustrates a side view of a flexible electronic device in a folded state according to various embodiments of the present disclosure.

Referring to FIGS. 23A and 23B, a flexible device 2300 according to various embodiments of the present disclosure may include a main body 2310 that has a shape extending in one direction. In the drawings, the flexible device 2300 may include a bar-shaped main body 2310 that extends in the Y-axis direction.

The flexible device 2300, according to various embodiments of the present disclosure, may be an electronic device that may provide a simple appearance and an excellent grip feeling. For example, the flexible device 2300 may minimize a gap between folding members 2321 of the folding unit 2320 in order to provide a simple appearance (the folding members may be configured to show an integrated feeling in the folded state). In addition, the flexible device 2300 may be configured such that the corner portion between the second face (rear face) and a third face (side face) 2312 is formed in a curved face (curved form) without being angled.

According to various embodiments of the present disclosure, the flexible device 2300 may be curved, bent, or folded. The flexible device 2300 may include one or more folding units 2320. When the flexible device 2300 includes two or more folding units according to various embodiments of the present disclosure, the main body 2310 may be configured to be folded twice or more. In addition, according to various embodiments of the present disclosure, the folding unit 2320 may be disposed at an approximately 5:5 position of the main body 2310, or may be disposed at a 3:7 position, a 4:7 position, or a 2:8 position of the main body.

As will be described below, according to various embodiments of the present disclosure, the flexible device 2300 may include a metal body (see FIGS. 30A to 30D) that is mounted on the folding unit 2320 so that the flexible device 2300 may be semi-automatically unfolded or folded. The metal body may provide a semi-automatic operating force. In the state where the flexible device 2300 is unfolded (the state illustrated in FIG. 23A), the semi-automatically folding operation is performed as follows: the flexible device 2300 is manually folded up to a first angle, and after the first angle, the metal body provides an automatically folding force so that the flexible device 200 may become the finally folded state (the state illustrated in FIG. 23B). In the folded state, the semi-automatically unfolding operation is performed as follows: the flexible device 2300 is manually unfolded up to a second angle, and after the second angle, the metal body continuously provides an automatically unfolding force so that the flexible device 2300 may become the finally unfolded state.

According to various embodiments of the present disclosure, the flexible device 2300 may be divided into a first main body portion 2311 and a second main body portion 2312 with reference to the folding unit 2320. For example, when the flexible device 2300 is unfolded, the first and second main body portions 2311 and 2312 may be located opposite to each other with reference to the folding unit 2320. When the flexible device 2300 is folded, the first and second main body portions 2311 and 2312 may approximately face each other.

According to various embodiments of the present disclosure, the flexible device 2300 may include a flexible display (see FIG. 4) that is mounted on the rear face of the main body 2310, and the flexible display may be curved, bent, or folded together with the main body 2310.

According to various embodiments of the present disclosure, the flexible device 2300 may include one or more auxiliary devices that are arranged on a rear face 2301. For example, the auxiliary devices may include a rear camera 2302, a flash 2303, and the like, but are not limited to the camera or the flash. Auxiliary devices providing various functions may be arranged.

Figure 24A:
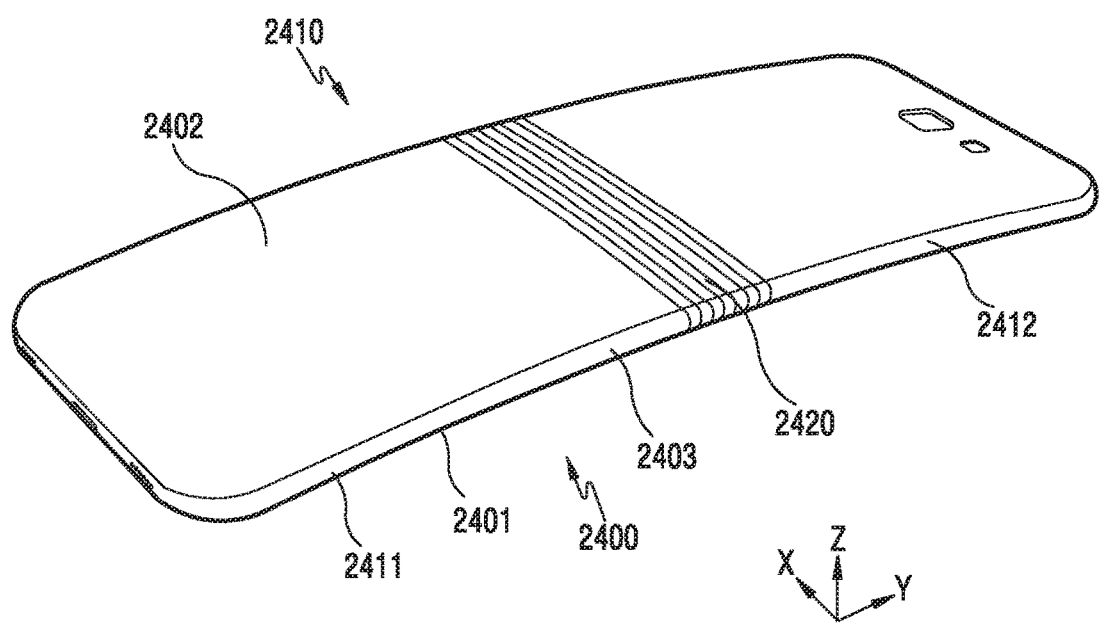
FIG. 24A illustrates a rear side of a flexible electronic device in an unfolded state according to various embodiments of the present disclosure.
Figure 24B:
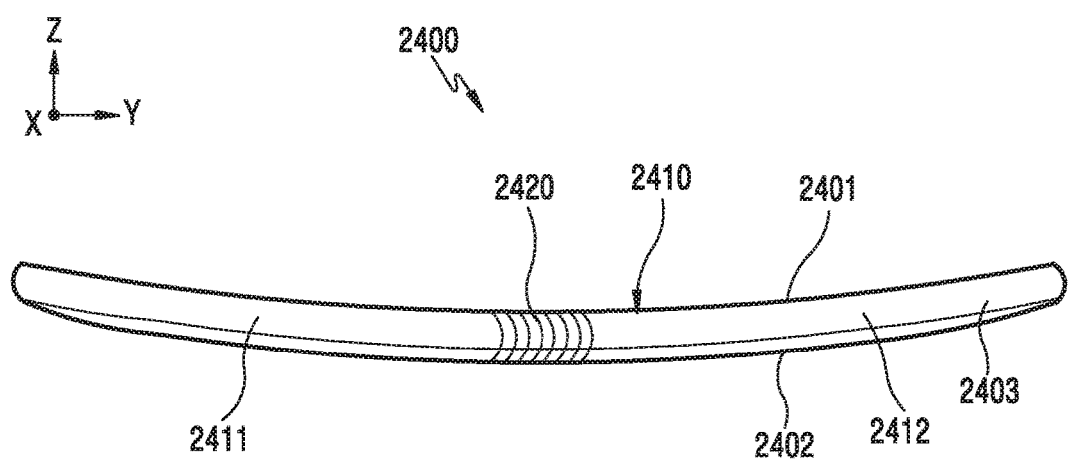
FIG. 24B illustrates a side view of a flexible electronic device according to various embodiments of the present disclosure.

FIG. 24A illustrates a rear side of a flexible electronic device in an unfolded state according to various embodiments of the present disclosure. FIG. 24B illustrates a side view of a flexible electronic device according to various embodiments of the present disclosure.

Referring to FIGS. 24A and 24B, according to various embodiments of the present disclosure, a flexible device 2400 may be the same as the flexible device 2300 illustrated in FIGS. 23A and 23B. According to various embodiments of the present disclosure, the flexible device 2400 may be different from the flexible device 2300 illustrated in FIGS. 23A and 23B as follows. The flexible device 2300 illustrated in FIGS. 23A and 23B provides a flat shape in the unfolded state, and the flexible device illustrated in FIGS. 24A and 24B may provide a curved shape in the unfolded state.

According to various embodiments of the present disclosure, the flexible device 2400 may include a bar-shaped main body 2410 that extends to be elongated in one direction. According to various embodiments of the present disclosure, the main body 2410 may include a first face 2401, a second face 2402 that is located at the opposite side to the first face 2401, and a third face 2403 located between the first face 2401 and the second face 2402. The first face 2041 may be a curved face, and the second face 2402 may be a curved face. In addition, the first face 2041 may have a first curvature, and the second face 2042 may have a second curvature. The first and second curvatures may be equal to each other, or may be different from each other.

According to various embodiments of the present disclosure, the flexible device 2400 may be divided into a first main body portion 2411 and a second main body portion 2412 with reference to the folding unit 2420. For example, when the flexible device 2400 is unfolded, the first and second main body portions 2411 and 2412 may be located opposite to each other with reference to the folding unit 2420. When the flexible device is folded, the first and second main body portions may approximately face each other.

According to various embodiments of the present disclosure, the flexible device 2400 is not required to be limited to a shape that is curved in the YZ plane, and may be configured in a shape that is curved in the XZ plane.

A configuration of a flexible device will be described with reference to FIGS. 25 and 29.

Figure 25:
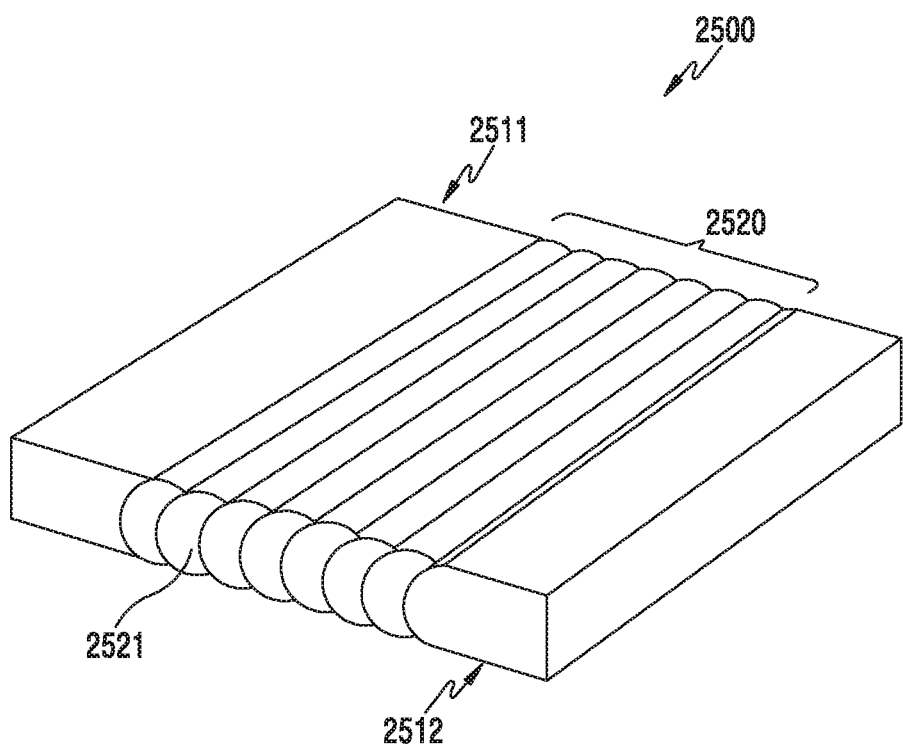
FIG. 25 illustrates a portion of a flexible electronic device having a folding unit according to various embodiments of the present disclosure.

FIG. 25 illustrates a portion of a flexible electronic device having a folding unit according to various embodiments of the present disclosure.

Referring to FIG. 25, a flexible device 2500 according to various embodiments of the present disclosure may be the same as the flexible device 2300 illustrated in FIGS. 23A and 23B. According to various embodiments of the present disclosure, the flexible device illustrated in FIG. 25 may be in a state where a flexible display and a cover are removed therefrom. According to various embodiments of the present disclosure, the flexible device 2500 may include first and second main body portions 2511 and 2512, as well as a folding unit 2520 disposed between the first and second main body portions 2511 and 2512. The first and second main body portions 2511 and 2512 may be folded or unfolded due to the folding unit 2520.

According to various embodiments of the present disclosure, the folding unit 2520 may include a plurality of folding members 2521, and the respective folding members may be connected to be rotatable and to be in close contact with each other. The outwardly exposed face of each of the folding members 2521 may provide an uneven shape in the unfolded state.

Figure 26A:
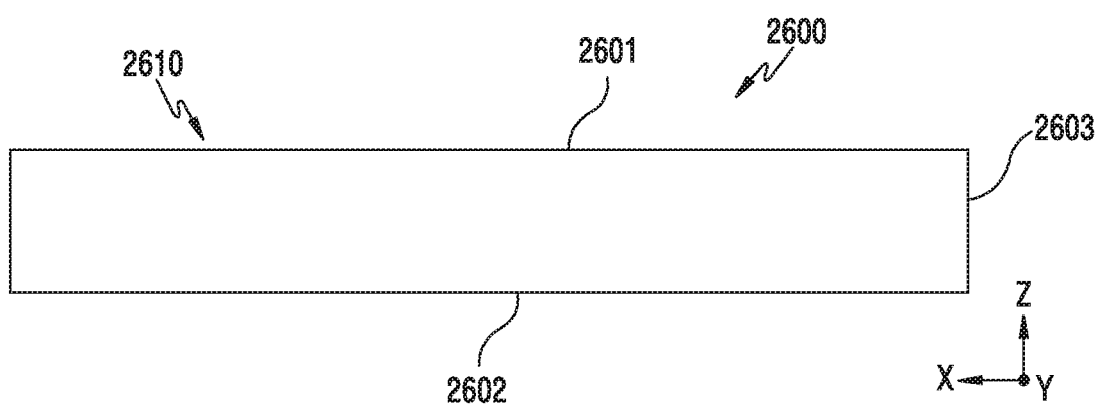
FIG. 26A schematically illustrates a cross section of a flexible electronic device when viewed in an XZ plane according to various embodiments of the present disclosure.

FIG. 26A schematically illustrates a cross-section state of a flexible electronic device when viewed in the XZ plane according to various embodiments of the present disclosure.

Referring to FIG. 26A, according to various embodiments of the present disclosure, the main body 2610 of a flexible electronic device 2600 may include a first face 2601, a second face 2602 that is located at the opposite side to the first face 2601, and at least one third face 2603 located between the first face 2401 and the second face 2402. When FIG. 26A is viewed from the front side, the first face 2601 may be a front face, the second face 2602 may be a rear face, and the third face 2603 may be a side face.

According to various embodiments of the present disclosure, the first face 2601 and the second face 2602 of the main body 2610 may be substantially perpendicular to each other, the second face 2602 and the third face 2603 may be substantially perpendicular to each other, and the third face 2603 and the first face 2601 may be substantially perpendicular to each other. Such a main body 2610 may not provide an excellent grip feeling when it is gripped by a hand. For example, the angled portion between the first and second faces 2601 and 2602 and the angled portion between the second and third faces 2602 and 2603 may provide an inconvenient feeling when they are gripped.

Figure 26B:
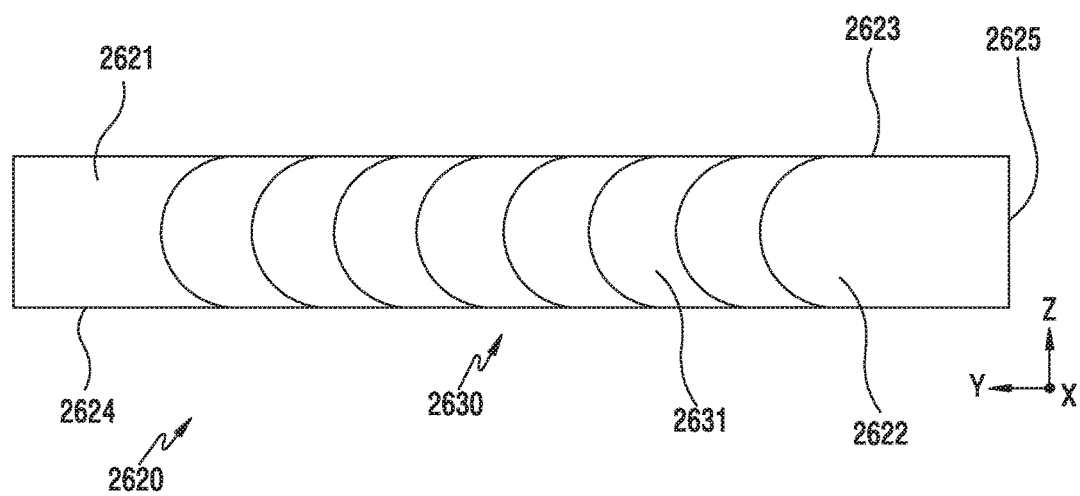
FIG. 26B illustrates a side view of a flexible electronic device having a folding unit according to various embodiments of the present disclosure.

FIG. 26B illustrates a side view of a flexible electronic device having a folding unit according to various embodiments of the present disclosure.

Referring to FIG. 26B, a main body 2620 of a flexible device, according to various embodiments of the present disclosure, may be the same as the main body 2610 illustrated in FIG. 26A. According to various embodiments of the present disclosure, the main body 2620 may include a first main body portion 2621, a second main body portion 2622, and a folding unit 2630 disposed between the first and second main body portions 2621 and 2622. FIG. 26B illustrates a side face of the main body 2620 in the state where the flexible device is unfolded.

According to various embodiments of the present disclosure, the main body 2620 may include a first face 2623, a second face 2624 that is located at the opposite side to the first face 2623, and at least one third face 2625 located between the first and second faces 2623 and 2624. According to various embodiments of the present disclosure, the first face 2623 and the second face 2624 of the main body 2620 may be substantially perpendicular to each other, the second face 2624 and the third face 2625 may be substantially perpendicular to each other, and the third face 2625 and the first face 2623 may be substantially perpendicular to each other.

According to various embodiments of the present disclosure, a folding unit 2630 may include a plurality of folding members 2631. The first and second main body portions 2621 and 2622 may be folded or unfolded by the coupling structure between the respective folding members 2631.

According to various embodiments of the present disclosure, the folding unit 2630 may have an exterior exposed to the outside, and the exterior may be arranged to be substantially coplanar to the exterior of the main body 2610.

Figure 26C:
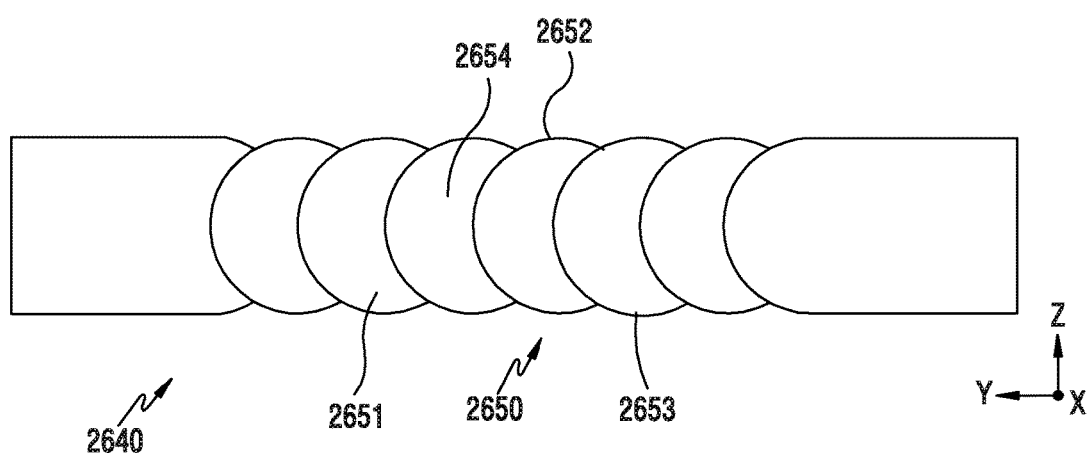
FIG. 26C illustrates a side view of a flexible electronic device having a folding unit according to various embodiments of the present disclosure.

FIG. 26C illustrates a side view of a flexible electronic device having a folding unit according to various embodiments of the present disclosure.

Referring to FIG. 26C, according to various embodiments of the present disclosure, a folding unit 2650 may include a plurality of folding members 2651. The folding unit 2650 may be folded or unfolded by the coupling structure between the respective folding members 2651. The folding unit 2650 may include a first face 2652, a second face 2653 that is located at the opposite side to the first face 2652, and at least one third face 2654 located between the first and second faces 2652 and 2653. The first face 2652 of the folding unit may be configured in a substantially uneven shape, the second face 2653 may be configured in a substantially uneven shape, and the third face 2654 may be configured in a flat or uneven shape.

However, each of the flexible electronic devices 2600, 2620, and 2640 illustrated in FIGS. 26A to 26C may have a disadvantage of imparting a limit to the freedom of exterior design. For example, the flexible electronic devices 2600, 2620, and 2640 illustrated in the drawings have disadvantages in that they are poor in grip feeling and the folding units 2630 and 2650 thereof do not have a beautiful exterior appearance. Such a limit occurs because the first, second, and third faces of the main body are oriented to be perpendicular to each other, which may restrict the implementation of a folding unit.

Figure 27:
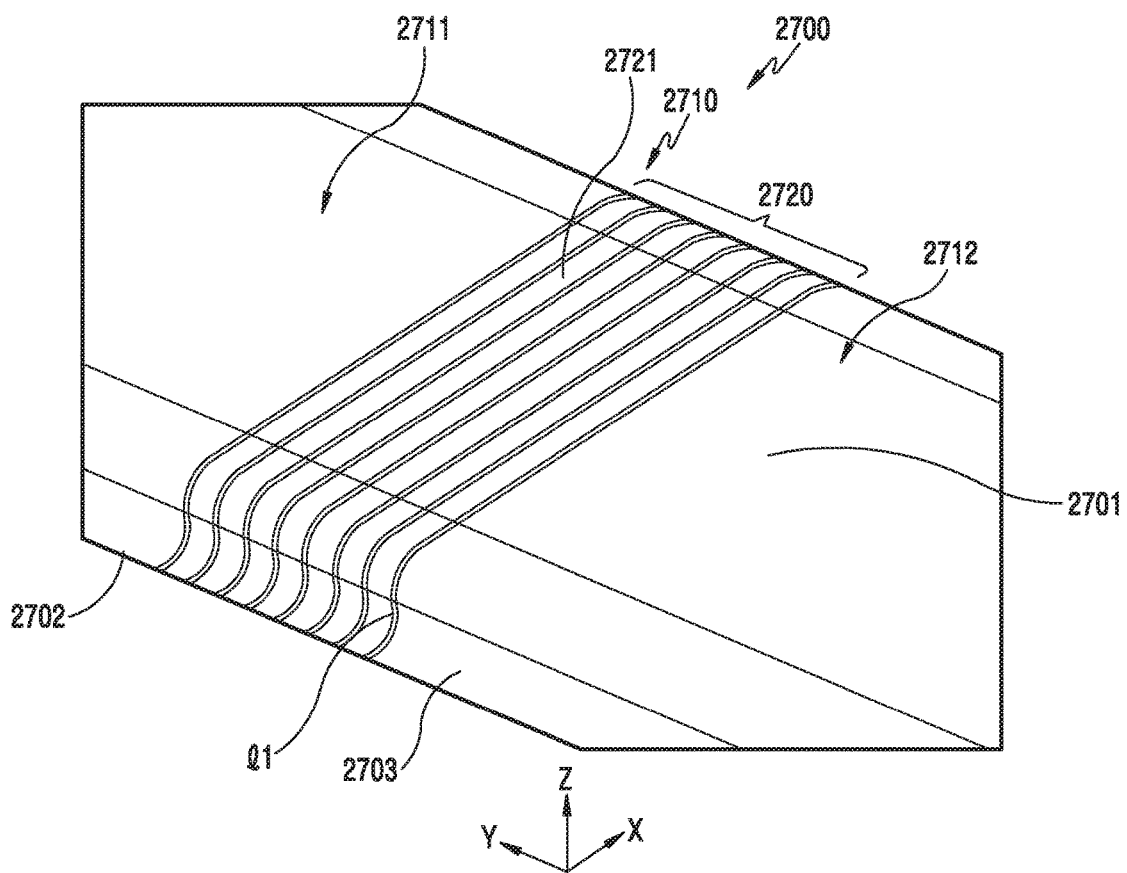
FIG. 27 illustrates a portion of a flexible electronic device having a folding unit according to various embodiments of the present disclosure.

FIG. 27 illustrates a portion of a flexible electronic device having a folding unit according to various embodiments of the present disclosure.

Referring to FIG. 27, according to various embodiments of the present disclosure, a flexible electronic device 2700 may include a main body 2710, and the main body 2710 may include a first face 2701, a second face 2702 that is located at the opposite side to the first face 2701, and at least one third face 2702 located between the first face 2701 and the second face 2702.

According to various embodiments of the present disclosure, the first face 2701 and the second face 2703 of the main body 2710 may be inclined to each other rather than being substantially perpendicular to each other, the second face 2702 and the third face 2703 may be inclined to each other rather than being substantially perpendicular to each other, and the second face 2702 and the first face 2701 may not be substantially parallel to each other. According to various embodiments of the present disclosure, in the main body 2710, the first face 2701 may be a flat or curved face, the second face 2702 may be a flat or curved face, and the third face 2703 may be a flat or curved face. In addition, according to various embodiments of the present disclosure, the main body 2710 may be configured to have a curved face between the first and third faces 2701 and 2703, and a curved face between the second and third faces 2702 and 2703. In addition, the curved face between the first and third faces 2701 and 2703 may be configured to have a first curvature, and the second and third faces 2702 and 2703 may be configured to have a second curvature. The first and second curvatures may be equal to, or different from, each other.

According to various embodiments of the present disclosure, the main body 2710 may include first and second main body portions 2711 and 2712 and a folding unit 2720 disposed between the first and second main body portions 2711 and 2712. The first and second main body portions 2711 and 2712 may be folded or unfolded due to the folding unit 2720. According to various embodiments of the present disclosure, the folding unit 2720 is configured such that the exterior lines between the folding members 2721 are shown on the exterior appearance, in which each of the exterior lines may be formed in a curved line 11 in the opposite end regions thereof. The curved lines 11 of the folding unit 2720 may be formed over the third face 2703 or a portion of each of the third face 2703 and the first and second faces 2701 and 2702.

FIGS. 28A to 28D are views each schematically illustrating a cross section of a flexible electronic device according to various embodiments of the present disclosure.

Figure 28A:
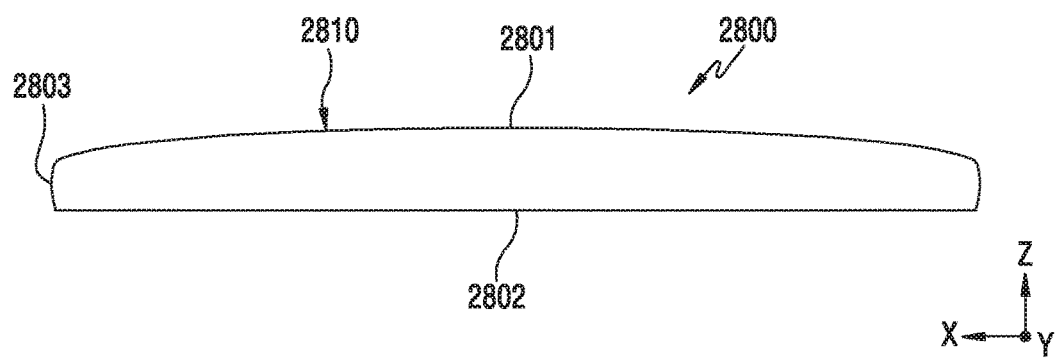
FIGS. 28A to 28D are views each schematically illustrating a cross section of a flexible electronic device according to various embodiments of the present disclosure.

FIG. 28A illustrates a cross-section state of a flexible device when viewed in the XZ plane according to various embodiments of the present disclosure.

Referring to FIG. 28A, according to various embodiments of the present disclosure, a flexible electronic device 2800 may include a foldable main body 2810. According to various embodiments of the present disclosure, the main body 2810 may include a first face 2801, a second face 2802 that is located at the opposite side to the first face 2801, and at least one third face 2803 located between the first and second faces 2801 and 2802. When FIG. 28A is viewed from the front side, the first face 2801 may be a front face, the second face 2802 may be a rear face, and the third face 2803 may be a side face.

According to various embodiments of the present disclosure, the first face 2801 may be a first curved face, the second face 2802 may be a flat face, and the third face 2803 may be a second curved face. In addition, the first face 2801 may be configured to have a first curvature, and the second face 2802 may be configured to have a second curvature. The first and second curvatures may be equal to, or different from, each other. Although not illustrated in the drawings, a flexible display disposed on the first face 2801 may be configured to have the first curvature. According to various embodiments of the present disclosure, the face between the first and third faces 2801 and 2803 or the face between the second and third faces 2802 and 2803 may be formed as a curved face. Each of the curved faces may be configured to have a curvature.

Figure 28B:
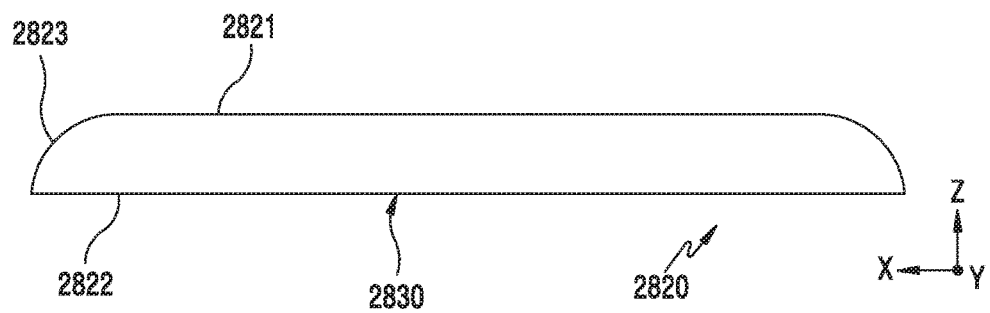

FIG. 28B illustrates a cross-section state of a flexible electronic device when viewed in the XZ plane according to various embodiments of the present disclosure.

Referring to FIG. 28B, according to various embodiments of the present disclosure, a flexible electronic device 2820 may include a foldable main body 2830. According to various embodiments of the present disclosure, the main body 2830 may include a first face 2821, a second face 2822 that is located at the opposite side to the first face 2821, and at least one third face 2823 located between the first and second faces 2821 and 2822. When FIG. 28B is viewed from the front side, the first face 2821 may be a front face, the second face 2822 may be a rear face, and the third face 2823 may be a side face.

According to various embodiments of the present disclosure, the first face 2821 may be a flat face, the second face 2822 may be a flat face, and the third face 2823 may be a curved face. The curved face 2823 may be configured to have a curvature. Although not illustrated in the drawings, a flexible display disposed on the first face 2821 may be configured to have a flat surface. According to various embodiments of the present disclosure, the face between the first and third faces 2821 and 2823 or the face between the second and third faces 2822 and 2823 may be formed as a curved face. Each of the curved faces may be configured to have a curvature.

Figure 28C:
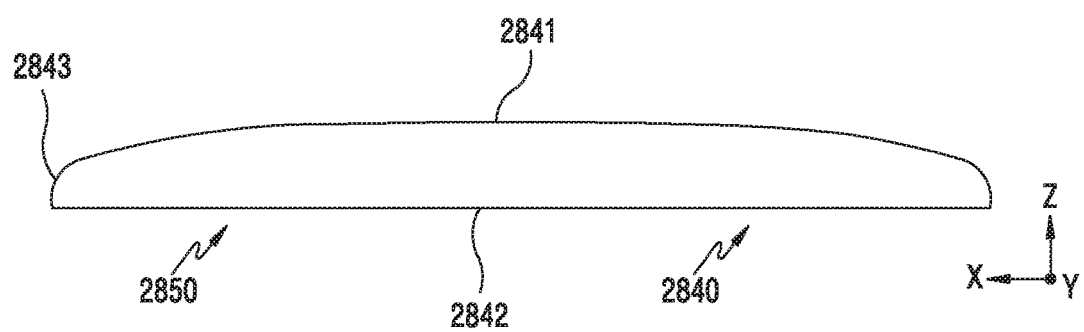

FIG. 28C illustrates a cross-section state of a flexible electronic device when viewed in the XZ plane according to various embodiments of the present disclosure.

Referring to FIG. 28C, according to various embodiments of the present disclosure, a flexible electronic device 2840 may include a foldable main body 2850. According to various embodiments of the present disclosure, the main body 2850 may include a first face 2841, a second face 2842 that is located at the opposite side to the first face 2841, and at least one third face 2843 located between the first and second faces 2841 and 2842.

According to various embodiments of the present disclosure, the first face 2841 may be a first curved face, the second face 2842 may be a flat face, and the third face 2843 may be a second curved face. In addition, the first face 2841 may be configured to have a first curvature, and the second face 2843 may be configured to have a second curvature. The first and second curvatures may be equal to, or different from, each other. Although not illustrated in the drawings, a flexible display disposed on the first face 2841 may be configured to have the first curvature. According to various embodiments of the present disclosure, the face between the first and third faces 2841 and 2843 or the face between the second and third faces 2842 and 2843 may be formed as a curved face. Each of the curved faces may be configured to have a curvature.

Figure 28D:
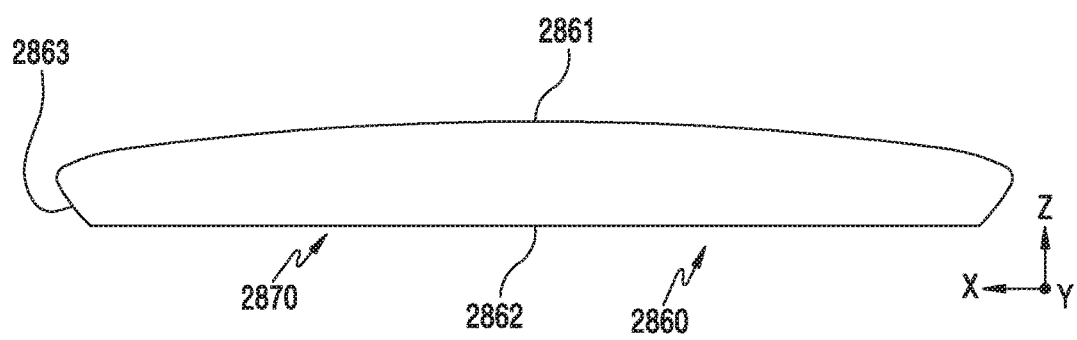

FIG. 28D illustrates a cross-section state of a flexible electronic device when viewed in the XZ plane according to various embodiments of the present disclosure.

Referring to FIG. 28D, according to various embodiments of the present disclosure, a flexible electronic device 2860 may include a foldable main body 2870. According to various embodiments of the present disclosure, the main body 2870 may include a first face 2861, a second face 2862 that is located at the opposite side to the first face 2861, and at least one third face 2863 located between the first and second faces 2861 and 2862.

According to various embodiments of the present disclosure, the first face 2861 may be a first curved face, the second face 2862 may be a flat face, and the third face 2863 may be a second curved face. In addition, the first face 2861 may be configured to have a first curvature, and the second face 2863 may be configured to have a second curvature. The first and second curvatures may be equal to, or different from, each other. Although not illustrated in the drawings, a flexible display disposed on the first face 2861 may be configured to have the first curvature. The third face 2863 may be formed as an inwardly facing curved face. According to various embodiments of the present disclosure, the face between the first and third faces 2861 and 2863 or the face between the second and third faces 2862 and 2863 may be formed as a curved face. Each of the curved faces may be configured to have a curvature.

Figure 29A:
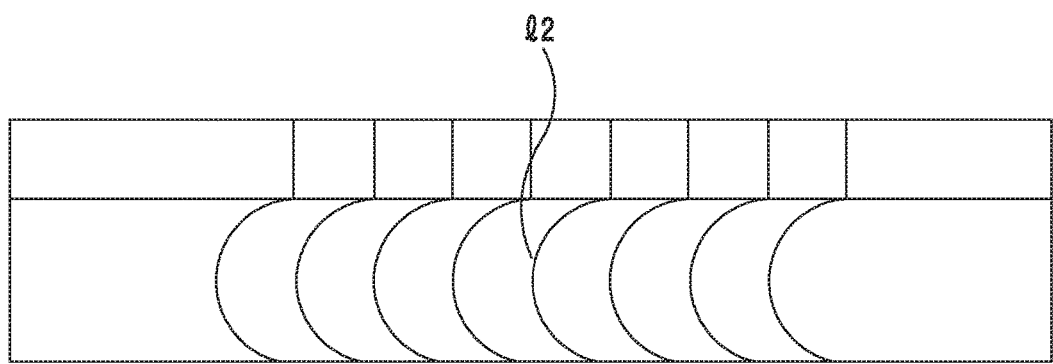
FIG. 29A illustrates a side view of a flexible electronic device having a folding unit according to various embodiments of the present disclosure.
Figure 29B:
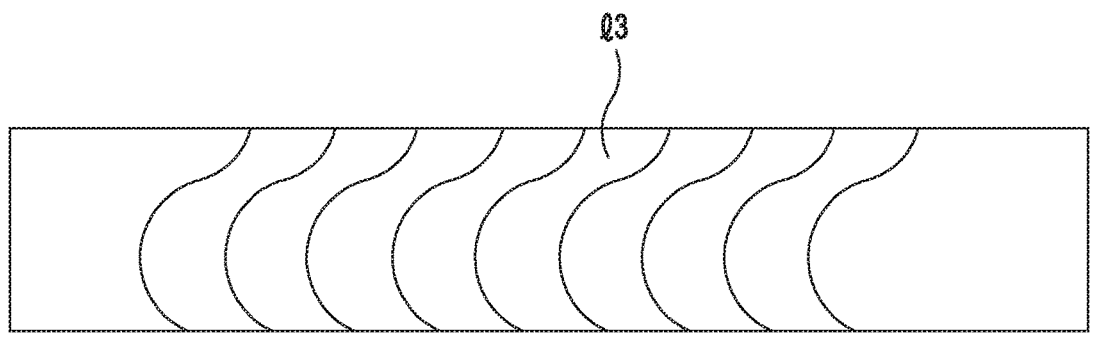
FIG. 29B illustrates a side view of a flexible electronic device having a folding unit according to various embodiments of the present disclosure.

FIG. 29A illustrates a side view of a flexible electronic device having a folding unit according to various embodiments of the present disclosure. FIG. 29B illustrates a side view of a flexible electronic device having a folding unit according to various embodiments of the present disclosure.

Referring to FIGS. 29A and 29B, the lines, which differentiate respective folding members of the main body illustrated in FIGS. 28A and 28D may be shown as lines 12 as illustrated in FIG. 29A. The lines, which differentiate respective folding members of the main body illustrated in FIGS. 28A and 28C may be shown as lines 13 as illustrated in FIG. 29B. The exterior designs implemented as the lines 12 or 13, which differentiate the folding members in the opposite side edge regions of each of the flexible electronic devices according to various embodiments of the present disclosure, may be more freely made compared with an existing one.

Figure 30A:
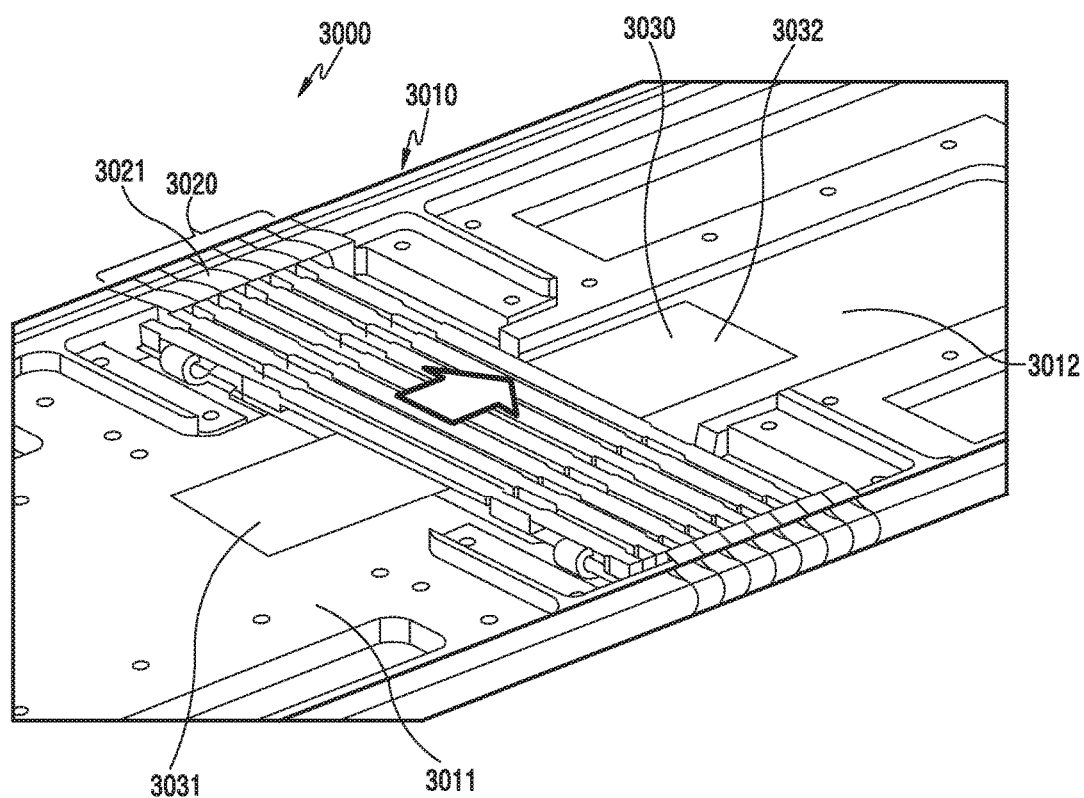
FIG. 30A illustrates a flexible electronic device in a state where a metal body is disposed according to various embodiments of the present disclosure.

FIG. 30A illustrates a flexible electronic device in a state where a metal body is disposed according to various embodiments of the present disclosure.

Referring to FIG. 30A, according to various embodiments of the present disclosure, a flexible electronic device 3000 may include a foldable main body 3010. According to various embodiments of the present disclosure, the main body 3010 may be mounted with a metal body 3030 so that first and second main body portions 3011 and 3012 may be semi-automatically unfolded or folded. The metal body 3030 may provide a semi-automatic operating force.

In the state where the flexible device 3000 is unfolded (the state illustrated in FIG. 23A), the semi-automatically folding operation is performed as follows: the flexible device 2300 is manually folded up to a first angle, and at an angle that is equal to or larger than the first angle, the metal body provides an automatically folding force so that the flexible electronic device 3000 may become the finally folded state (the state illustrated in FIG. 23B). In the state where the flexible electronic device 3000 is folded, the semi-automatically unfolding operation is performed as follows: a force is provided up to a second angle, and at an angle that is equal to, or larger than, the second angle, the metal body provides a force such that the flexible device 3000 may automatically become the finally unfolded state.

According to various embodiments of the present disclosure, the metal body 3030 is a metal plate that is formed in a substantially rectangular shape. The metal body 3030 may be mounted to at least partially penetrate a folding unit 3020, which may include one or more folding units 3021, such that one end portion 3031 is disposed on the first main body portion 3011 and the other end portion 3032 may be disposed on the second main body portion 3012. The metal body 3030 is a member that performs a leaf spring function, and in the unfolded case, may be completely unfolded to 180 degrees. The metal body 3030 may serve as a semi-automatic driving source of the folding or unfolding force of the flexible electronic device 3000.

Figure 30B:
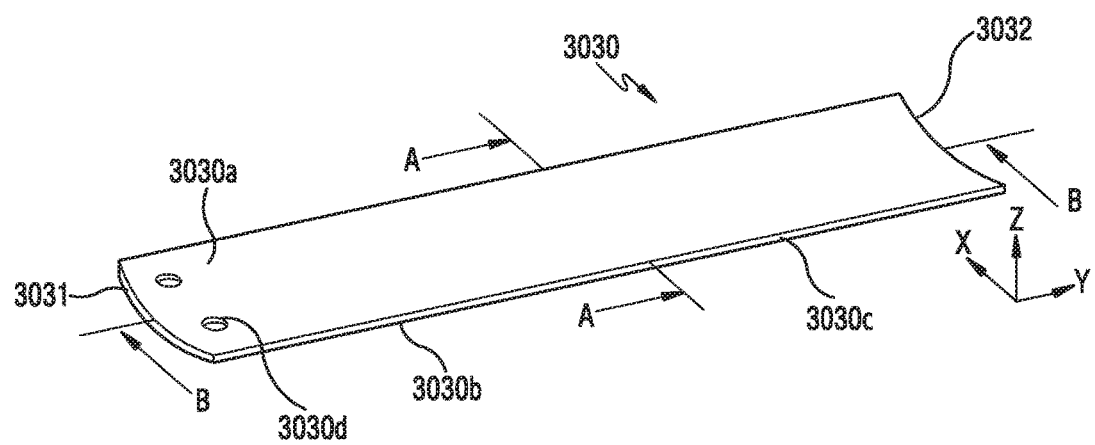
FIG. 30B illustrates a metal body in an unfolded state according to various embodiments of the present disclosure.
Figure 30C:
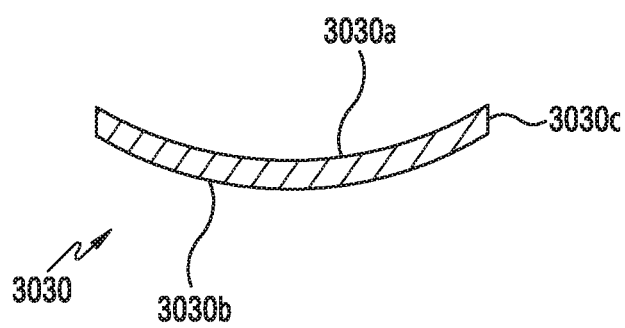
FIG. 30C is a cross-sectional view taken along line A-A in FIG. 30B according to various embodiments of the present disclosure.
Figure 30D:
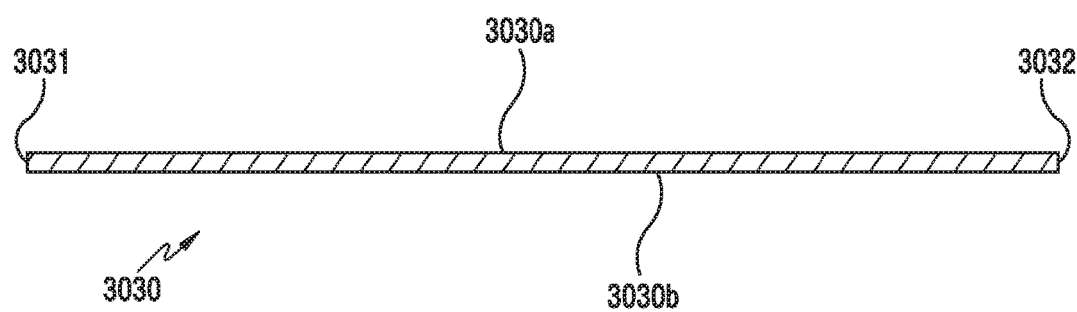
FIG. 30D is a cross-sectional view taken along line B-B in FIG. 30B according to various embodiments of the present disclosure.
Figure 30E:
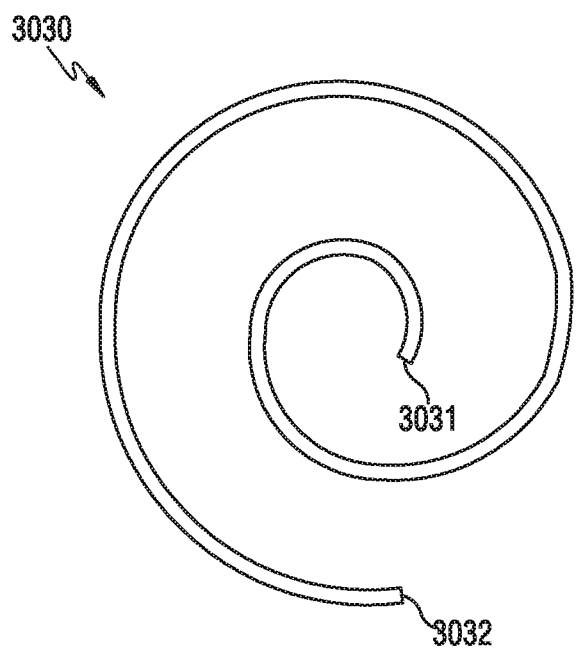
FIG. 30E is a cross-sectional view illustrating a metal body in a rolled state according to various embodiments of the present disclosure.

FIG. 30B illustrates a metal body in an unfolded state according to various embodiments of the present disclosure. FIG. 30C is a cross-sectional view taken along line A-A in FIG. 30B according to various embodiments of the present disclosure. FIG. 30D is a cross-sectional view taken along line B-B in FIG. 30B according to various embodiments of the present disclosure. FIG. 30E is a cross-sectional view illustrating a metal body in a rolled state according to various embodiments of the present disclosure.

Referring to FIGS. 30B to 30E, according to various embodiments of the present disclosure, the metal body 3030 may be a thin plate and may have a metallic leaf spring (hereinafter, the metal body will be referred to as a "leaf spring"). For example, the leaf spring 3030 may be formed in a shape having a curvature to be in a first position (FIG. 30B) or a second position (FIG. 30C). The first position refers to a position in which the leaf spring 3030 is positioned in a substantially flat shape such that the leaf spring 3030 may serve to semi-automatically provide the folding force of the flexible electronic device. The second position refers to a position in which the leaf spring 3030 is substantially positioned in a rolled shape such that the leaf spring 3030 may serve to semi-automatically provide the unfolding force of the flexible electronic device.

According to various embodiments of the present disclosure, one end region 3031 of the leaf spring 3030 is a fixed end, and the other end region 3032 may include a free end. For example, the one end region 3031 of the leaf spring may be fixed to the flexible electronic device using a fastener (not illustrated), and the other end region 3032 may be positioned on the second main body portion through the folding unit. Fastening holes 3030d, to each of which a fastener (not illustrated) is coupled, may be formed in the one end region 3030a.

According to various embodiments of the present disclosure, the leaf spring 3030 may include a first face 3030a, a second face 3030b that is located at the opposite side to the first face 3030a, and a third face 3030c located between the first and second faces 3030a and 3030b. In addition, the first face 3030a may include a first curvature, and the second face 3030b may include a second curvature. In addition, the first face 3030a and the second face 3030b may be configured to have a curvature.

The configurations of folding members that form a folding unit employed by the flexible electronic device of the present disclosure will be described with reference to FIGS. 31 to 33.

The folding member illustrated in FIGS. 31A to 31D may be employed as a folding member of the folding unit of a flexible electronic device that has a cross section illustrated in FIG. 28C.

Figure 31A:
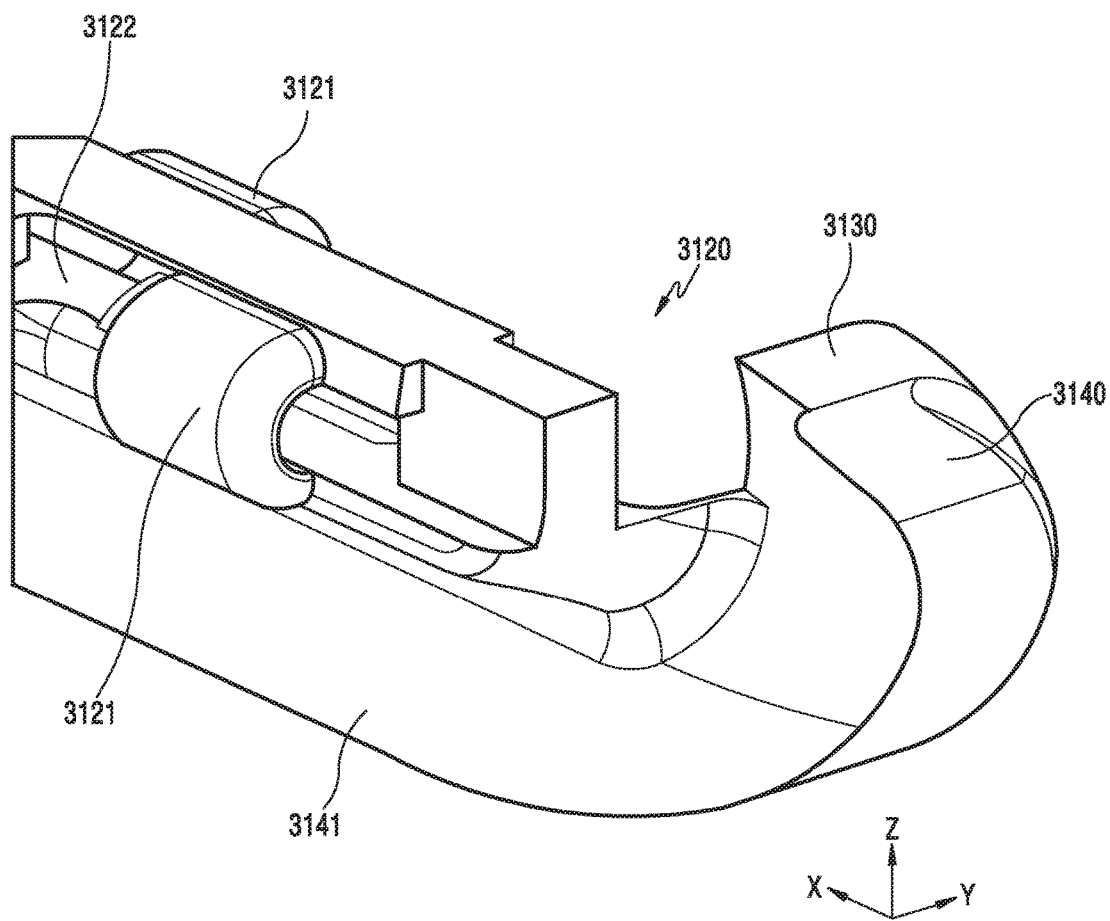
FIG. 31A illustrates an end of a folding member in an enlarged scale according to various embodiments of the present disclosure.
Figure 31B:
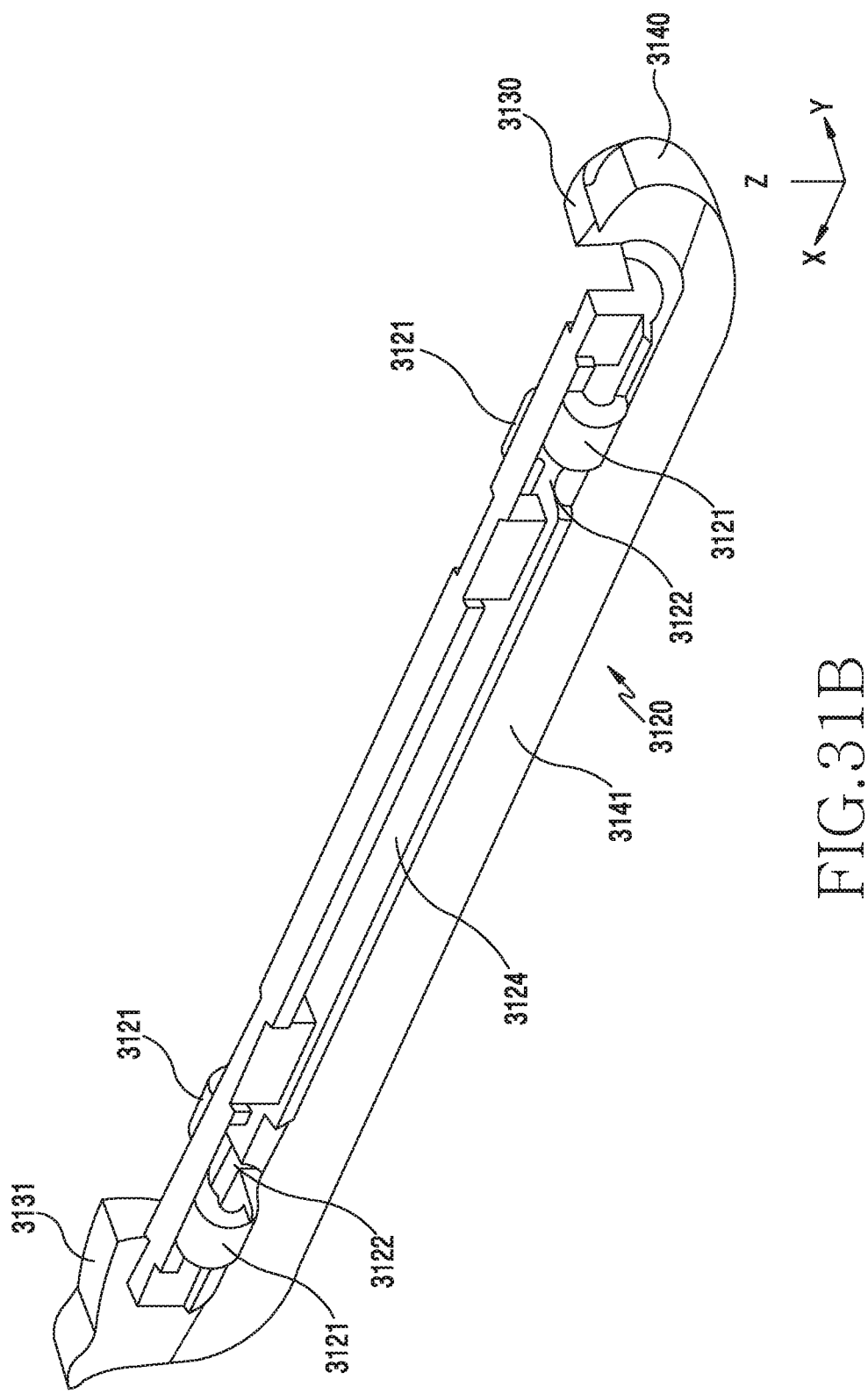
FIGS. 31B to 31D illustrate various states obtained by viewing, at various angles, a folding member according to various embodiments of the present disclosure.
Figure 31C:
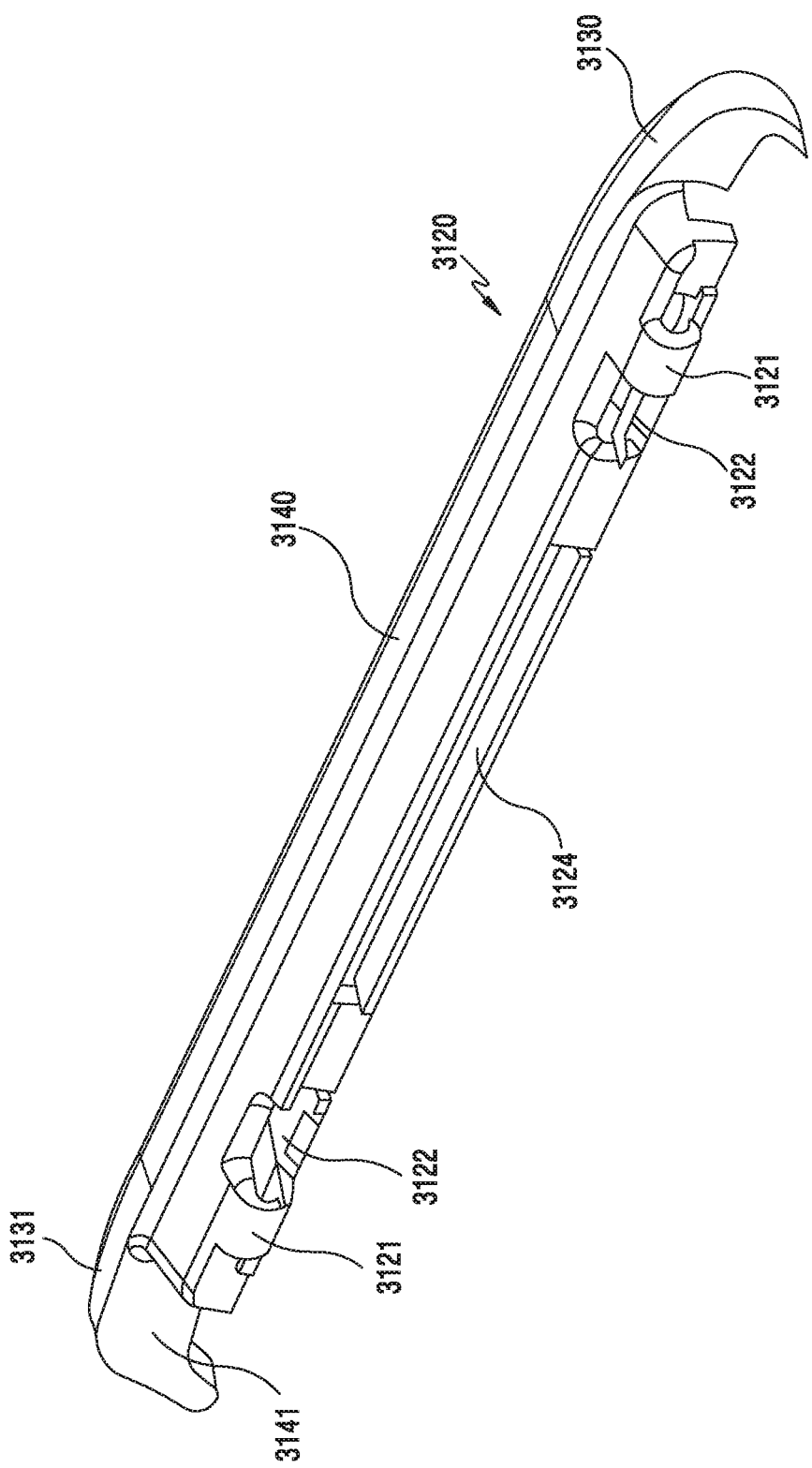
Figure 31D:
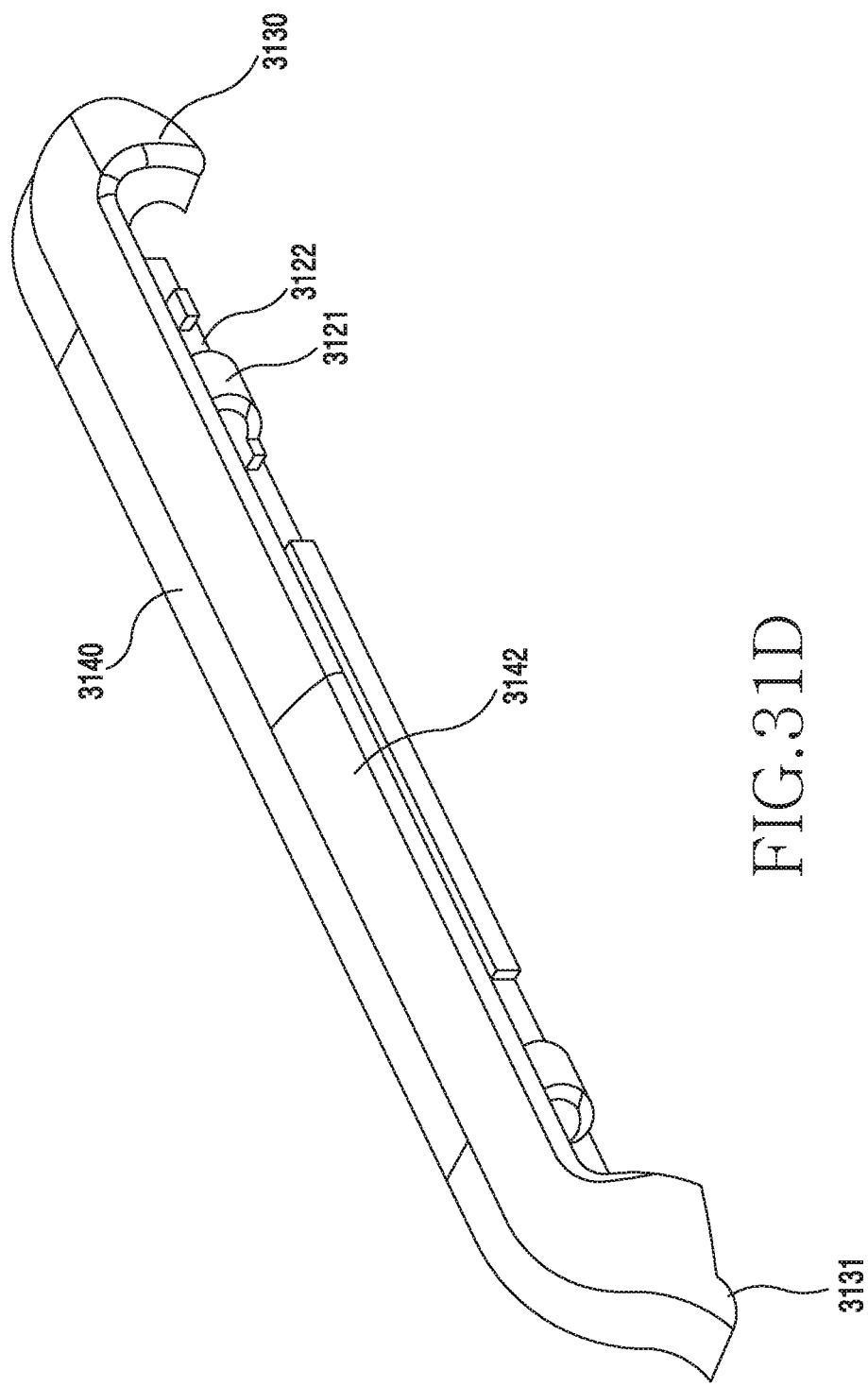

FIG. 31A illustrates an end of a folding member in an enlarged scale according to various embodiments of the present disclosure. FIGS. 31B to 31D illustrate various states obtained by viewing, at various angles, a folding member according to various embodiments of the present disclosure.

Referring to FIGS. 31A to 31D, according to various embodiments of the present disclosure, a folding member 3120 is made of a metallic material, and is rotatably coupled to another folding member and is in close contact with the other folding member to be interlocked therewith. The folding member 3120 may be connected to the other folding member by a hinge portion to be centered on a hinge axis.

According to various embodiments of the present disclosure, the folding member 3120 may be rotatably coupled to another folding member having the same configuration as the folding member 3120 on the front side (in one direction), and may be rotatably coupled to still another folding member having the same configuration as the folding member 3120 on the rear side (in the other direction). In addition, according to various embodiments of the present disclosure, the folding member 3120 may be interlocked with another folding member such that the folding members serve as a stopper and a damper therebetween. For example, one folding member 3120 may be restricted in a rotating movement by another folding member coupled to one side of the former, and during a rotating operation, the folding members may perform a damping operation according to a surface contact therebetween.

According to various embodiments of the present disclosure, the folding member 3120 may include at least one hinge portion. The hinge portion provides a rotating axis between folding members, and may include a hinge arm 3121, a hinge arm recess 3122, and a hinge pin (not illustrated). A folding unit may be implemented by coupling the folding members 3120 to each other.

According to various embodiments of the present disclosure, each of the folding member 3120 may include opposite end portions 3130 and 3131, an opening 3124, one or more hinge arms 3121, and one or more hinge arm recesses 3122.

For example, on a side of the folding member 3120, the opening 3124 may be formed at approximately the central portion, the hinge arm recesses 3122 and hinge arms 3121 are arranged about the opening 3124 as a center therebetween, and then opposite ends portions 3130 and 3131 are arranged at the opposite ends, respectively.

According to various embodiments of the present disclosure, the opening 3124 may be a connection passage through which the metal body, which provides the semi-automatic operating portion, and a Flexible Printed Circuit Board (FPCB) (not illustrated) pass. When a plurality of folding members are coupled to each other, a plurality of central openings may be formed in a tunnel shape or a duct shape so that the leaf spring or the FPCB can pass therethrough. The flexible electronic device may be divided into a first main body portion and a second main body portion with reference to the folding unit, in which the first main body portion and the second main body portion may be electrically connected with each other by using the FPCB through the opening 3124.

According to various embodiments of the present disclosure, the folding member 3120 may include a first portion 3140 that is always exposed to the outside to form a portion of the exterior appearance, a second portion 3141 that is always unexposed to the outside, and a third portion 3142 that is exposed depending on whether the folding unit is folded. As the folding members 3120 are coupled to each other, boundary lines, which differentiate the folding members, may be formed.

According to various embodiments of the present disclosure, the opposite end portions 3130 and 3131 of each of the folding members may be the portions that are exposed to the outside to form a portion of the outer metal frame or are in contact with another folding member to be interlocked therewith. Accordingly, each of the opposite end portions 3130 and 3131 may have a surface that comes in contact with another folding member.

According to various embodiments of the present disclosure, each hinge arm 3121 may be a portion that is engaged with a hinge arm recess of a facing folding member and is rotatably joined to the hinge arm recess by a hinge pin (not illustrated). According to various embodiments of the present disclosure, each hinge arm recess 3122 may be a portion that is engaged with a hinge arm of a facing folding member, and is rotatably joined to the hinge arm by a hinge pin. For example, neighboring folding members may be rotatably connected to each other using hinge pines as a rotating axis.

Figure 32A:
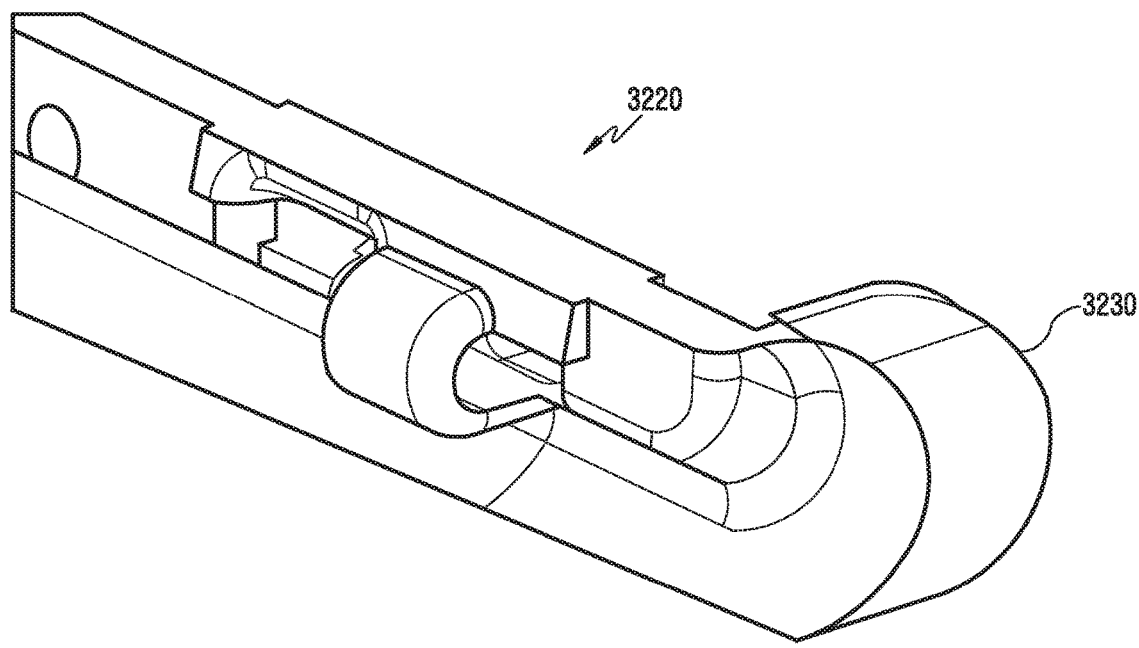
FIG. 32A illustrates an end of a folding member in an enlarged scale according to various embodiments of the present disclosure.
Figure 32B:
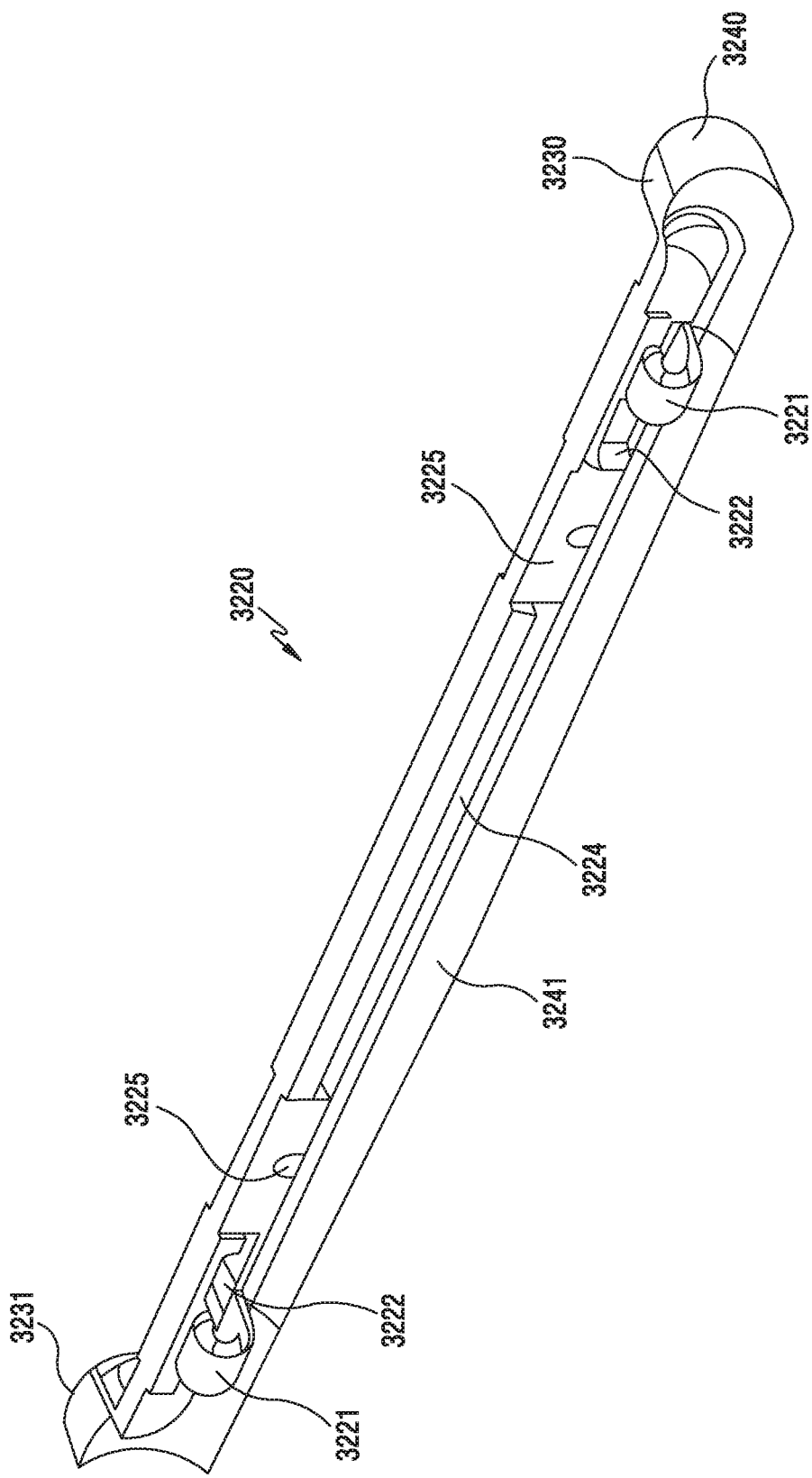
FIGS. 32B to 32D illustrate various states obtained by viewing, at various angles, a folding member according to various embodiments of the present disclosure.
Figure 32C:
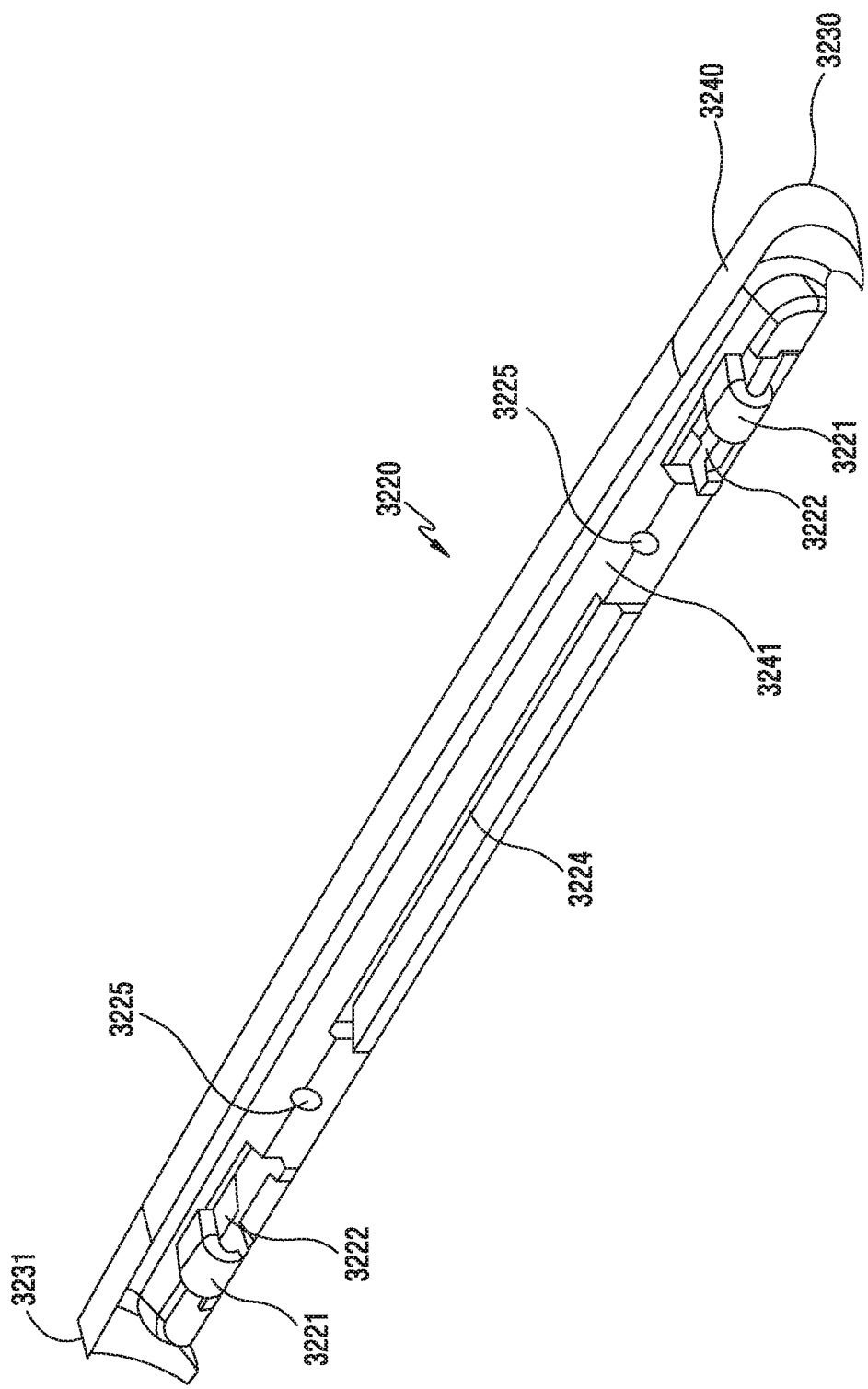
Figure 32D:
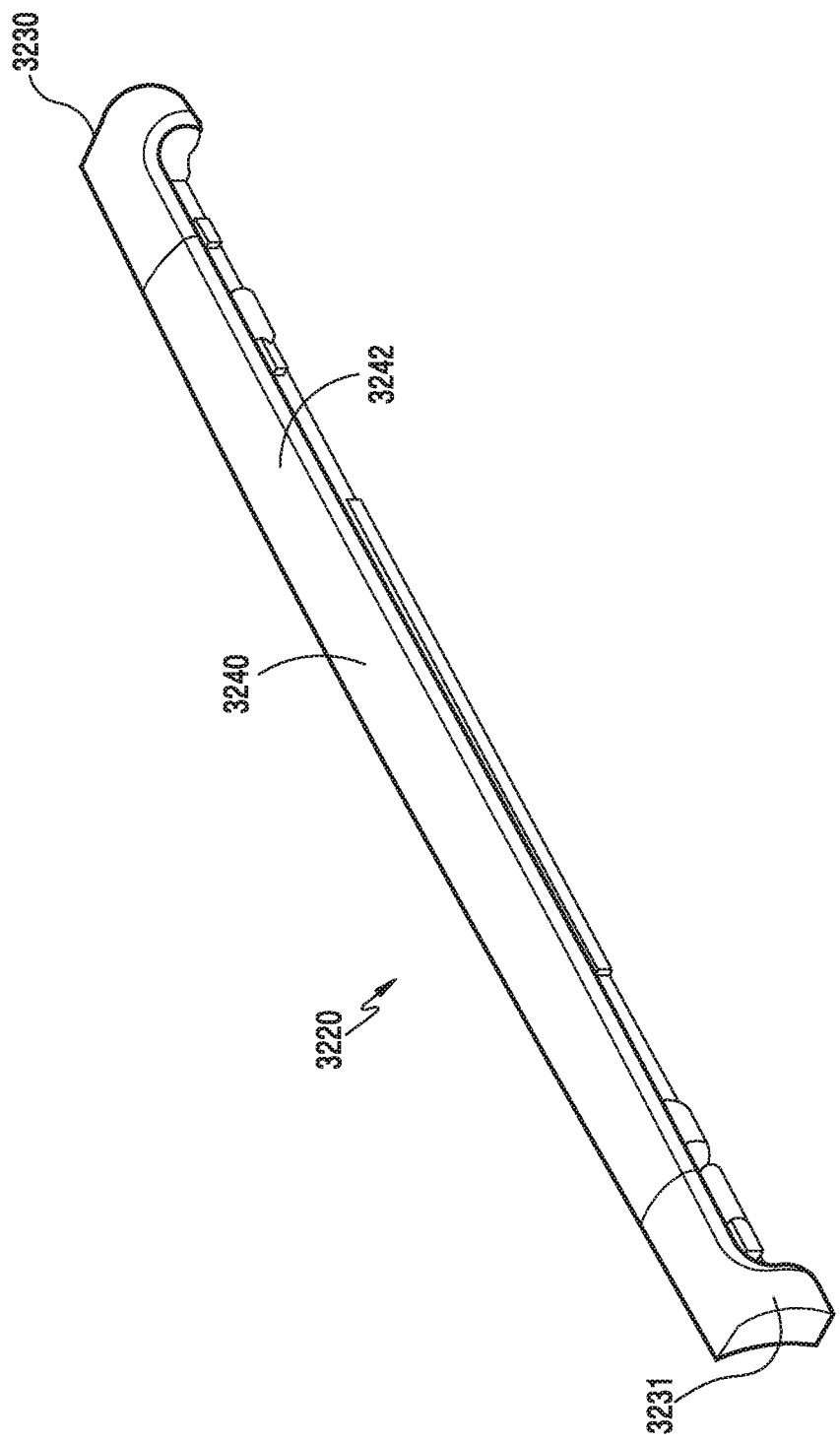

FIG. 32A illustrates an end of a folding member in an enlarged scale according to various embodiments of the present disclosure. FIGS. 32B to 32D illustrate various states obtained by viewing, at various angles, a folding member according to various embodiments of the present disclosure.

Referring to FIGS. 32A to 32D, a folding member 3220 may be employed as a folding member of the folding unit of a flexible electronic device 2800 that has a cross section illustrated in FIG. 28A. Referring to FIGS. 32A to 32D, according to various embodiments of the present disclosure, the folding member 3220 may be configured to be similar to the folding member 3120 illustrated in FIGS. 31A to 31D.

For example, the folding member 3220 may include opposite end portions 3230 and 3231, one or more hinge arms 3221, one or more hinge arm recesses 3222, an opening 3224, and one or more assembly holes 3225. The detailed descriptions of the above-mentioned components will be omitted in order to avoid repeated descriptions.

According to various embodiments of the present disclosure, the folding member 3220 may include a first portion 3240 that is always exposed to the outside to form a portion of the exterior appearance, a second portion 3241 that is always unexposed to the outside, and a third portion 3242 that is exposed depending on whether the folding unit is folded. As the folding members 3220 are coupled to each other, boundary lines, which differentiate the folding members, may be formed.

According to various embodiments of the present disclosure, assembly holes 3225 may be formed at the opposite sides of the openings 3224, respectively. The plurality of folding members 3220 may form one folding unit by inserting a wire (not illustrated) into the assembly holes 3225 and tying the folding members 3220 with the wire to be assembled into a single body.

Figure 33A:
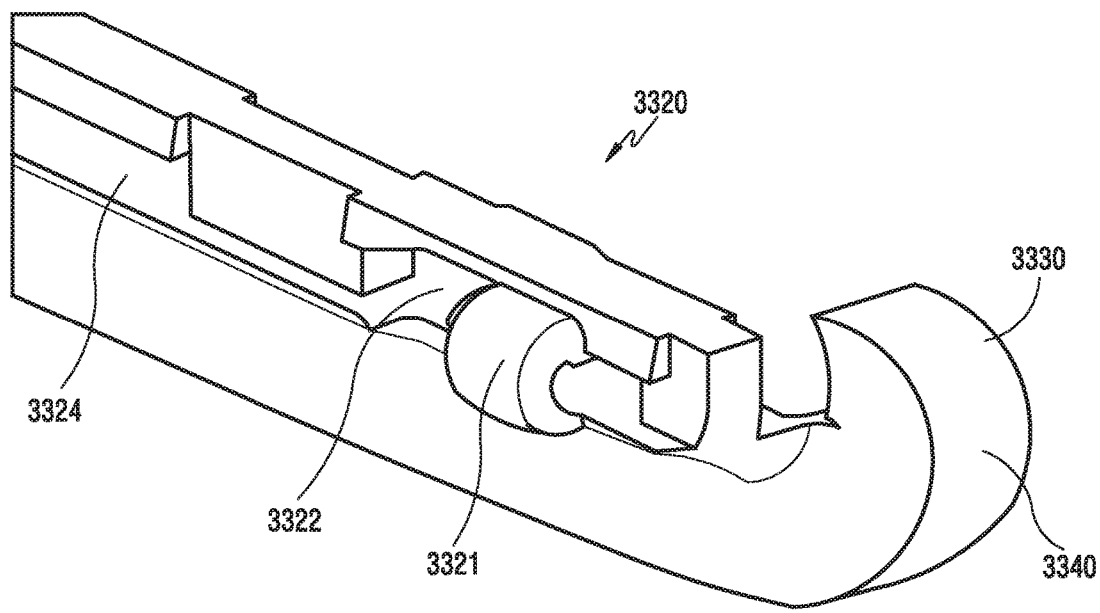
FIG. 33A illustrates an end of a folding member in an enlarged scale according to various embodiments of the present disclosure.
Figure 33B:
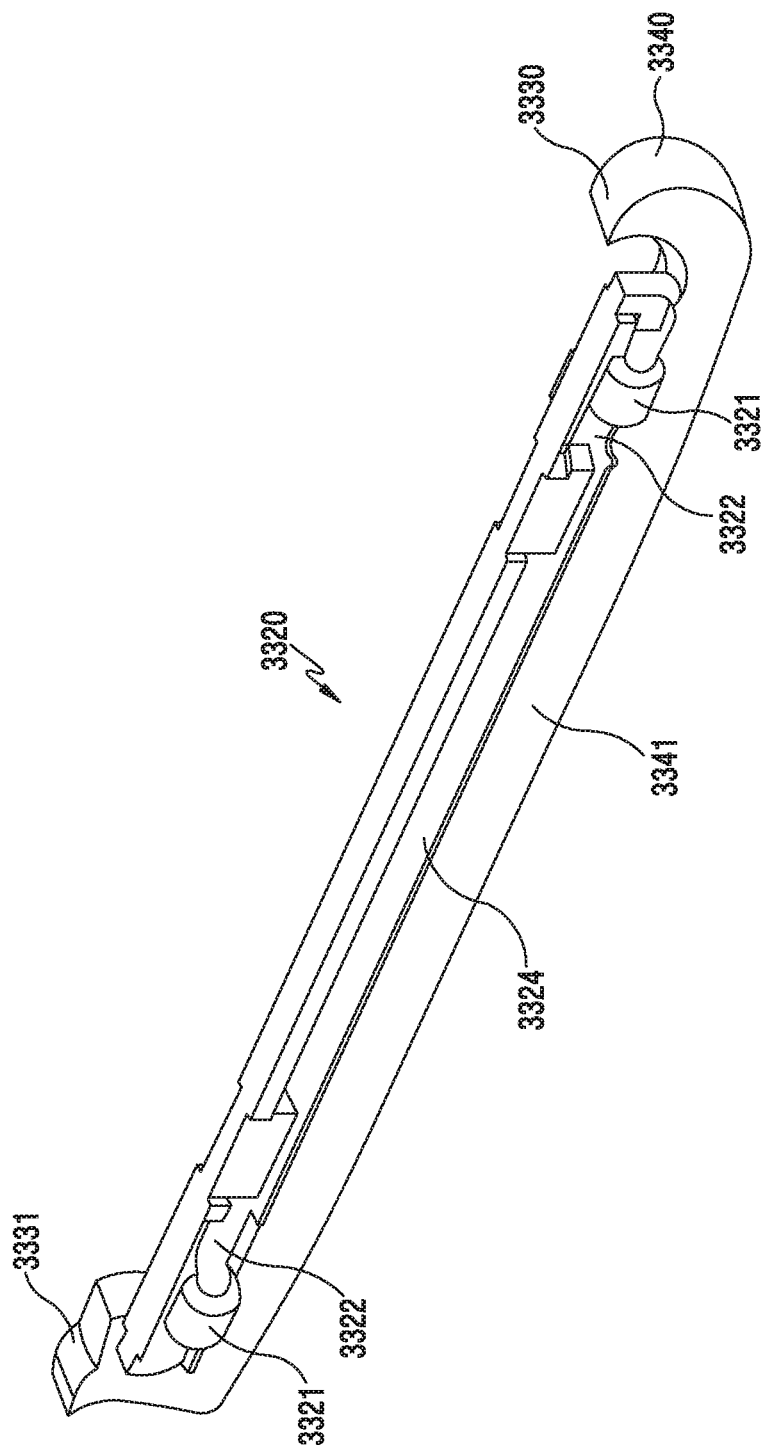
FIGS. 33B to 33D illustrate various states obtained by viewing, at various angles, a folding member according to various embodiments of the present disclosure.
Figure 33C:
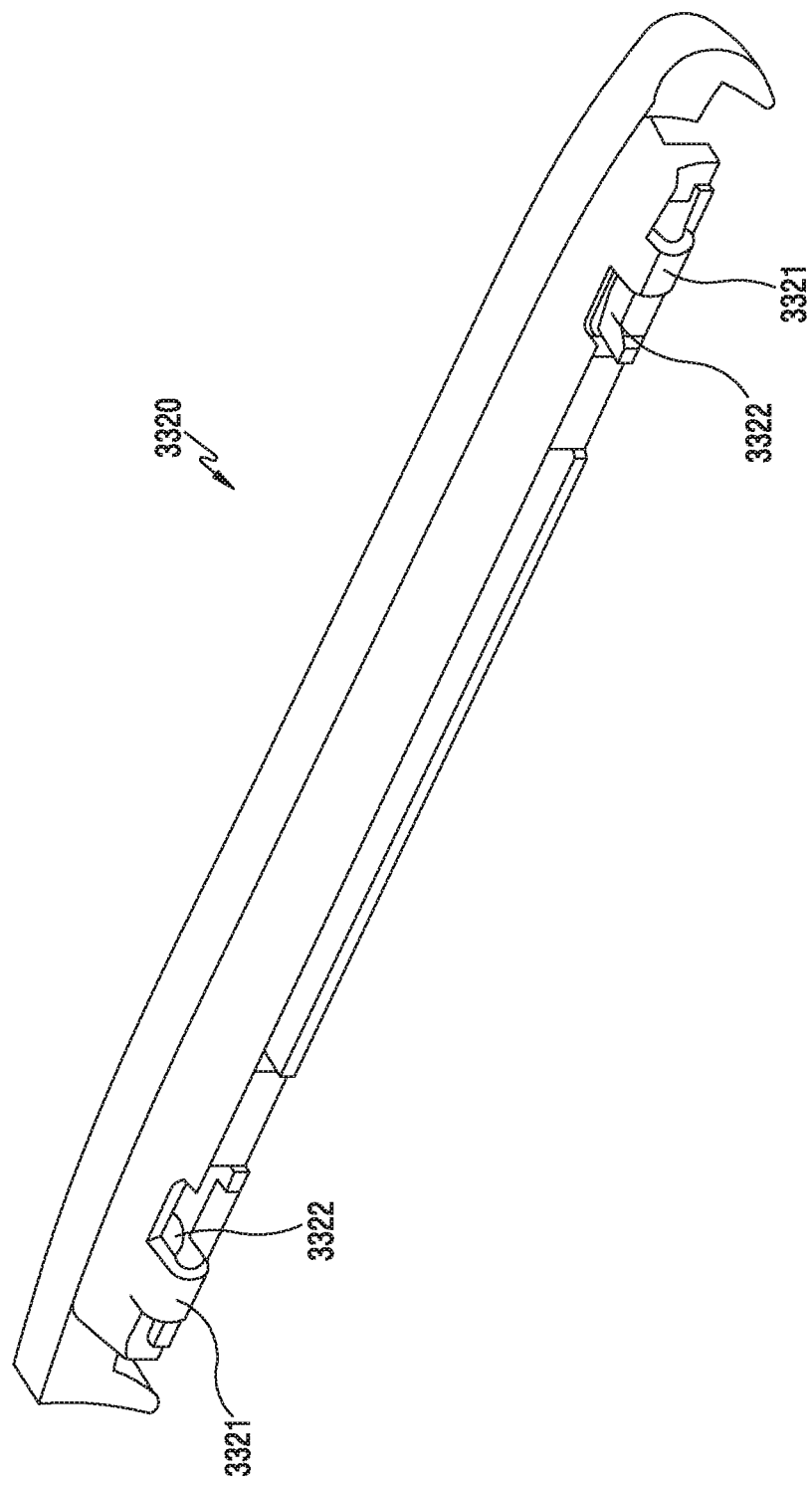
Figure 33D:
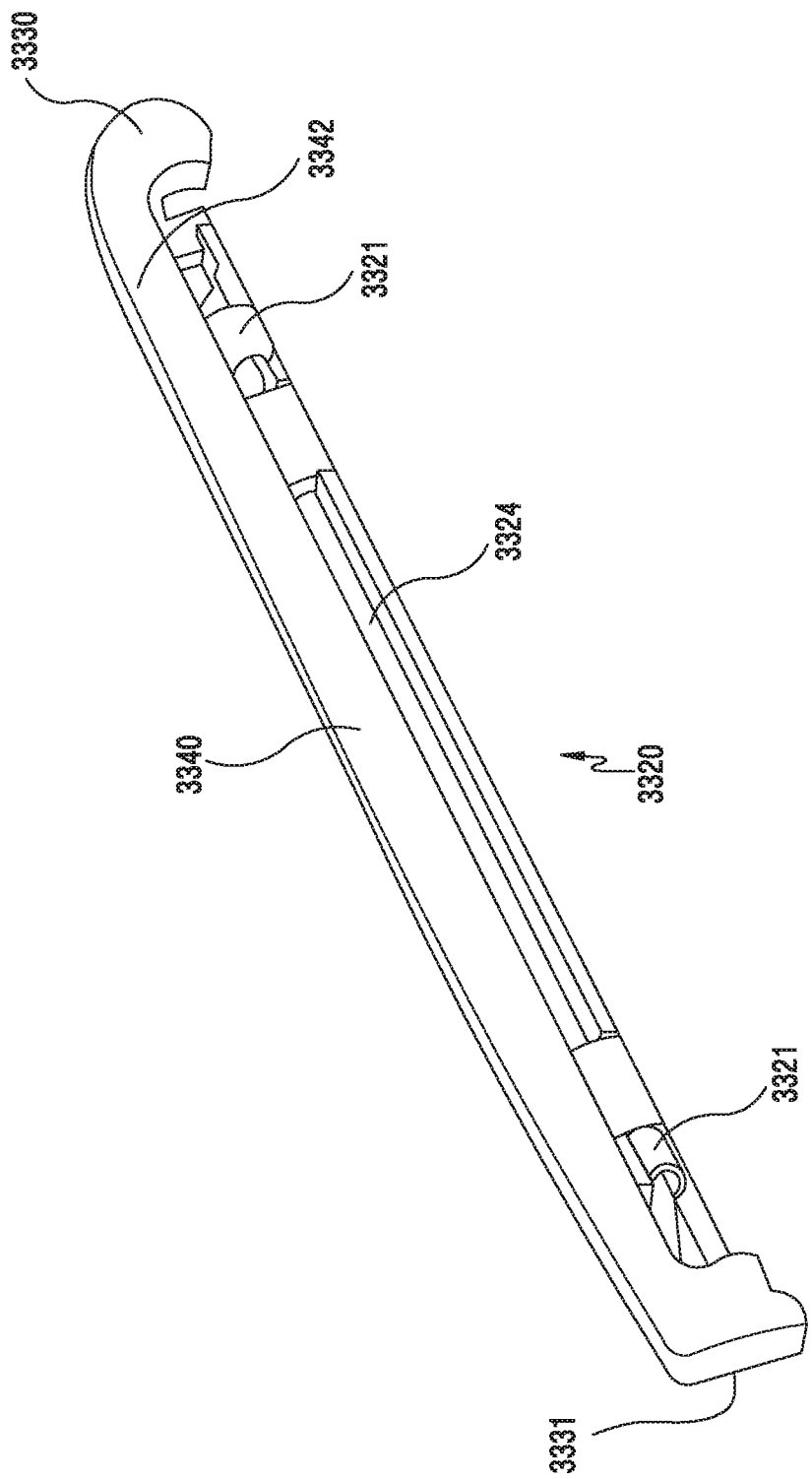

FIG. 33A illustrates an end of a folding member in an enlarged scale according to various embodiments of the present disclosure. FIGS. 33B to 33D illustrate various states obtained by viewing, at various angles, a folding member according to various embodiments of the present disclosure.

Referring to FIGS. 33A to 33D, a folding member may be employed as a folding member of the folding unit of a flexible device that has a cross section illustrated in FIG. 28B. Referring to FIGS. 33A to 33D, according to various embodiments of the present disclosure, a folding member 3320 may be configured to be similar to the folding member 3120 illustrated in FIGS. 31A to 31D. For example, the folding member 3320 may include opposite end portions, a hinge arm, a hinge arm recess, and an opening.

The folding member 3320 configured as described above is a member that is made of a metallic material and rotatably coupled to another folding member, and may be connected to the other folding member by a hinge unit. One folding member may be rotatably coupled to another folding member having the same configuration on the front side, and may be rotatably coupled to still another folding member having the same configuration on the rear side.

For example, the folding member 3320 may include opposite end portions 3330 and 3331, one or more hinge arms 3321, one or more hinge arm recesses 3322, an opening 3324, and one or more assembly holes. The detailed descriptions of the above-mentioned components will be omitted in order to avoid repeated descriptions.

According to various embodiments of the present disclosure, the folding member 3320 may include a first portion 3340 that is always exposed to the outside to form a portion of the exterior appearance, a second portion 3341 that is always unexposed to the outside, and a third portion 3342 that is exposed depending on whether the folding unit is folded. As the folding members 3320 are coupled to each other, boundary lines, which differentiate the folding members, may be formed.

Figure 34A:
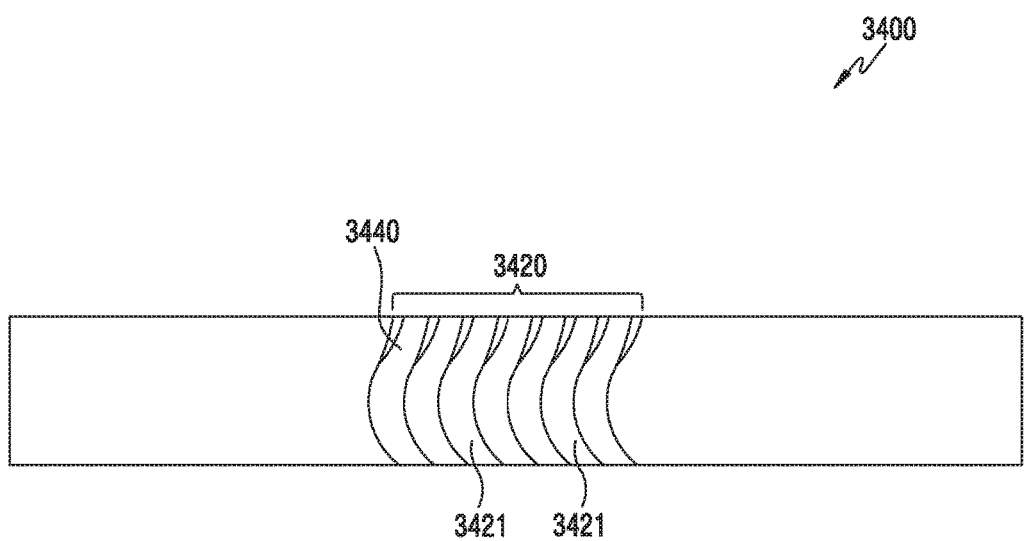
FIG. 34A illustrates a folding unit in an unfolded state according to various embodiments of the present disclosure.
Figure 34B:
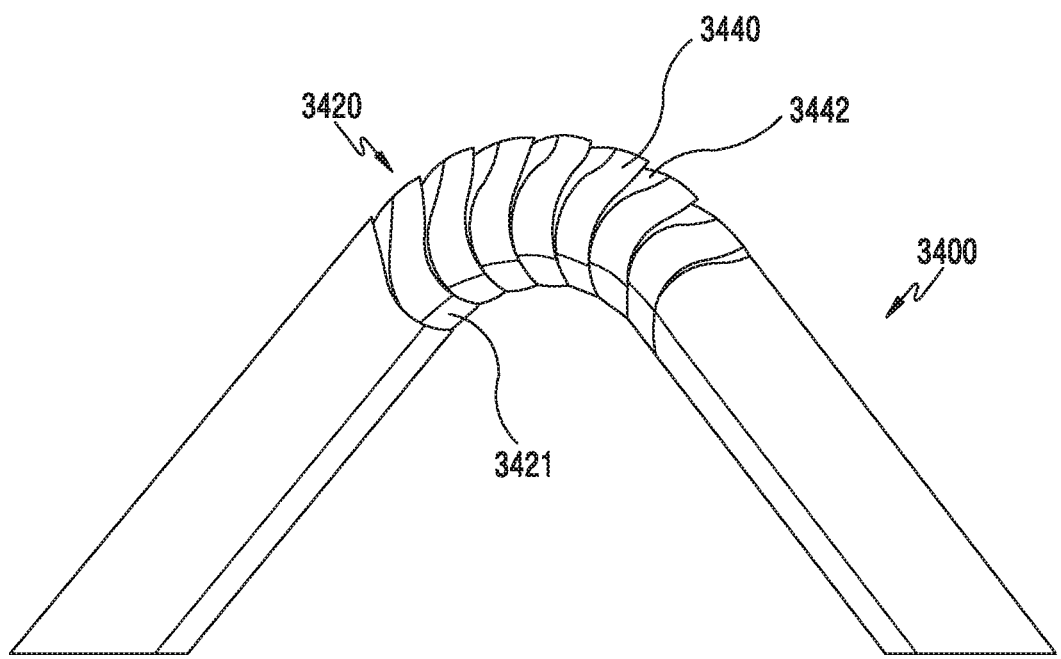
FIG. 34B illustrates a folding unit in a course of being folded according to various embodiments of the present disclosure.
Figure 34C:
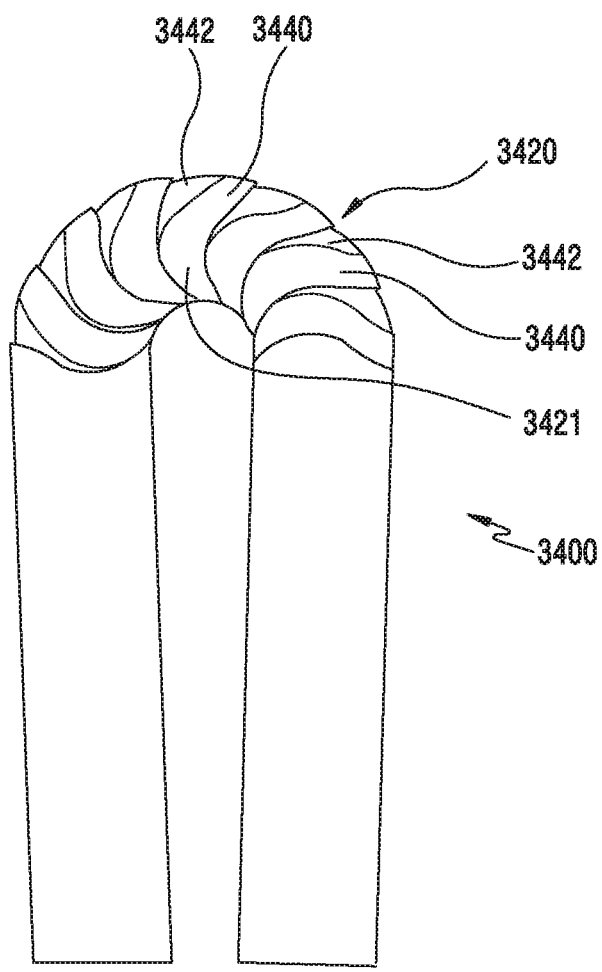
FIG. 34C illustrates a folding unit in a folded state according to various embodiments of the present disclosure.

FIG. 34A illustrates a folding unit in an unfolded state according to various embodiments of the present disclosure. FIG. 34B illustrates a folding unit in a course of being folded according to various embodiments of the present disclosure. FIG. 34C illustrates a folding unit in a folded state according to various embodiments of the present disclosure.

Referring to FIGS. 34A to 34C, a flexible electronic device 3400 according to various embodiments of the present disclosure may be the same as the flexible electronic device 2300 illustrated in FIGS. 23A and 23B and the flexible electronic device 2400 illustrated in FIGS. 24A and 24B.

According to various embodiments of the present disclosure, the flexible device 3400 may include one or more folding units 3420. According to various embodiment of the present disclosure, the folding unit 3420 may perform a folding/unfolding operation. According to various embodiments of the present disclosure, the folding unit 3420 may include a plurality of folding members 3421, and each of the folding members 3421 may include a first portion 3440 that is always exposed to the outside to form a portion of the exterior appearance, a second portion 3441 that is always unexposed to the outside, and a third portion 3442 that is exposed depending on whether the folding unit is folded. As the folding members 3420 are coupled to each other, boundary lines, which differentiate the folding members 3421, may be formed.

Referring to FIG. 34A, according to various embodiments of the present disclosure, in the state where the flexible electronic device 3400 is unfolded, the folding members 3421 only expose the first portions 3440 to the outside, respectively, and only the first portions 3440 may form a portion of the exterior appearance of the flexible electronic device 3400. The first portions 3440 of the folding unit 3420 may be coplanar to the exterior of the flexible electronic device 3400.

Referring to FIG. 34B, according to various embodiments of the present disclosure, in the state where the flexible electronic device 3400 is folded about 90 degrees or more, the folding members 3420 may be in the state where the first portions 3440 are exposed to the outside and the third portions 3442 are at least partially exposed. The first portions 3440 and the third portions 3442 may partially form a portion of the exterior of the flexible electronic device 3400.

Referring to FIG. 34C, according to various embodiments of the present disclosure, in the state where the flexible electronic device 3400 is folded about 180 degrees, each of the folding members 3421 may be in the state where the first and second portions 3440 and 3442 are exposed to the outside. The first and second portions 3440 and 3442 may form a portion of the exterior of the flexible electronic device 3400. The third portion 3442 may be disposed to be exposed, or to be concealed, depending on whether the flexible electronic device 3400 is folded. The first and third portions 3420 and 3422 of each folding unit 3420 may be arranged in an uneven shape.

Figure 35:
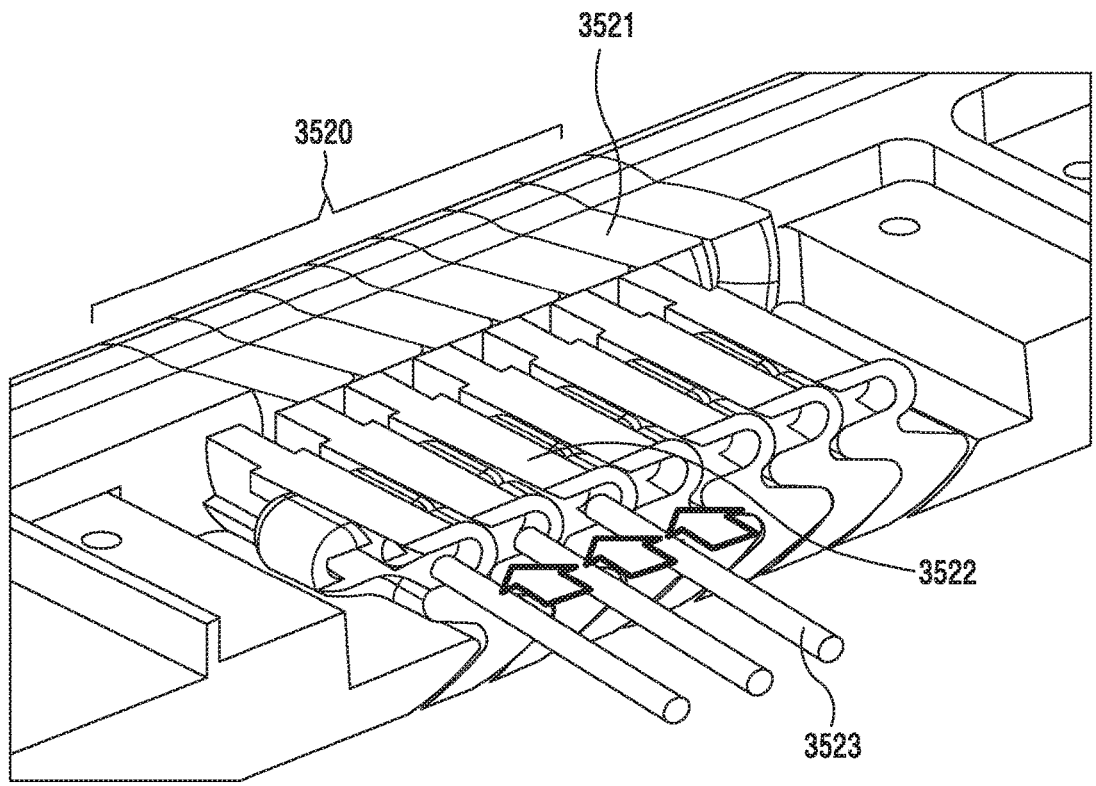
FIG. 35 illustrates a portion of a rotary coupling structure of folding members according to various embodiments of the present disclosure.

FIG. 35 illustrates a portion of a rotary coupling structure of folding members according to various embodiments of the present disclosure.

Referring to FIG. 35, according to various embodiments of the present disclosure, a folding unit 3520 may include a plurality of folding members 3521, which may be rotatably coupled to other folding members by hinge units so that the arranged state of the folding members 3521 can be maintained. The hinge unit may include one or more hinge arms 3522, which are coupled to hinge pins 3523, respectively, such that rotary coupling structure may be formed between the folding members 3521. The folding members 3521 may be rotated about the hinge pins 3523, respectively. The rotating movement of each folding member 3521 may be limited by the interlocking with other folding members.

According to various embodiments of the present disclosure, a coupling member 3521 may be rotatably connected to another folding member disposed at one side thereof by a coupling structure of the hinge arm 3522 and the hinge pin 3523, and may be rotatably connected to still another folding member disposed at the other side by a coupling structure of another hinge arm and another hinge pin.

Figure 36A:
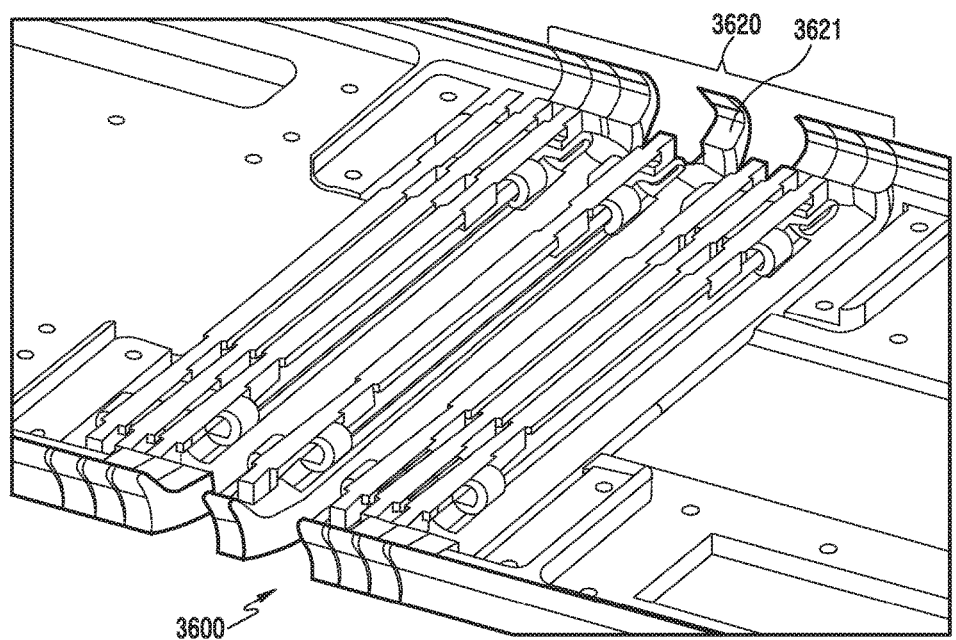
FIGS. 36A and 36B illustrate a state in which folding members are separated from each other according to various embodiments of the present disclosure.
Figure 36B:
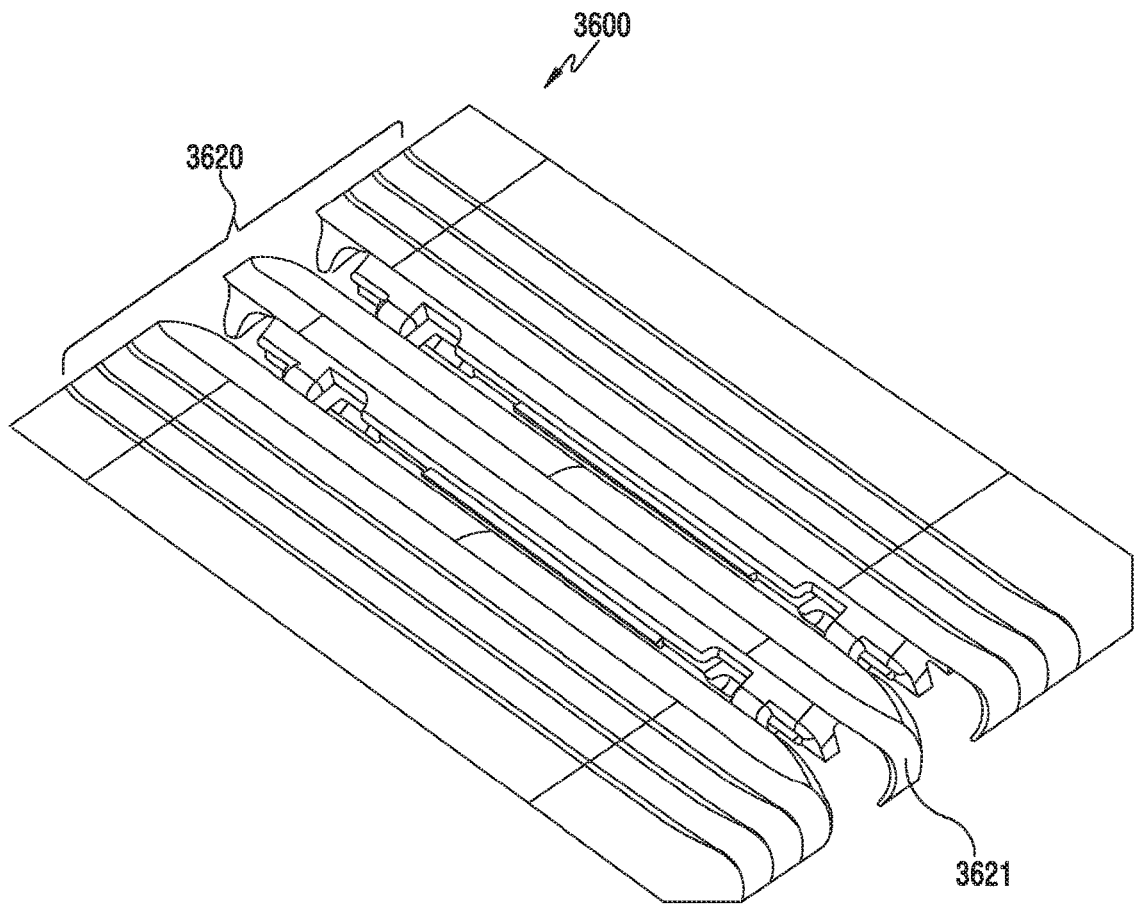
Figure 36C:
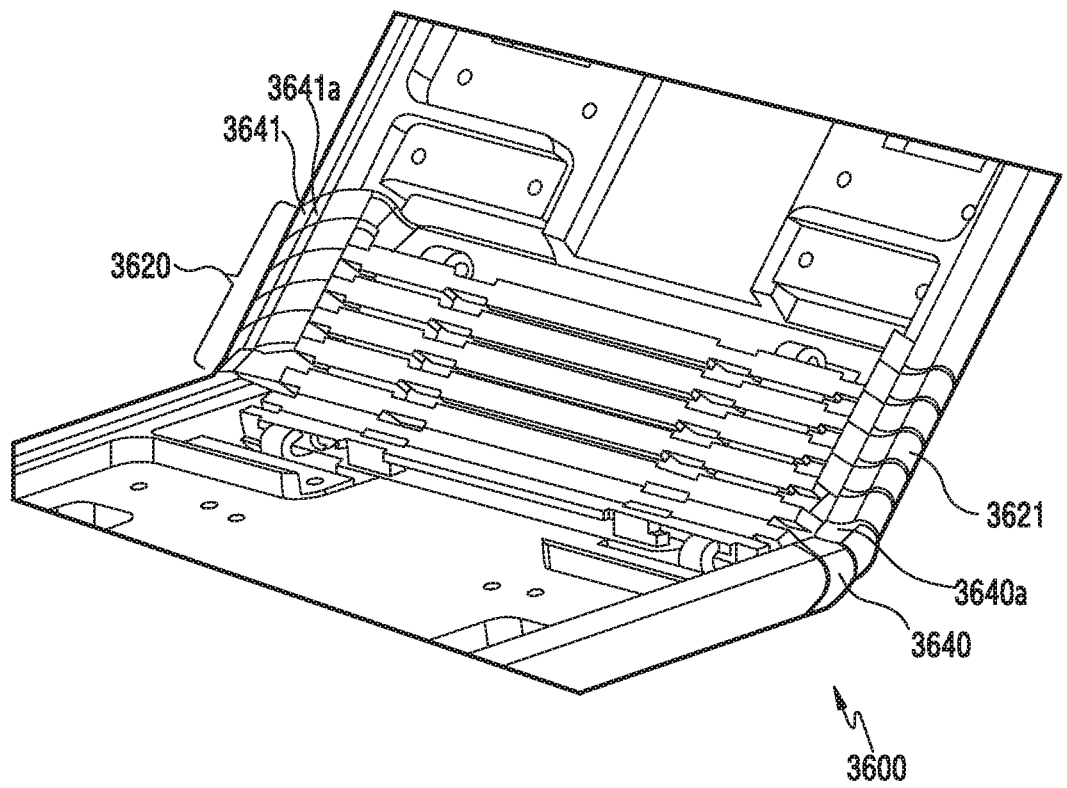
FIG. 36C illustrates folding members in a course of being folded according to various embodiments of the present disclosure.

FIGS. 36A and 36B illustrate a state in which folding members are separated from each other according to various embodiments of the present disclosure. FIG. 36C illustrates folding members in a course of being folded according to various embodiments of the present disclosure.

Referring to FIGS. 36A to 36C, a flexible electronic device 3600 according to various embodiments of the present disclosure may be the same as the flexible electronic device 2300 illustrated in FIGS. 23A and 23B and the flexible electronic device 2400 illustrated in FIGS. 24A and 24B.

According to various embodiments of the present disclosure, the flexible electronic device 3600, which may include one or more folding units 3620, may include a plurality of inter-folding member 3621 coupling structures. The respective folding members 3621 are coupled to be interlocked with each other, and may be interlocked such that at least partial areas are to be in surface contact with each other.

During the folding or unfolding operation, the respective folding members 3621 may perform a stopper function and a damper function by an interference operation according to the surface contact therebetween. The respective folding members 3621 may perform a damper function therebetween as the second portions thereof, which are always inwardly concealed, and the third portions thereof, which are exposed to the outside depending on the folding unit is folded, are interlocked with each other. The interlocked contact surfaces between the respective folding members 3621 may be curved faces. A surface-to-surface contact may perform the damping function by the frictional action therebetween.

During the folding or unfolding operation, the respective folding members 3621 may perform a stopper function by an interference structure therebetween. The portions 3640a and 3641a located inside the opposite end portions 3640 and 3641 of each folding member may perform a stopper function. During the folding or unfolding of the flexible electronic device 3600, the portions 3640 and 3641 collide with each other so that the portions cannot be further rotated, and such an operation may cause the folding members 3261 to perform the stopper function therebetween. For the stopper function, an inter-folding member stopper may be constituted with a structure, such as a protrusion, or may be constituted with an inter-member interlocking structure.

According to various embodiments of the present disclosure, a flexible device can be conveniently folded or unfolded since an external gap between folding members, which is generated when the flexible device is folded or unfolded, is removed.

More particularly, according to various embodiments of the present disclosure, the flexible device may provide a more convenient UI environment by using the rear face of the main body.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The module may be mechanically or electronically implemented. For example, the "module" according to an embodiment of the present disclosure may include at least one of an application-specific integrated circuit (ASIC) chip, a field-programmable gate array (FPGA), and a programmable-logic device for performing operations which has been known or are to be developed hereinafter.

According to various embodiments of the present disclosure, at least some of the devices (for example, modules or functions thereof) or the method (for example, operations) according to an embodiment of the present disclosure may be implemented by a command stored in a computer-readable storage medium in a programming module form. When the command is executed by one or more processors (for example, the processor A120), the one or more processors may execute a function corresponding to the command. The computer-readable storage medium may be, for example, the memory A130. At least some of the programming modules may be implemented (for example, executed) by, for example, the processor. At least some of the programming modules may include, for example, a module, a program, a routine, a set of instructions or a process for performing one or more functions.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The programming module according to an embodiment of the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A flexible electronic device comprising:
   a main body;
   a flexible display fixed to a first face of the main body;
   an auxiliary device disposed on a first region of a second face of the main body that is opposite to the first face; and
   a cover coupled to the second face to be movable while facing the second face of the main body, the cover including an area for covering the whole of the second face of the main body,
   wherein the cover is movable when the main body is curved, bent, or folded, and
   wherein the auxiliary device is closed by the cover in a state where the flexible device is unfolded, and the auxiliary device is opened in a state where the flexible device is folded.

2. The flexible electronic device of claim 1, wherein the auxiliary device comprises an auxiliary display, a camera, or a flash in the first region.

3. The flexible electronic device of claim 2, wherein the cover further includes an opening such that the auxiliary device is opened by the opening in the state where the flexible device is unfolded.

4. The flexible electronic device of claim 1, wherein one side region of the cover is fixed to the second face of the main body, and another side region of the cover is mounted to be movable by a sliding module while facing the second face of the main body.

5. A flexible electronic device comprising:
a main body;
a flexible display disposed on a front face of the main body;
an outer metal frame mounted to enclose a side rim of the main body; and
a folding unit mounted in the main body to enable the main body to be folded/unfolded,
wherein the folding unit comprises a plurality of folding members arranged side by side and rotatably connected with each other to be rotatable,
wherein opposite end portions of each of the plurality of folding members is exposed to the outside, and a remaining portion, excluding the opposite end portions, is concealed within the main body,
wherein the opposite end portions are disposed as a portion of the outer metal frame in a foldable portion of the main body, and
wherein no exterior gap exists between respective folding members at the opposite end portions.

6. The flexible electronic device of claim 5, wherein no gap exists between the folding members at the opposite end portions and the outer metal frame disposed to be in contact with the folding members.

7. The flexible electronic device of claim 5, further comprising:
a cover mounted on a rear face of the main body and configured to move when the flexible device is curved, bent, or folded.

8. The flexible electronic device of claim 7, wherein the cover comprises:
a first portion fixed to one side portion of the rear face of the main body; and
a second portion positioned at an opposite direction to the first portion and mounted to be movable by a sliding module while maintaining a state where the second portion faces another side portion of the rear face of the main body.

9. The flexible device of claim 8, wherein the cover comprises:
a first inner skin made of a rigid material and coupled to the one side portion;
a second inner skin made of a rigid material and coupled to the sliding module;
a third inner skin disposed between the first and second inner skins not to overlap with the first and second inner skins; and
an outer skin configured to have an area to cover the first to third inner skins, the outer skin being coupled to each of the first and second inner skins and pressure-welded to the third inner skin.

10. The flexible electronic device of claim 1, further comprising:
a folding unit disposed between the first and second faces so as to allow the second face to be folded to the first face; and
a metal body mounted between the first and second faces within the main body so as to provide a semi-automatic force for a folding or unfolding operation of the second face,
wherein, in a state where the main body is unfolded, the second face is folded up to a first angle by manually applying a force, and at an angle that is equal to, or larger than, the first angle, the metal body automatically applies a force so as to cause the second face to be folded, and
wherein, in a state where the main body is folded, the second face is unfolded up to a second angle by manually applying a force, and at an angle that is equal to, or larger than, the second angle, the metal body automatically applies a force so as to cause the second face to be unfolded.

11. The flexible electronic device of claim 10,
wherein the main body further comprises at least one third face that encloses at least a portion of a space between the first and second faces, and
wherein the first face is configured by any one of a flat face and a curved face, the second face is configured by a flat face, the at least one third face is configured by any one of a flat face and a curved face, and a flexible display is disposed on the first face.

12. The flexible electronic device of claim 10, wherein the folding unit comprises a plurality of folding members, which are rotatably coupled to be in close contact with each other such that during a folding or unfolding operation, each of the folding members serves as a stopper or a damper.

13. The flexible electronic device of claim 12, wherein the metal body is a leaf spring having a flexed shape, and is disposed to penetrate and to cross each of the folding members.

14. The flexible electronic device of claim 12, wherein each of the folding members comprises:
a first portion that is always exposed to the outside to form a portion of an exterior appearance;
a second portion that is always unexposed to the outside; and
a third portion that is exposed or unexposed depending on whether the folding unit is folded.

15. The flexible electronic device of claim 14, wherein each of the folding members is arranged such that, in the state where the main body is unfolded, the exposed portion of each of the folding members is disposed to be coplanar to an outer face of the main body, and in the state where the main body is unfolded, the exposed portions and the unexposed portions of respective folding members provide an uneven exterior on the outer face of the main body.

16. A flexible device comprising:
a main body having a first face on which a flexible display is disposed; and
a folding unit mounted in the main body and configured to cause the main body to be folded,
wherein the folding unit comprises a first folding member, at least one second folding member and at least one third folding member that are disposed at opposite sides of the first folding member, respectively,
wherein each of the folding members comprises opposite end portions, each of which includes an outer peripheral surface such that the outer peripheral surfaces of the folding members are interlocked with each other, and
wherein, when the main body is folded/unfolded, an external gap between the opposite end portions of the folding members is removed.

17. The flexible device of claim 16,
wherein the first folding member is coupled to each of neighboring second and third members such that the first folding member is prevented from being separated, and
wherein the at least one second folding member and the at least one third folding members are rotatably connected to each other by a hinge unit.

18. The flexible device of claim 17, wherein the first folding member comprises:

a disc-shaped end portion including at least one outer peripheral surface configured to come in slidable surface contact with a neighboring folding member;

a stopper configured to protrude inwardly from the end portion to limit a sliding movement by being interlocked with the neighboring folding member; and a separation prevention portion configured to be prevented from being outwardly separated by being coupled to the neighboring folding member, the separation prevention portion being formed at a position that is opposite to the stopper, wherein the disc-shaped end portion, the stopper, and the separation prevention portion are integrally formed with a body of the first folding member.

19. The flexible device of claim 18, wherein the second folding member comprises:

an end portion having at least one outer peripheral surface configured to slidably interlocked with the first end portion, a stopper configured to inwardly protrude from the end portion, and an opening formed at a middle portion of the second folding member to allow a flexible printed circuit board to pass therethrough.

20. The flexible device of claim 19, wherein the end portion of each of the folding members is configured to be slidably interlocked with an end portion of a neighboring folding member positioned at one side thereof, and to be slidably interlocked with an end portion of a neighboring folding member positioned at the other side, wherein the stoppers are configured to be interlocked with each other by interlocking between the end portions, and wherein the outermost folding member is configured to be interlocked with the main body.

* * * * *